(12) United States Patent
Spencer et al.

(10) Patent No.: US 12,441,716 B2
(45) Date of Patent: Oct. 14, 2025

(54) COMPOSITIONS AND METHODS FOR INCREASING MUSCLE MASS AND OXIDATIVE METABOLISM

(71) Applicant: The Regents of the University of California, Oakland, CA (US)

(72) Inventors: Melissa Spencer, Los Angeles, CA (US); Varghese John, Los Angeles, CA (US); Irina Kramerova, Los Angeles, CA (US); Jian Liu, Los Angeles, CA (US); Jesus Campagna, Los Angeles, CA (US); Barbara Jagodzinska, Los Angeles, CA (US)

(73) Assignee: The Regents of The University of California, Oakland, CA (US)

( * ) Notice: Subject to any disclaimer, the term of this patent is extended or adjusted under 35 U.S.C. 154(b) by 1038 days.

(21) Appl. No.: 17/602,989

(22) PCT Filed: Apr. 9, 2020

(86) PCT No.: PCT/US2020/027510
§ 371 (c)(1),
(2) Date: Oct. 11, 2021

(87) PCT Pub. No.: WO2020/210521
PCT Pub. Date: Oct. 15, 2020

(65) Prior Publication Data
US 2022/0162198 A1    May 26, 2022

Related U.S. Application Data

(60) Provisional application No. 62/833,037, filed on Apr. 12, 2019.

(51) Int. Cl.
| C07D 405/12 | (2006.01) |
| A61K 31/506 | (2006.01) |
| A61P 21/00  | (2006.01) |
| C07D 405/14 | (2006.01) |
| C07D 491/056 | (2006.01) |

(52) U.S. Cl.
CPC .......... *C07D 405/12* (2013.01); *A61K 31/506* (2013.01); *A61P 21/00* (2018.01); *C07D 405/14* (2013.01); *C07D 491/056* (2013.01)

(58) Field of Classification Search
None
See application file for complete search history.

(56) References Cited

U.S. PATENT DOCUMENTS

| 2016/0002175 A1 | 1/2016 | Scobie et al. |
| 2018/0170929 A1 | 6/2018 | Scobie et al. |

FOREIGN PATENT DOCUMENTS

| CN | 102770767 | 11/2012 | |
| CN | 105979943 | 9/2016 | |
| WO | WO 2006/078886 | 7/2006 | |
| WO | WO 2008/060332 | 5/2008 | |
| WO | WO-2010062829 A1 * | 6/2010 | ........... A61K 31/198 |
| WO | WO 2015/069752 | 5/2015 | |
| WO | WO 2015/095679 | 6/2015 | |
| WO | WO 2017/208211 | 12/2017 | |

OTHER PUBLICATIONS

Liu et.al. ((2005), A Small-Molecule Agonist of the Wnt Signaling Pathway, Angew. Chem. Int. Ed., 44, 1987-1990) (Year: 2005).*

(Continued)

*Primary Examiner* — Juliet C Switzer
*Assistant Examiner* — Dawanna Shar-Day White
(74) *Attorney, Agent, or Firm* — Norton Rose Fulbright US LLP

(57) ABSTRACT

Compositions and methods of use for a compound having a chemical structure of Formula (I) and/or Formula (VII), or a pharmaceutically y acceptable salt or solvate thereof, to increase muscle mass, muscle oxidative capacity, and muscle function and to treat muscular dystrophy, in particular limb girdle muscular dystrophy type 2A/R1/D1 are disclosed.

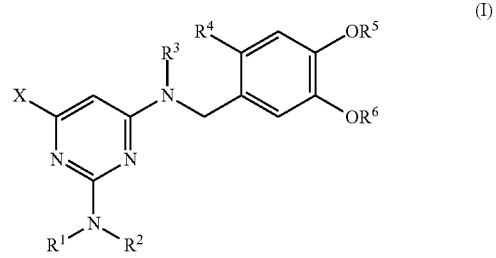

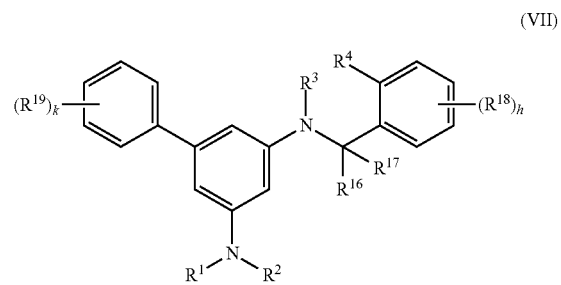

5 Claims, 37 Drawing Sheets

(56) References Cited

OTHER PUBLICATIONS

Blagodatski et.al. ((2014), Targeting the Wnt pathways for therapies, Molecular and Cellular Therapies, 2, 1-15 (Year: 2014).*
Taghizadeh et.al. ((2018), Prevalence, pathological mechanisms, and genetic basis of limb-girdle muscular dystrophies: A review, J Cell Physiol., 234, 7874-7884 (Year: 2018).*
International Search Report and Written Opinion for Application No. PCT/US20/27510, mailed Oct. 1, 2020, 16 pages.
PubChem-CID-91615597, Create Date: Mar. 18, 2015 (Mar. 18, 2015), p. 2, Fig.
PubChem-CID-117078948, Create Date: Feb. 11, 2016 (Feb. 11, 2016), p. 2, Fig.
PubChem-CID-68788895, Create Date: Nov. 30, 2012 (Nov. 30, 2012), p. 2, Fig.
Extended European Search Report issued in corresponding European Application No. 20788681.3, dated Feb. 1, 2023.
Office Action issued in corresponding Chinese Application No. 202080034330.6, dated Apr. 11, 2023.
Werner, M.E. et al., "The small molecule AMBMP disrupts microtubule growth, ciliogenesis, cell polarity and cell migration", *Cytoskeleton (Hoboken)*, 75(10), pp. 450-457, 2018.

* cited by examiner

COMPOSITIONS AND METHODS FOR INCREASING MUSCLE MASS AND OXIDATIVE METABOLISM

CROSS REFERENCE TO RELATED APPLICATIONS

This application is a national phase application under 35 U.S.C. § 371 of International Application No. PCT/US2020/027510, filed on Apr. 9, 2020, which claims priority to U.S. Provisional Patent Application No. 62/833,037 filed on Apr. 12, 2019, the entirety of which are incorporated herein by reference.

FIELD OF THE INVENTION

The present invention relates generally to the field of medicine. More particularly, it concerns compositions and methods for increasing muscle mass and muscle function and to treat muscular dystrophy, in particular limb girdle muscular dystrophy type 2A.

BACKGROUND

Muscular dystrophy is a group of more than 30 inherited diseases. Muscular dystrophy causes muscle weakness and muscle loss and can appear in any stage of life, including infancy. Muscular dystrophy becomes worse as muscles of persons effected get weaker and eventually the condition can become disabling. Limb-girdle muscular dystrophy usually manifests in the proximal limb and girdle muscles and causes weakness and atrophy of these muscles. Limb-girdle muscular dystrophy type 2A (LGMD2A/R1) is the most common form of limb-girdle muscular dystrophy, accounting for about 30 percent of cases. It is an autosomal recessive limb-girdle muscular dystrophy characterized by progressive, symmetrical weakness of the proximal limb and girdle muscles without heart involvement or intellectual disability. There is an autosomal dominant form named LGMD D1 that manifests a similar clinical phenotype.

Currently there is no cure for any form of muscular dystrophy. Current treatment methods primarily include physical therapy, orthopedic devices, surgery, and medications. Treatments are primarily directed to help with the symptoms and prevent complications. For example, current treatments of LGMD2A are primarily aimed at maintaining mobility and preventing complications. Thus, there is a need for composition and methods for treatment of muscular dystrophy.

SUMMARY OF THE DISCLOSURE

It has been determined that compounds having a chemical structure of Formula I and/or Formula VII, or a pharmaceutically acceptable salt or solvate thereof, can increase muscle mass, muscle function, and/or oxidative metabolism. These chemicals can be effective in treating muscular dystrophy, such as limb girdle muscular dystrophy type 2A/R1/D1.

Certain embodiments are directed to an AMBMP analog compound having a chemical structure of Formula I

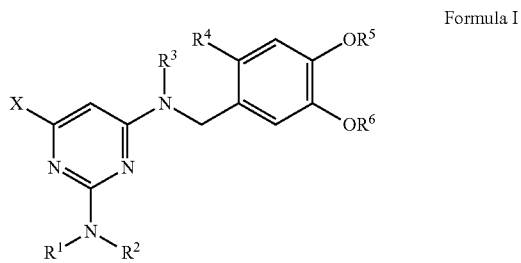

Formula I wherein $R^1$ and $R^2$ are independently selected from H, alkyl, substituted alkyl, aryl, or $R^1$ and $R^2$ join to form a 4- to 6-membered heterocyclic ring; $R^3$ and $R^4$ are independently selected from H, alkyl, substituted alkyl, aryl, or $R^3$ and $R^4$ are bonds forming a 5-membered heterocyclic ring, or $R^3$ and $R^4$ join to form a 6-membered heterocyclic ring; $R^5$ and $R^6$ are independently selected from H, alkyl, substituted alkyl, aryl, or $R^5$ and $R^6$ are bonds forming a 5-membered heterocyclic ring, or $R^5$ and $R^6$ join to form a 6-membered heterocyclic ring; and X is selected from a group having a chemical structure of Formula II, Formula III, Formula IV, or Formula V,

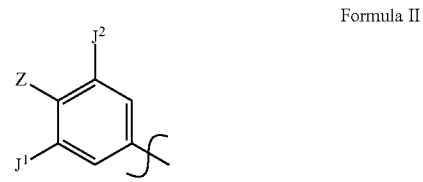

Formula II wherein for Formula II, Z is selected from H, alkyl, substituted alkyl, aryl, $OR^7$, or $NR^8R^9$, wherein $R^7$ is selected from H, alkyl, haloalkyl, substituted alkyl, or aryl; $R^8$ and $R^9$ are independently selected from H, alkyl, substituted alkyl, aryl, or $R^8$ and $R^9$ join to form a 4- to 6-membered heterocyclic ring; $J^1$ is selected from H, alkyl or $OR^{10}$; wherein $R^{10}$ is H, alkyl, haloalkyl, substituted alkyl, aryl, or $((CH_2)_nO)_pCH_2CH_2R^{11}$, wherein n is 1, 2, or 3; p is 0, 1, 2, 3, 4, 5, 6, 7, 8, 9, or 10; and $R^{11}$ is OH, $NH_2$, or alkoxy; and $J^2$ is selected from H, alkyl or $OR^{12}$; wherein $R^{12}$ is H, alkyl, haloalkyl, substituted alkyl, aryl, or $((CH_2)_nO)_pCH_2CH_2R^{13}$, wherein n is 1, 2, or 3; p is 0, 1, 2, 3, 4, 5, 6, 7, 8, 9, or 10; and $R^{13}$ is OH, $NH_2$, or alkoxy;

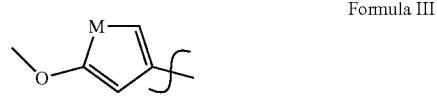

Formula III wherein for Formula III, M is selected from O, NH, or $CH_2$,

Formula IV

Formula V

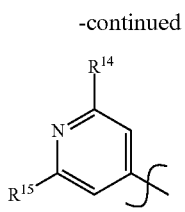

wherein for Formula V, $R^{14}$ is H or alkoxy and $R^{15}$ is H or alkoxy, wherein Formula I is not Formula VI Formula VI

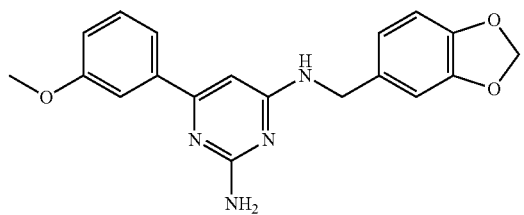

In some aspects, X is Formula II. In some particular aspects, X is Formula II, and $J_1$ is $OCH_3$.

In some aspects, $R^1$ is H, $R^2$ is H, $R^3$ is H, $R^4$ is H, $R^5$ and $R^6$ are bonds forming a 5-membered heterocyclic ring, and X is Formula II. Various examples of the these compounds are provided in FIG. 1.

In some aspects, $R^1$ is H, $R^2$ is H, $R^3$ is H, $R^4$ is H, $R^5$ and $R^6$ are bonds forming a 5-membered heterocyclic ring, X is Formula II, Z is H, $J^2$ is H and $J^1$ is $OR^{10}$. Various examples of these compounds are provided in FIG. 1A-1L. In some particular aspects, $R^{10}$ is $CF_3$, a non-limiting chemical structure of this compound is provided in FIG. 1A. In some particular aspect, $R^{10}$ is $CH(CH_3)_2$, a non-limiting chemical structure of this compound is provided in FIG. 1B. In some particular aspects, $R^{10}$ is H, a non-limiting chemical structure of this compound is provided in FIG. 1C. In some particular aspects, $R^{10}$ is $CH_2CH_3$, a non-limiting chemical structure of this compound is provided in FIG. 1D. In some particular aspects, $R^{10}$ is $CH_2CH_2CH_3$, a non-limiting chemical structure of this compound is provided in FIG. 1E. In some particular aspects, $R^{10}$ is $C(CH_3)_3$, a non-limiting chemical structure of this compound is provided in FIG. 1F. In some particular aspects, $R^{10}$ is $CH_2CH_2OCH_3$, a non-limiting chemical structure of this compound is provided in FIG. 1G. In some particular aspects, $R^{10}$ is $CH_2CH_2OCH_2CH_2OCH_2CH_2OCH_3$, a non-limiting chemical structure of this compound is provided in FIG. 1H. In some particular aspects, $R^{10}$ is $CH_2CH_2OCH_2CH_2NH_2$, a non-limiting chemical structure of this compound is provided in FIG. 1I. In some particular aspects, $R^{10}$ is $CH_2NH_2$, a non-limiting chemical structure of this compound is provided in FIG. 1J. In some particular aspects, $R^{10}$ is $CH_2CH_2NH_2$, a non-limiting chemical structure of this compound is provided in FIG. 1K. In some particular aspects, $R^{10}$ is $CH_2CONH_2$, a non-limiting chemical structure of this compound is provided in FIG. 1L. In some embodiments, 1, 2, 3, 4, 5, 6, 7, 8, 9, 10 or more of the compounds (or any range derivable therein) discussed in this paragraph may be excluded.

In some aspects, $R^1$ is H, $R^2$ is H, $R^3$ is H, $R^4$ is H, $R^5$ and $R^6$ are bonds forming a 5-membered heterocyclic ring, X is Formula II, $J^1$ is $OCH_3$, $J^2$ is H, and Z is selected from alkyl, substituted alkyl, aryl, $OR^7$, or $NR^8R^9$, wherein $R^7$ is selected from H, alkyl, haloalkyl, substituted alkyl, or aryl; $R^8$ and $R^9$ are independently selected from H, alkyl, substituted alkyl, aryl, or $R^8$ and $R^9$ join to form 4- to 6-membered heterocyclic ring. Various examples of the these compounds are provided in FIG. 1M-1P. In some particular aspects, Z is $NR^8R^9$, and $R^8$ and $R^9$ join to form 4-membered heterocyclic ring, a non-limiting chemical structure of this compound is provided in FIG. 1M. In some particular aspects, Z is $NHCH_3$, a non-limiting chemical structure of this compound is provided in FIG. 1N. In some particular aspects, Z is $NH_2$, a non-limiting chemical structure of this compound is provided in FIG. 1O. In some particular aspects, Z is $CH_3$, a non-limiting chemical structure of this compound is provided in FIG. 1P. In some embodiments one or more of the compounds discussed in this paragraph may be excluded.

In some aspects, $R^1$ is H, $R^2$ is H, $R^3$ is H, $R^4$ is H, $R^5$ and $R^6$ are bonds forming a 5-membered heterocyclic ring, X is Formula II, $J^1$ is H, $J^2$ is H and Z is selected from H, alkyl, substituted alkyl, aryl, $OR^7$, or $NR^8R^9$, wherein $R^7$ is selected from H, alkyl, haloalkyl, substituted alkyl, or aryl; $R^8$ and $R^9$ are independently selected from H, alkyl, substituted alkyl, aryl, or $R^8$ and $R^9$ join to form 4- to 6-membered heterocyclic ring. Various examples of the these compounds are provided in FIGS. 1Q-1T, 1V, 1X-1Z, and 1AA. In some particular aspects, Z is $OCF_3$, a non-limiting chemical structure of this compound is provided in FIG. 1Q. In some particular aspects, Z is $OCH_3$, a non-limiting chemical structure of this compound is provided in FIG. 1R. In some particular aspects, Z is $OCH_2CH_3$, a non-limiting chemical structure of this compound is provided in FIG. 1S. In some particular aspects, Z is $NR^8R^9$ and $R^8$ and $R^9$ join to form 4-membered heterocyclic ring, a non-limiting chemical structure of this compound is provided in FIG. 1T. In some embodiments, one or more of the discussed in this paragraph may be excluded. In some particular aspects, Z is $OC(CH_3)_3$, a non-limiting chemical structure of this compound is provided in FIG. 1V. In some particular aspects, Z is $OCH_2CONH_2$, a non-limiting chemical structure of this compound is provided in FIG. 1X. In some particular aspects, Z is $OCH_2CH_2NH_2$, a non-limiting chemical structure of this compound is provided in FIG. 1Y. In some particular aspects, Z is $OCH_2CH_2NHCH_2CH_3$, a non-limiting chemical structure of this compound is provided in FIG. 1Z. In some particular aspects, Z is $OCH_2NHCH_2CH(CH_3)_2$, a non-limiting chemical structure of this compound is provided in FIG. 1AA.

In some aspects, $R^1$ is H, $R^2$ is H, $R^3$ is H, $R^4$ is H, $R^5$ and $R^6$ are bonds forming a 5-membered heterocyclic ring, X is Formula II, $J^1$ is $OCH_3$, $J^2$ is $OCH_3$ and Z is H, a non-limiting chemical structure of this compound is provided in FIG. 1U. In some aspects, $R^1$ is H, $R^2$ is H, $R^3$ is H, $R^4$ is H, $R^5$ and $R^6$ are bonds forming a 5-membered heterocyclic ring, X is Formula II, $J^1$ is $OCH_3$, $J^2$ is OH and Z is H, a non-limiting chemical structure of this compound is provided in FIG. 1W. In some aspects, $R^1$ is H, $R^2$ is H, $R^3$ is H, $R^4$ is H, $R^5$ and $R^6$ are bonds forming a 5-membered heterocyclic ring, X is Formula II, $J^1$ is $OCF_3$, $J^2$ is $OCH_3$ and Z is H, a non-limiting chemical structure of this compound is provided in FIG. 1BB.

In some aspects, $R^1$ is H, $R^2$ is H, $R^3$ is H, $R^4$ is H, $R^5$ and $R^6$ are bonds forming a 5-membered heterocyclic ring, X is Formula III, and M is O, NH, or $CH_2$. Various examples of the these compounds are provided in FIG. 2. In some particular aspects, M is O, a non-limiting chemical structure of this compound is provided in FIG. 2A. In some particular aspects, M is NH, a non-limiting chemical structure of this compound is provided in FIG. 2B. In some particular aspects, M is $CH_2$, a non-limiting chemical structure of this compound is provided in FIG. 2C. In some embodiments, one or more of the discussed in this paragraph may be excluded.

In some aspects, $R^1$ is H, $R^2$ is H, $R^3$ is H, $R^4$ is H, $R^5$ and $R^6$ are bonds forming a 5-membered heterocyclic ring, and X is Formula IV, a non-limiting chemical structure of this compound is provided in FIG. 3. In some embodiments, one or more of the compounds discussed in this paragraph may be excluded.

In some aspects, $R^3$ is H, $R^4$ is H, $R^5$ and $R^6$ are bonds forming a 5-membered heterocyclic ring, X is Formula II, $J^1$ is $OCH_3$, Z is H, $J^2$ is H, and $R^1$ and $R^2$ are independently selected from H, alkyl, substituted alkyl, aryl, or $R^1$ and $R^2$ join to form 4- to 6-membered heterocyclic ring. Various examples of the these compounds are provided in FIG. 4. In some particular aspects, $R^1$ is H, and $R^2$ is $CH_3$, a non-limiting chemical structure of this compound is provided in FIG. 4A. In some particular aspects, $R^1$ is $CH_3$ and $R^2$ is $CH_3$, a non-limiting chemical structure of this compound is provided in FIG. 4B. In some particular aspects, $R^1$ and $R^2$ join to form 4-membered heterocyclic ring, a non-limiting chemical structure of this compound is provided in FIG. 4C. In some particular aspects, $R^1$ and $R^2$ join to form 5-membered heterocyclic ring, a non-limiting chemical structure of this compound is provided in FIG. 4D. In some particular aspects, $R^1$ is H, and $R^2$ is $p-C_6H_5CH_2CN$, a non-limiting chemical structure of this compound is provided in FIG. 4E. In some particular aspects, $R^1$ is H, and $R^2$ is $p-C_6H_5CH_2CCH$, a non-limiting chemical structure of this compound is provided in FIG. 4F. In some particular aspects, $R^1$ is H, and $R^2$ is $p-C_6H_5CH_2CH_3$, a non-limiting chemical structure of this compound is provided in FIG. 4G. In some embodiments, 1, 2, 3, 4, 5, or more of the compounds (or any range derivable therein) discussed in this paragraph may be excluded.

In some aspects, $R^1$ is H, $R^2$ is H, $R^5$ and $R^6$ are bonds forming a 5-membered heterocyclic ring, X is Formula II, $J^1$ is $OCH_3$, Z is H, $J^2$ is H, and $R^3$ and $R^4$ are independently selected from H, alkyl, substituted alkyl, aryl, or $R^3$ and $R^4$ are bonds forming a 5-membered heterocyclic ring. Various examples of these compounds are provided in FIG. 5. In some particular aspects, $R^3$ is $CH_3$ and $R^4$ is H, a non-limiting chemical structure of this compound is provided in FIG. 5A. In some particular aspects, $R^3$ and $R^4$ are bonds forming a 5-membered a heterocyclic ring, a non-limiting chemical structure of this compound is provided in FIG. 5B. In some embodiments, one or more of the compounds discussed in this paragraph may be excluded.

In some aspects, $R^1$ is H, $R^2$ is H, $R^3$ is H, $R^4$ is H, X is Formula II, $J^1$ is $OCH_3$, Z is H, $J^2$ is H, $R^5$ and $R^6$ are independently selected from H, an alkyl group, substituted alkyl, aryl, or $R^5$ and $R^6$ are bonds forming a 5-membered ring or $R^5$ and $R^6$ join to form a 6-membered heterocyclic ring. Various examples of these compounds are provided in FIG. 6. In some particular aspects, $R^5$ is $CH_3$ and $R^6$ is H, a non-limiting chemical structure of this compound is provided in FIG. 6A. In some particular aspects, $R^5$ and $R^6$ join form a 6-membered heterocyclic ring, a non-limiting chemical structure of this compound is provided in FIG. 6B. In some embodiments, one or more of the compounds discussed in this paragraph may be excluded.

In some aspects, $R^1$ is H, $R^2$ is H, $R^3$ is H, $R^4$ is H, $R^5$ and $R^6$ are bonds forming a 5-membered heterocyclic ring, X is Formula V, $R^{14}$ is H or $OCH_3$, and $R^{15}$ is H or $OCH_3$. Various examples of these compounds are provided in FIG. 7. In some particular aspects, $R^{14}$ is $OCH_3$ and $R^{15}$ is $OCH_3$, a non-limiting chemical structure of this compound is provided in FIG. 7A. In some particular aspects, $R^{14}$ is $OCH_3$ and $R^{15}$ is H, a non-limiting chemical structure of this compound is provided in FIG. 7B. In some embodiments, one or more of the compounds discussed in this paragraph may be excluded.

In some aspects, a compound having a chemical structure of Formula I can have the non-limiting chemical structure of the compound provided in FIG. 18A. In some aspects, $R^1$ is $CH_3$, $R^2$ is $CH_3$, $R^3$ is H, $R^4$ is H, $R^5$ and $R^6$ are bonds forming a 5-membered heterocyclic ring, X is Formula II, $J^1$ is $OCH_3$, $J^2$ is $CH_3$ and Z is H, a non-limiting chemical structure of this compound is provided in FIG. 18B. In some aspects, $R^3$ is H, $R^4$ is H, $R^5$ and $R^6$ are bonds forming a 5-membered heterocyclic ring, X is Formula II, $J^1$ is $OCH_3$, $J^2$ is $CH_3$, Z is H, $R^1$ and $R^2$ join to form a 5-membered heterocyclic ring, a non-limiting chemical structure of this compound is provided in FIG. 18C. In some aspects, $R^1$ is H, $R^2$ is H, $R^3$ is H, $R^4$ is H, $R^5$ and $R^6$ join form a 6-membered heterocyclic ring, X is Formula II, $J^1$ is $OCH_3$, $J^2$ is OH, and Z is H, a non-limiting chemical structure of this compound is provided in FIG. 18D. In some aspects, $R^1$ is H, $R^2$ is H, $R^3$ is H, $R^4$ is H, $R^5$ is $CH_3$, $R^6$ is $CH_3$, X is Formula II, $J^1$ is $OCH_3$, $J^2$ is OH, Z is H, a non-limiting chemical structure of this compound is provided in FIG. 18E.

Certain embodiments are directed to an AMBMP analog compound having a chemical structure of Formula VII

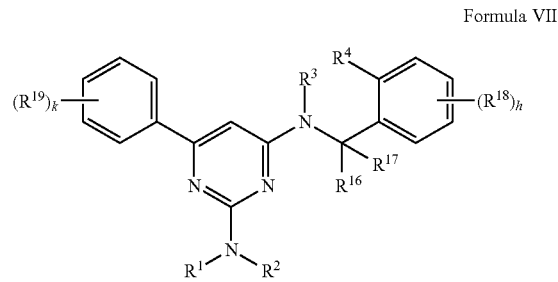

Formula VII wherein $R^1$, $R^2$, $R^3$ and $R^4$ are as defined above regarding Formula I, $R^{16}$ and $R^{17}$ can be independently selected from H, alkyl, substituted alkyl, aryl, or $R^{16}$ and $R^{17}$ join to form a 4- to 8-membered cycloalkyl or heterocyclic ring. Each $R^{18}$ can be independently alkyl, substituted alkyl, heteroalkyl, cycloalkyl, aryl or heteroaryl. Each $R^{19}$ can be independently alkyl, substituted alkyl, heteroalkyl, cycloalkyl, aryl or heteroaryl. h can be 0, 1, 2, 3 or 4. k can be 1, 2, 3, 4 or 5. In some particular aspects, $R^{16}$ and $R^{17}$ can be independently from H, methyl, a carboxylate, a carboxamide, or $R^{16}$ and $R^{17}$ join to form a 4- to 8-membered cycloalkyl ring.

Formula VII is not Formula VI. In some aspects, Formula VII can be Formula I. In some aspects, a compound having a chemical structure of Formula VII can have the non-limiting chemical structure of the compound provided in FIG. 19A. In some aspects, a compound having a chemical structure of Formula VII can have the non-limiting chemical structure of the compound provided in FIG. 19B. In some aspects, a compound having a chemical structure of Formula VII can have the non-limiting chemical structure of the compound provided in FIG. 19C. In some aspects, a compound having a chemical structure of Formula VII can have the non-limiting chemical structure of the compound provided in FIG. 19D. In some aspects, a compound having a chemical structure of Formula VII can have the non-limiting chemical structure of the compound provided in FIG. 19E. In some aspects, a compound having a chemical structure of Formula VII can have the non-limiting chemical structure of the compound provided in FIG. 19F. In some aspects, a compound having a chemical structure of Formula VII can have the non-limiting chemical structure of the compound provided in FIG. 19G. In some aspects, a compound having a chemical structure of Formula VII can have the non-limiting chemical structure of the compound provided in FIG. 19H. In some aspects, a compound having a chemical structure of Formula VII can have the non-limiting chemical structure of the compound provided in FIG. 19I. In some aspects, a compound having a chemical structure of Formula VII can have the non-limiting chemical structure of the compound provided in FIG. 19J. In some aspects, a compound having a chemical structure of Formula VII can have the non-limiting chemical structure of the compound provided in FIG. 19K. In some aspects, a compound having a chemical structure of Formula VII can have the non-limiting chemical structure of the compound provided in FIG. 19L. In some aspects, a compound having a chemical structure of Formula VII can have the non-limiting chemical structure of the compound provided in FIG. 19M. In some aspects, a compound having a chemical structure of Formula VII can have the non-limiting chemical structure of the compound provided in FIG. 19N. In some aspects, a compound having a chemical structure of Formula VII can have the non-limiting chemical structure of the compound provided in FIG. 19O. In some aspects, a compound having a chemical structure of Formula VII can have the non-limiting chemical structure of the compound provided in FIG. 19P.

Certain embodiments are directed to compositions and methods of use for a compound having a chemical structure of Formula I and/or Formula VII, or a pharmaceutically acceptable salt or solvate thereof. Certain embodiments are directed to a pharmaceutical composition containing an effective amount of a compound having a chemical structure of Formula I and/or Formula VII, or a pharmaceutically acceptable salt or solvate thereof. In some aspects, the pharmaceutical composition can contain one or more of the compounds illustrated in FIGS. 1-7, 18, and 19, or a pharmaceutically acceptable salt or solvate thereof. In some aspects, the pharmaceutical composition can contain a pharmaceutically acceptable carrier. In some aspect, the pharmaceutical composition can contain a pharmaceutically acceptable excipient. In some embodiments, one or more compounds having a chemical structure of Formula I and/or Formula VII can be excluded. In some embodiments, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, or more of the compounds (or any range derivable therein) illustrated in FIGS. 1-7, 18, and 19 may be excluded.

Certain embodiments are directed to therapeutic methods comprising administering an effective amount of a compound having a chemical structure of Formula I and/or Formula VII, or a pharmaceutically acceptable salt or solvate thereof, to a subject in need thereof. In some aspects, one or more of the compounds illustrated in FIGS. 1-7, 18, and 19, or a pharmaceutically acceptable salt or solvate thereof is administered. In some aspects, the subject has been determined to have muscle dystrophy. In some particular aspects, the type of muscular dystrophy is limb girdle muscular dystrophy. In some particular aspects, the type of muscular dystrophy is limb girdle muscular dystrophy type 2A/R1/D1. In some aspects, the subject has been determined to have muscle atrophy or be at risk for muscle atrophy. In some aspects, the subject is determined to have cachexia or sarcopenia. In some aspect the subject is determined to have cancer. In some aspect the subject is determined to have myopathy. In some embodiments, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, or more of the compounds (or any range derivable therein) illustrated in FIGS. 1-7, 18, and 19 may be excluded.

Certain embodiments are directed to a method of treating muscular dystrophy in a subject, the method comprising administering to the subject an effective amount of a compound having a chemical structure of Formula I and/or Formula VII, or a pharmaceutically acceptable salt or solvate thereof. In some aspects, one or more of the compounds illustrated in FIGS. 1-7, 18, and 19 or a pharmaceutically acceptable salt or solvate thereof is administered. In some particular aspect, the type of muscular dystrophy is limb girdle muscular dystrophy. In some particular aspects, the type of muscular dystrophy is limb girdle muscular dystrophy type 2A. In some particular aspects, the type of muscular dystrophy is limb girdle muscular dystrophy type R1. In some particular aspects, the type of muscular dystrophy is limb girdle muscular dystrophy type D1. In some embodiments, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, or more of the compounds (or any range derivable therein) illustrated in FIGS. 1-7, 18, and 19 may be excluded. In some instances, the method inhibits and/or decreases a symptom or complication of the muscular dystrophy at least or at most or exactly 100, 99, 98, 96, 94, 92, 90, 85, 80, 75, 70, 65, 60, 55, 50, 40, 30, 20, 10, or 5%, or any derivable range therein.

Certain embodiments are directed to a method of treating muscular atrophy in a subject, the method comprising administering to the subject an effective amount of a compound having a chemical structure of Formula I and/or Formula VII, or a pharmaceutically acceptable salt or solvate thereof. In some aspects, one or more of the compounds illustrated in FIGS. 1-7, 18, and 19 or a pharmaceutically acceptable salt or solvate thereof is administered. In some aspects, the subject has been determined to have muscle atrophy or be at risk for muscle atrophy. In some embodiments, the subject has been tested for muscle atrophy or a disease that causes or is associated with muscle atrophy. In some embodiments, the subject has previously been treated with one or more therapies for muscle atrophy. In some embodiments, one or more of the therapies for muscle atrophy is a prescribed chemical treatment. In some embodiments, 1, 2, 3, 4, 5, 6, 7, 8, 9, 10, 11, 12, 13, 14, 15, 16, 17, 18, 19, 20 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, or more of the compounds (or any range derivable therein) illustrated in FIGS. 1-7, 18, and 19 may be excluded. In some instances, the method inhibits and/or decreases a symptom or complication of the muscular atrophy at least or at most or exactly 100, 99, 98, 96, 94, 92, 90, 85, 80, 75, 70, 65, 60, 55, 50, 40, 30, 20, 10, or 5%, or any derivable range therein.

Certain embodiments are directed to a method for treating cachexia or sarcopenia in a subject, the method comprising administering to the subject an effective amount of a compound having a chemical structure of Formula I and/or Formula VII, or a pharmaceutically acceptable salt or solvate thereof. In some aspects, one or more of the compounds illustrated in FIGS. 1-7, 18, and 19 or a pharmaceutically acceptable salt or solvate thereof is administered. In some embodiments, the subject has been diagnosed with cancer. In some embodiments, the subject has been prescribed bed rest. In some embodiments, the subject has been diagnosed with age-related sarcopenia. In some embodiments, 1, 2, 3, 4, 5, 6, 7, 8, 9, 10, 11, 12, 13, 14, 15, 16, 17, 18, 19, 20 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, or more of the compounds (or any range derivable therein) illustrated in FIGS. 1-7, 18, and 19 may be excluded. In some instances, the method inhibits and/or decreases a symptom or complication of the cachexia or sarcopenia at least or at most or exactly 100, 99, 98, 96, 94, 92, 90, 85, 80, 75, 70, 65, 60, 55, 50, 40, 30, 20, 10, or 5%, or any derivable range therein.

Certain embodiments are directed to a method of increasing muscle mass in a subject, or to a method of treatment of a disease related to decreased muscle mass in a subject, the method comprising administering to the subject an effective amount of a compound having a chemical structure of Formula I and/or Formula VII, or a pharmaceutically acceptable salt or solvate thereof. In some aspects, one or more of the compounds illustrated in FIGS. 1-7, 18, and 19 or a pharmaceutically acceptable salt or solvate thereof is administered. In some embodiments, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, or more of the compounds (or any range derivable therein) illustrated in FIGS. 1-7, 18, and 19 may be excluded. In some instances, muscle mass is increased 10000, 1000, 500, 200, 100, 99, 98, 96, 94, 92, 90, 85, 80, 75, 70, 65, 60, 55, 50, 40, 30, 20, 10, or 5%, or any derivable range therein.

Certain embodiments are directed to a method of increasing oxidative metabolism in a subject, or to a method of treatment of a disease related to decreased oxidative metabolism in a subject, the method comprising administering to the subject an effective amount of a compound having a chemical structure of Formula I and/or Formula VII, or a pharmaceutically acceptable salt or solvate thereof. In some aspects, one or more of the compounds illustrated in FIGS. 1-7, 18, and 19, or a pharmaceutically acceptable salt or solvate thereof is administered. In some embodiments, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, or more of the compounds (or any range derivable therein) illustrated in FIGS. 1-7, 18, and 19 may be excluded. In some instances, oxidative metabolism is increased 10000, 1000, 500, 200, 100, 99, 98, 96, 94, 92, 90, 85, 80, 75, 70, 65, 60, 55, 50, 40, 30, 20, 10, or 5%, or any derivable range therein.

Certain embodiments are directed to a method of increasing muscle force in a subject, or to a method of treatment of a disease related to decreased muscle force in a subject, the method comprising administering to the subject an effective amount of a compound having a chemical structure of Formula I and/or Formula VII, or a pharmaceutically acceptable salt or solvate thereof. In some aspects, one or more of the compounds illustrated in FIGS. 1-7, 18, and 19, or a pharmaceutically acceptable salt or solvate thereof is administered. In some embodiments, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, or more of the compounds (or any range derivable therein) illustrated in FIGS. 1-7, 18, and 19 may be excluded. In some instances, muscle force is increased 10000, 1000, 500, 200, 100, 99, 98, 96, 94, 92, 90, 85, 80, 75, 70, 65, 60, 55, 50, 40, 30, 20, 10, or 5%, or any derivable range therein.

Certain embodiments are directed to a method of improving muscle function in a subject, or to a method of treatment of a disease related to declined muscle function in a subject, the method comprising administering to the subject an effective amount of a compound having a chemical structure of Formula I and/or Formula VII, or a pharmaceutically acceptable salt or solvate thereof. In some aspects, one or more of the compounds illustrated in FIGS. 1-7, 18, and 19, or a pharmaceutically acceptable salt or solvate thereof is administered. In some embodiments, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, or more of the compounds (or any range derivable therein) illustrated in FIGS. 1-7, 18, and 19 may be excluded. In some instances, muscle function is improved 10000, 1000, 500, 200, 100, 99, 98, 96, 94, 92, 90, 85, 80, 75, 70, 65, 60, 55, 50, 40, 30, 20, 10, or 5%, or any derivable range therein.

Certain embodiments are directed to a method of decreasing the number of degenerating muscle fibers in a subject, or to a method of treatment of a disease related to increased degenerating muscle fibers in a subject, the method comprising administering to the subject an effective amount of a compound having a chemical structure of Formula I and/or Formula VII, or a pharmaceutically acceptable salt or solvate thereof. In some aspects, one or more of the compounds illustrated in FIGS. 1-7, 18, and 19, or a pharmaceutically acceptable salt or solvate thereof is administered. In some embodiments, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, or more of the compounds (or any range derivable therein) illustrated in FIGS. 1-7, 18, and 19 may be excluded. In some instances, the number of degenerating muscle fibers is decreased at least or at most or exactly 100, 99, 98, 96, 94, 92, 90, 85, 80, 75, 70, 65, 60, 55, 50, 40, 30, 20, 10, or 5%, or any derivable range therein.

Certain embodiments are directed to a method of increasing the number of regenerating muscle fibers in a subject, or to a method of treatment of a disease related to decreased regenerating muscle fibers in a subject, the method comprising administering to the subject an effective amount of a compound having a chemical structure of Formula I and/or Formula VII, or a pharmaceutically acceptable salt or solvate thereof. In some aspects, one or more of the compounds illustrated in FIGS. 1-7, 18, and 19, or a pharmaceutically acceptable salt or solvate thereof is administered. In some embodiments, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, or more of the compounds (or any range derivable therein) illustrated in FIGS. 1-7, 18, and 19 may be excluded. In some instances, the number of regenerating muscle fibers is increased 10000, 1000, 500, 200, 100, 99, 98, 96, 94, 92, 90, 85, 80, 75, 70, 65, 60, 55, 50, 40, 30, 20, 10, or 5%, or any derivable range therein.

Certain embodiments are directed to a method of increasing expression of at least one gene selected from the group consisting of myosin light chain-2, Myosin-XVIIIb, Myomesin 3, Lipoprotein lipase, Patatin-Like Phospholipase Domain Containing 2, and Sarcomeric Mitochondrial Creatine Kinase in a subject, the method comprising administering to the subject an effective amount of a compound having a chemical structure of Formula I and/or Formula VII, or a pharmaceutically acceptable salt or solvate thereof. In some aspects, one or more of the compounds illustrated in FIGS. 1-7, 18, and 19, or a pharmaceutically acceptable salt or solvate thereof is administered. In some embodiments, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, or more of the compounds (or any range derivable therein) illustrated in FIGS. 1-7, 18, and 19 may be excluded. In some instances, the expression of the at least one gene is increased 10000, 1000, 500, 200, 100, 99, 98, 96, 94, 92, 90, 85, 80, 75, 70, 65, 60, 55, 50, 40, 30, 20, 10, or 5%, or any derivable range therein.

Certain embodiments are directed to a method of treating a disease related to decreased expression of at least one gene selected from the group consisting of myosin light chain-2, Myosin-XVIIIb, Myomesin 3, Lipoprotein lipase, Patatin-Like Phospholipase Domain Containing 2, and Sarcomeric Mitochondrial Creatine Kinase in a subject, the method comprising administering to the subject an effective amount of a compound having a chemical structure of Formula I and/or Formula VII, or a pharmaceutically acceptable salt or solvate thereof. In some aspects, one or more of the compounds illustrated in FIGS. 1-7, 18, and 19, or a pharmaceutically acceptable salt or solvate thereof is administered. In some embodiments, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, or more of the compounds (or any range derivable therein) illustrated in FIGS. 1-7, 18, and 19 may be excluded. In some instances, the method inhibits and/or decreases a symptom or complication of the disease at least or at most or exactly 100, 99, 98, 96, 94, 92, 90, 85, 80, 75, 70, 65, 60, 55, 50, 40, 30, 20, 10, or 5%, or any derivable range therein.

Certain embodiments are directed to a method for treating a myopathy in a subject, the method comprising administering to the subject an effective amount of a compound having a chemical structure of Formula I and/or Formula VII, or a pharmaceutically acceptable salt or solvate thereof. In some aspects, one or more of the compounds illustrated in FIGS. 1-7, 18, and 19, or a pharmaceutically acceptable salt or solvate thereof is administered. Myopathies include, for example diseases due to mutations in Ryanodine Receptor and/or Dihydropyridine receptor (DHPR) and nemaline myopathy. In some embodiments, the methods are for treating nemaline myopathy. Further examples of myopathies are recited herein. In some embodiments, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, or more of the compounds (or any range derivable therein) illustrated in FIGS. 1-7, 18, and 19 may be excluded. In some instances, the method inhibits and/or decreases a symptom or complication of the myopathy at least or at most or exactly 100, 99, 98, 96, 94, 92, 90, 85, 80, 75, 70, 65, 60, 55, 50, 40, 30, 20, 10, or 5%, or any derivable range therein.

In some embodiments, the muscle mass of the subject is increased relative to the muscle mass prior to administration of a compound having a chemical structure of Formula I and/or Formula VII, or a pharmaceutically acceptable salt or solvate thereof. In some embodiments, the muscle force of the subject is increased relative to the muscle force prior to administration of a compound having a chemical structure of Formula I and/or Formula VII, or a pharmaceutically acceptable salt or solvate thereof. In some embodiments, the muscle function of the subject is improved relative to the muscle function prior to administration of a compound having a chemical structure of Formula I and/or Formula VII, or a pharmaceutically acceptable salt or solvate thereof. In some embodiments, the number of degenerating muscle fibers in a subject are decreased relative to the number of degenerating muscle fibers in a subject prior to administration of a compound having a chemical structure of Formula I and/or Formula VII, or a pharmaceutically acceptable salt or solvate thereof. In some embodiments, the number of regenerating muscle fibers in a subject are increased relative to the number of regenerating muscle fibers in a subject prior to administration of a compound having a chemical structure of Formula I and/or Formula VII, or a pharmaceutically acceptable salt or solvate thereof. In some aspects, one or more of the compounds illustrated in FIGS. 1-7, 18, and 19, or a pharmaceutically acceptable salt or solvate thereof is administered. In some embodiments, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, or more of the compounds (or any range derivable therein) illustrated in FIGS. 1-7, 18, and 19 may be excluded. In some instances, muscle mass is increased 10000, 1000, 500, 200, 100, 99, 98, 96, 94, 92, 90, 85, 80, 75, 70, 65, 60, 55, 50, 40, 30, 20, 10, or 5%, or any derivable range therein.

In some embodiments, the expression of at least one gene selected from the group consisting of myosin light chain-2, Myosin-XVIIIb, Myomesin 3, Lipoprotein lipase, Patatin-Like Phospholipase Domain Containing 2, and Sarcomeric Mitochondrial Creatine Kinase is increased relative to the expression of the gene prior to administration of a compound having a chemical structure of Formula I and/or Formula VII, or a pharmaceutically acceptable salt or solvate thereof. In some aspects, one or more of the compounds illustrated in FIGS. 1-7, 18, and 19, or a pharmaceutically acceptable salt or solvate thereof is administered. In some embodiments, the method further comprises measuring or determining the level of expression of at least one gene selected from the group consisting of myosin light chain-2, Myosin-XVIIIb, Myomesin 3, Lipoprotein lipase, Patatin-Like Phospholipase Domain Containing 2, and Sarcomeric Mitochondrial Creatine Kinase. In some embodiments, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, or more of the compounds (or any range derivable therein) illustrated in FIGS. 1-7, 18, and 19 may be excluded. In some instances, the expression of the at least one gene is increased 10000, 1000, 500, 200, 100, 99, 98, 96, 94, 92, 90, 85, 80, 75, 70, 65, 60, 55, 50, 40, 30, 20, 10, or 5%, or any derivable range therein.

In some embodiments, the subject is human. In some embodiments, the subject has a mutation in the calpain 3 gene. In some embodiments, the subject has been determined to have a mutation in the calpain 3 gene. In some embodiments, the sequence of all or a part of the calpain 3 gene of the subject is determined. In some embodiments, the method further comprises determining whether the calpain 3 gene of the subject is mutated. In some embodiments, the subject is not treating a gastrointestinal disease or condition with lansoprazole or rabeprazole. In some embodiments, the subject is not experiencing any symptoms of a gastrointestinal disease or condition at the time the lansoprazole or rabeprazole is administered. In some embodiments, the subject has been diagnosed with a muscular disorder described herein. In some embodiments, the subject has been determined to be deficient in CaMKII. The deficiency may be determined by measuring CaMKII activity or expression or by determining the activity or expression of CaMKII signaling (by determining the expression or activity of downstream targets) or CaMKII-dependent gene expression. In some embodiments, the method further comprises determining the level of expression or activity of CaMKII. The expression or activity level of genes and/or proteins can be determined by methods known in the art such as, for example, performing a fluorescence in situ hybridization (FISH), comparative genomic hybridization (CGH), real time PCR, southern blot, or western blot analysis. Other applicable methods are known in the art and/or described herein.

In some embodiments, the route of administration is oral, parenteral, subcutaneous, intraperitoneal, or intramuscular. In some embodiments, a compound having a chemical structure of Formula I and/or Formula VII, or a pharmaceutically acceptable salt or solvate thereof is administered locally. In some embodiments, a compound having a chemical structure of Formula I and/or Formula VII, or a pharmaceutically acceptable salt or solvate thereof is administered to muscle tissue. In some embodiments, a compound having a chemical structure of Formula I and/or Formula VII, or a pharmaceutically acceptable salt or solvate thereof is provided over multiple administrations. In some aspects, an effective amount of a compound having the chemical structure provided in FIG. 1A or a pharmaceutically acceptable salt or solvate thereof is administered. In some aspects, an effective amount of a compound having the chemical structure provided in FIG. 1B or a pharmaceutically acceptable salt or solvate thereof is administered. In some aspects, an effective amount of a compound having the chemical structure provided in FIG. 1C or a pharmaceutically acceptable salt or solvate thereof is administered. In some aspects, an effective amount of a compound having the chemical structure provided in FIG. 1D or a pharmaceutically acceptable salt or solvate thereof is administered. In some aspects, an effective amount of a compound having the chemical structure provided in FIG. 1E or a pharmaceutically acceptable salt or solvate thereof is administered. In some aspects, an effective amount of a compound having the chemical structure provided in FIG. 1F or a pharmaceutically acceptable salt or solvate thereof is administered. In some aspects, an effective amount of a compound having the chemical structure provided in FIG. 1G or a pharmaceutically acceptable salt or solvate thereof is administered. In some aspects, an effective amount of a compound having the chemical structure provided in FIG. 1H or a pharmaceutically acceptable salt or solvate thereof is administered. In some aspects, an effective amount of a compound having the chemical structure provided in FIG. 1I or a pharmaceutically acceptable salt or solvate thereof is administered. In some aspects, an effective amount of a compound having the chemical structure provided in FIG. 1J or a pharmaceutically acceptable salt or solvate thereof is administered. In some aspects, an effective amount of a compound having the chemical structure provided in FIG. 1K or a pharmaceutically acceptable salt or solvate thereof is administered. In some aspects, an effective amount of a compound having the chemical structure provided in FIG. 1L or a pharmaceutically acceptable salt or solvate thereof is administered. In some aspects, an effective amount of a compound having the chemical structure provided in FIG. 1M or a pharmaceutically acceptable salt or solvate thereof is administered. In some aspects, an effective amount of a compound having the chemical structure provided in FIG. 1N or a pharmaceutically acceptable salt or solvate thereof is administered. In some aspects, an effective amount of a compound having the chemical structure provided in FIG. 1O or a pharmaceutically acceptable salt or solvate thereof is administered. In some aspects, an effective amount of a compound having the chemical structure provided in FIG. 1P or a pharmaceutically acceptable salt or solvate thereof is administered. In some aspects, an effective amount of a compound having the chemical structure provided in FIG. 1Q or a pharmaceutically acceptable salt or solvate thereof is administered. In some aspects, an effective amount of a compound having the chemical structure provided in FIG. 1R or a pharmaceutically acceptable salt or solvate thereof is administered. In some aspects, an effective amount of a compound having the chemical structure provided in FIG. 1S or a pharmaceutically acceptable salt or solvate thereof is administered. In some aspects, an effective amount of a compound having the chemical structure provided in FIG. 1T or a pharmaceutically acceptable salt or solvate thereof is administered. In some aspects, an effective amount of a compound having the chemical structure provided in FIG. 1U or a pharmaceutically acceptable salt or solvate thereof is administered. In some aspects, an effective amount of a compound having the chemical structure provided in FIG. 1V or a pharmaceutically acceptable salt or solvate thereof is administered. In some aspects, an effective amount of a compound having the chemical structure provided in FIG. 1W or a pharmaceutically acceptable salt or solvate thereof is administered. In some aspects, an effective amount of a compound having the chemical structure provided in FIG. 1X or a pharmaceutically acceptable salt or solvate thereof is administered. In some aspects, an effective amount of a compound having the chemical structure provided in FIG. 1Y or a pharmaceutically acceptable salt or solvate thereof is administered. In some aspects, an effective amount of a compound having the chemical structure provided in FIG. 1Z or a pharmaceutically acceptable salt or solvate thereof is administered. In some aspects, an effective amount of a compound having the chemical structure provided in FIG. 1AA or a pharmaceutically acceptable salt or solvate thereof is administered. In some aspects, an effective amount of a compound having the chemical structure provided in FIG. 1BB or a pharmaceutically acceptable salt or solvate thereof is administered. In some aspects, an effective amount of a compound having the chemical structure provided in FIG. 2A or a pharmaceutically acceptable salt or solvate thereof is administered. In some aspects, an effective amount of a compound having the chemical structure provided in FIG. 2B or a pharmaceutically acceptable salt or solvate thereof is administered. In some aspects, an effective amount of a compound having the chemical structure provided in FIG. 2C or a pharmaceutically acceptable salt or solvate thereof is administered. In some aspects, an effective amount of a compound having the chemical structure provided in FIG. 3 or a pharmaceutically acceptable salt or solvate thereof is administered. In some aspects, an effective amount of a compound having the chemical structure provided in FIG. 4A or a pharmaceutically acceptable salt or solvate thereof is administered. In some aspects, an effective amount of a compound having the chemical structure provided in FIG. 4B or a pharmaceutically acceptable salt or solvate thereof is administered. In some aspects, an effective amount of a compound having the chemical structure provided in FIG. 4C or a pharmaceutically acceptable salt or solvate thereof is administered. In some aspects, an effective amount of a compound having the chemical structure provided in FIG. 4D or a pharmaceutically acceptable salt or solvate thereof is administered. In some aspects, an effective amount of a compound having the chemical structure provided in FIG. 4E or a pharmaceutically acceptable salt or solvate thereof is administered. In some aspects, an effective amount of a compound having the chemical structure provided in FIG. 4F or a pharmaceutically acceptable salt or solvate thereof is administered. In some aspects, an effective amount of a compound having the chemical structure provided in FIG. 4G or a pharmaceutically acceptable salt or solvate thereof is administered. In some aspects, an effective amount of a compound having the chemical structure provided in FIG. 5A or a pharmaceutically acceptable salt or solvate thereof is administered. In some aspects, an effective amount of a compound having the chemical structure provided in FIG. 5B or a pharmaceutically acceptable salt or solvate thereof is administered. In some aspects, an effective amount of a compound having the chemical structure provided in FIG. 6A or a pharmaceutically acceptable salt or solvate thereof is administered. In some aspects, an effective amount of a compound having the chemical structure provided in FIG. 6B or a pharmaceutically acceptable salt or solvate thereof is administered. In some aspects, an effective amount of a compound having the chemical structure provided in FIG. 7A or a pharmaceutically acceptable salt or solvate thereof is administered. In some aspects, an effective amount of a compound having the chemical structure provided in FIG. 7B or a pharmaceutically acceptable salt or solvate thereof is administered. In some aspects, an effective amount of a compound having the chemical structure provided in FIG. 18A or a pharmaceutically acceptable salt or solvate thereof is administered. In some aspects, an effective amount of a compound having the chemical structure provided in FIG. 18B or a pharmaceutically acceptable salt or solvate thereof is administered. In some aspects, an effective amount of a compound having the chemical structure provided in FIG. 18C or a pharmaceutically acceptable salt or solvate thereof is administered. In some aspects, an effective amount of a compound having the chemical structure provided in FIG. 18D or a pharmaceutically acceptable salt or solvate thereof is administered. In some aspects, an effective amount of a compound having the chemical structure provided in FIG. 18E or a pharmaceutically acceptable salt or solvate thereof is administered. In some aspects, an effective amount of a compound having the chemical structure provided in FIG. 19A or a pharmaceutically acceptable salt or solvate thereof is administered. In some aspects, an effective amount of a compound having the chemical structure provided in FIG. 19B or a pharmaceutically acceptable salt or solvate thereof is administered. In some aspects, an effective amount of a compound having the chemical structure provided in FIG. 19C or a pharmaceutically acceptable salt or solvate thereof is administered. In some aspects, an effective amount of a compound having the chemical structure provided in FIG. 19D or a pharmaceutically acceptable salt or solvate thereof is administered. In some aspects, an effective amount of a compound having the chemical structure provided in FIG. 19E or a pharmaceutically acceptable salt or solvate thereof is administered. In some aspects, an effective amount of a compound having the chemical structure provided in FIG. 19F or a pharmaceutically acceptable salt or solvate thereof is administered. In some aspects, an effective amount of a compound having the chemical structure provided in FIG. 19G or a pharmaceutically acceptable salt or solvate thereof is administered. In some aspects, an effective amount of a compound having the chemical structure provided in FIG. 19H or a pharmaceutically acceptable salt or solvate thereof is administered. In some aspects, an effective amount of a compound having the chemical structure provided in FIG. 19I or a pharmaceutically acceptable salt or solvate thereof is administered. In some aspects, an effective amount of a compound having the chemical structure provided in FIG. 19J or a pharmaceutically acceptable salt or solvate thereof is administered. In some aspects, an effective amount of a compound having the chemical structure provided in FIG. 19K or a pharmaceutically acceptable salt or solvate thereof is administered. In some aspects, an effective amount of a compound having the chemical structure provided in FIG. 19L or a pharmaceutically acceptable salt or solvate thereof is administered. In some aspects, an effective amount of a compound having the chemical structure provided in FIG. 19M or a pharmaceutically acceptable salt or solvate thereof is administered. In some aspects, an effective amount of a compound having the chemical structure provided in FIG. 19N or a pharmaceutically acceptable salt or solvate thereof is administered. In some aspects, an effective amount of a compound having the chemical structure provided in FIG. 19O or a pharmaceutically acceptable salt or solvate thereof is administered. In some aspects, an effective amount of a compound having the chemical structure provided in FIG. 19P or a pharmaceutically acceptable salt or solvate thereof is administered. In some aspects, a combination of the compounds of the disclosure is administered. In some embodiments, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, or more of the compounds (or any range derivable therein) may be excluded.

Other embodiments are directed to any of the compounds illustrated in FIGS. 1-7, 18, and 19. In some embodiments, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, or more of the compounds (or any range derivable therein) illustrated in FIGS. 1-7, 18, and 19 may be excluded.

In the context of the present invention, at least the following 62 embodiments are disclosed. Embodiment 1 is directed to a compound having a chemical structure of Formula I Formula I

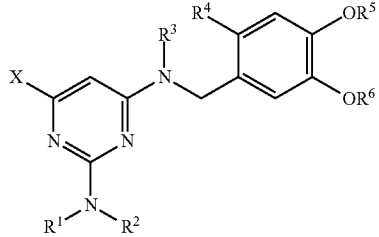

wherein R¹ and R² are independently H, alkyl, substituted alkyl, aryl, or R¹ and R² join to form a 4- to 6-membered heterocyclic ring; R³ and R⁴ are independently selected from H, alkyl, substituted alkyl, aryl, or R³ and R⁴ are bonds forming a 5-membered heterocyclic ring, or R³ and R⁴ join to form a 6-membered heterocyclic ring; R⁵ and R⁶ are independently selected from H, alkyl, substituted alkyl, aryl, or R⁵ and R⁶ are bonds forming a 5-membered heterocyclic ring, or R⁵ and R⁶ join to form a 6-membered heterocyclic ring; and X is a group having a chemical structure of Formula II, Formula III, Formula IV, or Formula V, Formula II

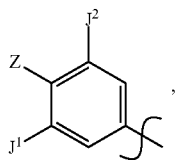

wherein Z is H, alkyl, substituted alkyl, aryl, $OR^7$, or $NR^8R^9$; wherein $R^7$ is H, alkyl, haloalkyl, substituted alkyl, or aryl; $R^8$ and $R^9$ are independently H, alkyl, substituted alkyl, aryl, or $R^8$ and $R^9$ join to a form 4- to 6-membered heterocyclic ring, wherein $J^1$ is selected from H, alkyl or $OR^{10}$; wherein $R^{10}$ is H, alkyl, haloalkyl, substituted alkyl, aryl, or $((CH_2)_nO)_pCH_2CH_2R^{11}$, wherein n is 1, 2, or 3; p is 0, 1, 2, 3, 4, 5, 6, 7, 8, 9, or 10; and $R^{11}$ is OH, $NH_2$, or alkoxy, wherein $J^2$ is selected from H, alkyl or $OR^{12}$; wherein $R^{12}$ is H, alkyl, haloalkyl, substituted alkyl, aryl, or $((CH_2)_nO)_pCH_2CH_2R^{13}$, wherein n is 1, 2, or 3; p is 0, 1, 2, 3, 4, 5, 6, 7, 8, 9, or 10; and $R^{13}$ is OH, $NH_2$, or alkoxy, Formula III

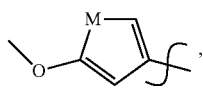

wherein M is O, NH, or $CH_2$,

Formula IV

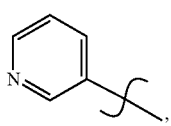

Formula V

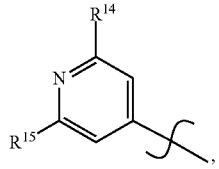

wherein $R^{14}$ is H or alkoxy and $R^{15}$ is H or alkoxy, and wherein Formula I is not Formula VI Formula VI

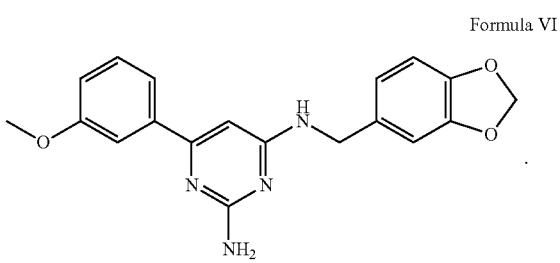 [SMILES: COc1cccc(-c2cc(NCc3ccc4c(c3)OCO4)nc(N)n2)c1]

Embodiment 2 is directed to the compound of embodiment 1, wherein $R^1$ is H, $R^2$ is H, $R^3$ is H, $R^4$ is H, $R^5$ and $R^6$ are bonds forming a 5-membered heterocyclic ring, and X is Formula II. Embodiment 3 is directed to the compound of embodiment 1, wherein $R^1$ is H, $R^2$ is H, $R^3$ is H, $R^4$ is H, $R^5$ and $R^6$ are bonds forming a 5-membered heterocyclic ring, X is Formula II, Z is H, $J^2$ is H and $J^1$ is $OR^{10}$. Embodiment 4 is directed to the compound of embodiment 3, wherein $R^{10}$ is H, $CF_3$, $CH_2CH_3$, $CH(CH_3)_2$, $CH_2CH_2CH_3$, $CH_2CH_2OCH_3$, $CH_2CH_2OCH_2CH_2NH_2$, $CH_2CH_2OCH_2CH_2OCH_2CH_2OCH_3$. $CH_2NH_2$, $CH_2CH_2NH_2$, or $CH_2CONH_2$. Embodiment 5 is directed to the compound of any one of embodiments 1 to 4, further comprising a pharmaceutically acceptable carrier. Embodiment 6 is directed to a method of treating muscular dystrophy in a subject, the method comprising administering to the subject an effective amount of a compound of any one of embodiments 1 to 4, or a pharmaceutically acceptable salt or solvate thereof. Embodiment 7 is directed to the method of embodiment 6, wherein the type of muscular dystrophy is limb girdle muscular dystrophy. Embodiment 8 is directed to the method of embodiment 6, wherein the type of muscular dystrophy is limb girdle muscular dystrophy type 2A/R1/D1. Embodiment 9 is directed to a method of treating muscular atrophy in a subject, the method comprising administering to the subject an effective amount of a compound of any one of embodiment 1 to 4, or a pharmaceutically acceptable salt or solvate thereof. Embodiment 10 is directed to the method of embodiment 9, the wherein the subject has been determined to have muscle atrophy or be at risk for muscle atrophy. Embodiment 11 is directed to the method of any one of embodiments 9 to 10, wherein the subject has been tested for muscle atrophy or a disease that causes or is associated with muscle atrophy. Embodiment 12 is directed to the method of any one of embodiments 9 to 11, wherein the subject has previously been treated with one or more therapies for muscle atrophy. Embodiment 13 is directed to the method of embodiment 12, wherein one or more of the therapies for muscle atrophy is a prescribed chemical treatment. Embodiment 14 is directed to a method for treating cachexia or sarcopenia in a subject, the method comprising administering to the subject an effective amount of a compound of any one of embodiments 1 to 4, or a pharmaceutically acceptable salt or solvate thereof. Embodiment 15 is directed to the method of embodiment 14, wherein the subject has been diagnosed with cancer. Embodiment 16 is directed to the method of any one of embodiments 14 or 15, wherein the subject has been prescribed bed rest. Embodiment 17 is directed to the method of any one of embodiments 14 to 16, wherein the subject has been diagnosed with age-related sarcopenia. Embodiment 18 is directed to a method of increasing muscle mass in a subject, the method comprising administering to the subject an effective amount of a compound of any one of embodiments 1 to 4, or a pharmaceutically acceptable salt or solvate thereof. Embodiment 19 is directed to a method of increasing muscle force in a subject, the method comprising administering to the subject an effective amount of a compound of any one of embodiments 1 to 4, or a pharmaceutically acceptable salt or solvate thereof. Embodiment 20 is directed to a method of improving muscle function in a subject, the method comprising administering to the subject an effective amount of a compound of any one of embodiments 1 to 4, or a pharmaceutically acceptable salt or solvate thereof. Embodiment 21 is directed to a method of decreasing a number of degenerating muscle fibers in a subject, the method comprising administering to the subject an effective amount of a compound of any one of embodiments 1 to 4, or a pharmaceutically acceptable salt or solvate thereof. Embodiment 22 is directed to a method of increasing a number of regenerating muscle fibers in a subject, the method comprising administering to the subject an effective amount of a compound of any one of embodiments 1 to 4, or a pharmaceutically acceptable salt or solvate thereof. Embodiment 23 is directed to a method of increasing expression of at least one gene selected from the group consisting of myosin light chain-2, Myosin-XVIIIb, Myomesin 3, Lipoprotein lipase, Patatin-Like Phospholipase Domain Containing 2, and Sarcomeric Mitochondrial Creatine Kinase in a subject, the method comprising administering to the subject an effective amount of a compound of any one of embodiments 1 to 4, or a pharmaceutically acceptable salt or solvate thereof. Embodiment 24 is directed to the method of any one of embodiments 6 to 23, wherein the subject has a mutation in the calpain 3 gene. Embodiment 25 is directed to the method of any one of embodiments 6 to 24, wherein the subject has been determined to be deficient in CaMKII. Embodiment 26 is directed to the method of any one of embodiments 6 to 25, wherein the method further comprises determining the level of expression or activity of CaMKII. Embodiment 27 is directed to the method of any one of embodiments 6 to 26, wherein the compound is administered orally, parenterally, subcutaneously, intraperitoneally, or intramuscularly. Embodiment 28 is directed to the method of any one of embodiments 6 to 27, wherein the compound is administered locally. Embodiment 29 is directed to the method of embodiment 28, wherein the compound is administered to a muscle tissue. Embodiment 30 is directed to the method of any one of embodiments 6 to 29, wherein the subject is human.

Embodiment 31 is directed to a compound having a chemical structure of Formula VII

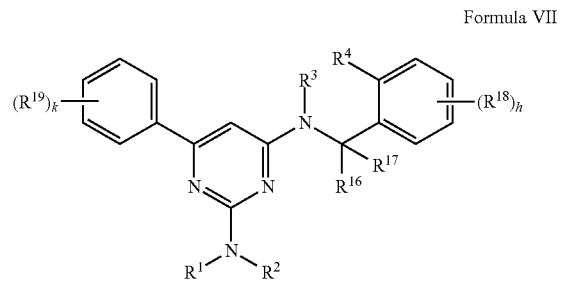

Formula VII wherein
wherein $R^1$ and $R^2$ are independently H, alkyl, substituted alkyl, aryl, or $R^1$ and $R^2$ join to form a 4- to 6-membered heterocyclic ring; $R^3$ and $R^4$ are independently selected from H, alkyl, substituted alkyl, aryl, or $R^3$ and $R^4$ are bonds forming a 5-membered heterocyclic ring, or $R^3$ and $R^4$ join to form a 6-membered heterocyclic ring; $R^{16}$ and $R^{17}$ are independently selected from H, alkyl, substituted alkyl, aryl, or $R^{16}$ and $R^{17}$ join to form a 4- to 8-membered cycloalkyl or heterocyclic ring; each $R^{18}$ is independently alkyl, substituted alkyl, heteroalkyl, cycloalkyl, aryl or heteroaryl; each $R^{19}$ is independently alkyl, substituted alkyl, heteroalkyl, cycloalkyl, aryl or heteroaryl; h is 0, 1, 2, 3 or 4; k is 1, 2, 3, 4 or 5,
wherein Formula VII is not Formula VI,

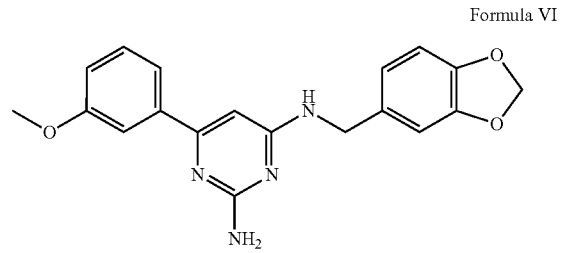 [SMILES: COc1cccc(-c2cc(NCc3ccc4c(c3)OCO4)nc(N)n2)c1]

Formula VI

Embodiment 32 is directed to the compound of embodiment 31, having a chemical structure of Formula I

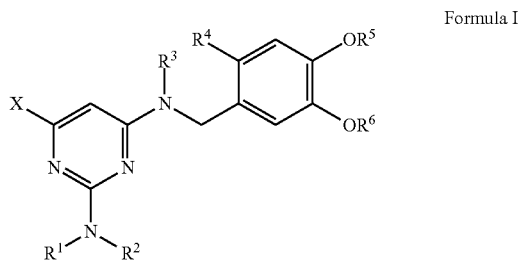

Formula I wherein $R^1$ and $R^2$ are independently H, alkyl, substituted alkyl, aryl, or $R^1$ and $R^2$ join to form a 4- to 6-membered heterocyclic ring; $R^3$ and $R^4$ are independently selected from H, alkyl, substituted alkyl, aryl, or $R^3$ and $R^4$ are bonds forming a 5-membered heterocyclic ring, or $R^3$ and $R^4$ join to form a 6-membered heterocyclic ring; $R^5$ and $R^6$ are independently selected from H, alkyl, substituted alkyl, aryl, or $R^5$ and $R^6$ are bonds forming a 5-membered heterocyclic ring, or $R^5$ and $R^6$ join to form a 6-membered heterocyclic ring; and X is a group having a chemical structure of Formula II, Formula III, Formula IV, or Formula V, Formula II

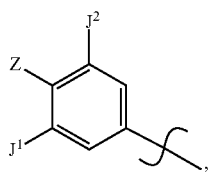

wherein Z is H, alkyl, substituted alkyl, aryl, $OR^7$, or $NR^8R^9$; wherein $R^7$ is H, alkyl, haloalkyl, substituted alkyl, or aryl; $R^8$ and $R^9$ are independently H, alkyl, substituted alkyl, aryl, or $R^8$ and $R^9$ join to a form 4- to 6-membered heterocyclic ring, wherein $J^1$ is selected from H, alkyl or $OR^{10}$; wherein $R^{10}$ is H, alkyl, haloalkyl, substituted alkyl, aryl, or $((CH_2)_nO)_pCH_2CH_2R^{11}$, wherein n is 1, 2, or 3; p is 0, 1, 2, 3, 4, 5, 6, 7, 8, 9, or 10; and $R^{11}$ is OH, $NH_2$, or alkoxy, wherein $J^2$ is selected from H, alkyl or $OR^{12}$; wherein $R^{12}$ is H, alkyl, haloalkyl, substituted alkyl, aryl, or $((CH_2)_nO)_pCH_2CH_2R^{13}$, wherein n is 1, 2, or 3; p is 0, 1, 2, 3, 4, 5, 6, 7, 8, 9, or 10; and $R^{13}$ is OH, $NH_2$, or alkoxy, Formula III

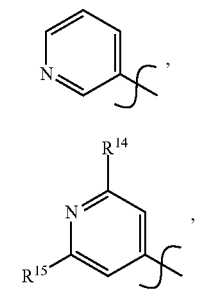

wherein M is O, NH, or $CH_2$,

Formula IV wherein $R^{14}$ is H or alkoxy and $R^{15}$ is H or alkoxy. Embodiment 33 is directed to the compound of embodiment 32, wherein $R^1$ is H, $R^2$ is H, $R^3$ is H, $R^4$ is H, $R^5$ and $R^6$ are bonds forming a 5-membered heterocyclic ring, and X is Formula II. Embodiment 34 is directed to the compound of embodiment 32, wherein $R^1$ is H, $R^2$ is H, $R^3$ is H, $R^4$ is H, $R^5$ and $R^6$ are bonds forming a 5-membered heterocyclic ring, X is Formula II, Z is H, $J^2$ is H and $J^1$ is $OR^{10}$. Embodiment 35 is directed to the compound of embodiment 34, wherein $R^{10}$ is H, $CF_3$, $CH_2CH_3$, $CH(CH_3)_2$, $CH_2CH_2CH_3$, $CH_2CH_2OCH_3$, $CH_2CH_2OCH_2CH_2NH_2$, $CH_2CH_2OCH_2CH_2OCH_2CH_2OCH_3$, $CH_2NH_2$, $CH_2CH_2NH_2$, or $CH_2CONH_2$. Embodiment 36 is directed to the compound of embodiment 31, wherein the compound is any one of the compounds of FIGS. 1-7, 18, and 19, such as any one of AMBMP analog 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, such as any one of AMBMP analog 1, 2, 3, 4, 5, 6, 8, 17, 21, 25, 38, 39, or 40. Embodiment 37 is directed to a composition comprising a compound of any one of embodiments 31 to 36, further comprising a pharmaceutically acceptable carrier. Embodiment 38 is directed to a method of treating muscular dystrophy in a subject, the method comprising administering to the subject an effective amount of a compound of any one of embodiments 31 to 36, or a pharmaceutically acceptable salt or solvate thereof. Embodiment 39 is directed to the method of embodiment 38, wherein the type of muscular dystrophy is limb girdle muscular dystrophy. Embodiment 39 is directed to the method of embodiment 38, wherein the type of muscular dystrophy is limb girdle muscular dystrophy type 2A/R1/D1. Embodiment 40 is directed to a method of treating muscular atrophy in a subject, the method comprising administering to the subject an effective amount of a compound of any one of embodiments 31 to 36, or a pharmaceutically acceptable salt or solvate thereof. Embodiment 42 is directed to the method of embodiment 41, the wherein the subject has been determined to have muscle atrophy or be at risk for muscle atrophy. Embodiment 43 is directed to the method of any one of embodiments 41 to 42, wherein the subject has been tested for muscle atrophy or a disease that causes or is associated with muscle atrophy. Embodiment 44 is directed to the method of any one of embodiments 41 to 43, wherein the subject has previously been treated with one or more therapies for muscle atrophy. Embodiment 45 is directed to the method of embodiment 44, wherein one or more of the therapies for muscle atrophy is a prescribed chemical treatment. Embodiment 46 is directed to a method for treating cachexia or sarcopenia in a subject, the method comprising administering to the subject an effective amount of a compound of any one of embodiments 31 to 36, or a pharmaceutically acceptable salt or solvate thereof. Embodiment 47 is directed to the method of embodiment 46, wherein the subject has been diagnosed with cancer. Embodiment 48 is directed to the method of embodiment 46 or 47, wherein the subject has been prescribed bed rest. Embodiment 49 is directed to the method of any one of embodiments 46 to 48, wherein the subject has been diagnosed with age-related sarcopenia. Embodiment 50 is directed to a method of increasing muscle mass in a subject, the method comprising administering to the subject an effective amount of a compound of any one of embodiments 31 to 36, or a pharmaceutically acceptable salt or solvate thereof. Embodiment 51 is directed to a method of increasing muscle force in a subject, the method comprising administering to the subject an effective amount of a compound of any one of embodiments 31 to 36, or a pharmaceutically acceptable salt or solvate thereof. Embodiment 52 is directed to a method of improving muscle function in a subject, the method comprising administering to the subject an effective amount of a compound of any one of embodiments 31 to 36, or a pharmaceutically acceptable salt or solvate thereof. Embodiment 53 is directed to a method of decreasing a number of degenerating muscle fibers in a subject, the method comprising administering to the subject an effective amount of a compound of any one of embodiments 31 to 36, or a pharmaceutically acceptable salt or solvate thereof. Embodiment 54 is directed to a method of increasing a number of regenerating muscle fibers in a subject, the method comprising administering to the subject an effective amount of a compound of any one of embodiments 31 to 36, or a pharmaceutically acceptable salt or solvate thereof. Embodiment 55 is directed to a method of increasing expression of at least one gene selected from the group consisting of myosin light chain-2, Myosin-XVIIIb, Myomesin 3, Lipoprotein lipase, Patatin-Like Phospholipase Domain Containing 2, and Sarcomeric Mitochondrial Creatine Kinase in a subject, the method comprising administering to the subject an effective amount of a compound of any one of embodiments 31 to 36, or a pharmaceutically acceptable salt or solvate thereof. Embodiment 56 is directed to the method of any one of embodiments 38 to 55, wherein the subject has a mutation in the calpain 3 gene. Embodiment 57 is directed to the method of any one of embodiments 38 to 56, wherein the subject has been determined to be deficient in CaMKII. Embodiment 58 is directed to the method of any one of embodiments 38 to 57, wherein the method further comprises determining the level of expression or activity of CaMKII. Embodiment 59 is directed to the method of any one of embodiments 38 to 58, wherein the compound is administered orally, parenterally, subcutaneously, intraperitoneally, or intramuscularly. Embodiment 60 is directed to the method of any one of embodiments 38 to 59, wherein the compound is administered locally. Embodiment 61 is directed to the method of embodiment 60, wherein the compound is administered to a muscle tissue. Embodiment 62 is directed to the method of any one of embodiments 38 to 61, wherein the subject is human.

A "subject," "individual" or "patient" is used interchangeably herein and refers to a vertebrate, for example a primate, a mammal or a human. Mammals include, but are not limited to equines, canines, bovines, ovines, murines, rats, simians, humans, farm animals, sport animals, and pets. Also intended to be included as a subject are any subjects involved in clinical research trials not showing any clinical sign of disease, or subjects involved in epidemiological studies, or subjects used as controls.

As used herein, the term "comprising" is intended to mean that the compositions and methods include the recited elements, but not excluding others. "Consisting essentially of" when used to define compositions and methods, shall mean excluding other elements of any essential significance to the combination for the stated purpose. "Consisting essentially of" in the context of pharmaceutical compositions of the disclosure is intended to include all the recited active agents and excludes any additional non-recited active agents, but does not exclude other components of the composition that are not active ingredients. Thus, a composition consisting essentially of the elements as defined herein would not exclude trace contaminants from the isolation and purification method and pharmaceutically acceptable carriers, such as phosphate buffered saline, preservatives, and the like. "Consisting of" shall mean excluding more than trace elements of other ingredients and substantial method steps for administering the compositions of this invention or process steps to produce a composition or achieve an intended result. Embodiments defined by each of these transition terms are within the scope of this invention.

The terms "ameliorating," "inhibiting," or "reducing," or any variation of these terms, when used in the claims and/or the specification includes any measurable decrease or complete inhibition to achieve a desired result.

As used herein, "treating," "treatment" or "therapy" is an approach for obtaining beneficial or desired clinical results. This includes: reduce the alleviation of symptoms or any relevant result described throughout the disclosure, including the examples. Furthermore, these terms are intended to encompass curing as well as ameliorating at least one symptom of the condition or disease.

Use of the one or more compositions may be employed based on methods described herein. Use of one or more compositions may be employed in the preparation of medicaments for treatments according to the methods described herein. Other embodiments are discussed throughout this application. Any embodiment discussed with respect to one aspect of the disclosure applies to other aspects of the disclosure as well and vice versa. The embodiments in the Example section are understood to be embodiments that are applicable to all aspects of the technology described herein.

As used herein, the terms "or" and "and/or" are utilized to describe multiple components in combination or exclusive of one another. For example, "x, y, and/or z" can refer to "x" alone, "y" alone, "z" alone, "x, y, and z," "(x and y) or z," "x or (y and z)," or "x or y or z." It is specifically contemplated that x, y, or z may be specifically excluded from an embodiment.

Throughout this application, the term "about" is used according to its plain and ordinary meaning in the area of cell biology to indicate that a value includes the standard deviation of error for the device or method being employed to determine the value.

The term "comprising," which is synonymous with "including," "containing," or "characterized by," is inclusive or open-ended and does not exclude additional, unrecited elements or method steps. The phrase "consisting of" excludes any element, step, or ingredient not specified. The phrase "consisting essentially of" limits the scope of described subject matter to the specified materials or steps and those that do not materially affect its basic and novel characteristics. It is contemplated that embodiments described in the context of the term "comprising" may also be implemented in the context of the term "consisting of" or "consisting essentially of."

It is specifically contemplated that any limitation discussed with respect to one embodiment of the invention may apply to any other embodiment of the invention. Furthermore, any composition of the invention may be used in any method of the invention, and any method of the invention may be used to produce or to utilize any composition of the invention. Aspects of an embodiment set forth in the Examples are also embodiments that may be implemented in the context of embodiments discussed elsewhere in a different Example or elsewhere in the application, such as in the Summary of Invention, Detailed Description of the Embodiments, Claims, and description of Figure Legends.

The term "therapeutically effective amount" refers to an amount of the drug that treats or inhibits a disease or condition. In some embodiments, the therapeutically effective amount inhibits at least or at most or exactly 100, 99, 98, 96, 94, 92, 90, 85, 80, 75, 70, 65, 60, 55, 50, 40, 30, 20, or 10%, or any derivable range therein, of the activity and/or expression of a protein and/or gene described herein. In some embodiments, the therapeutically effective amount increases at least or at most or exactly 10000, 1000, 500, 200, 100, 99, 98, 96, 94, 92, 90, 85, 80, 75, 70, 65, 60, 55, 50, 40, 30, 20, or 10%, or any derivable range therein, of the activity and/or expression of a protein and/or gene described herein.

The use of the word "a" or "an" when used in conjunction with the term "comprising" in the claims and/or the specification may mean "one," but it is also consistent with the meaning of "one or more," "at least one," and "one or more than one."

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DESCRIPTION OF ILLUSTRATIVE EMBODIMENTS

I. Compounds

Figure 1:
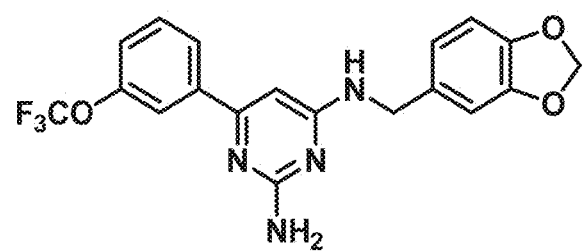
FIG. 1: A) AMBMP analog 1; B) AMBMP analog 2; C) AMBMP analog 3; D) AMBMP analog 4; E) AMBMP analog 5; F) AMBMP analog 6; G) AMBMP analog 7; H) AMBMP analog 8; I) AMBMP analog 9; J) AMBMP analog 10; K) AMBMP analog 11; L) AMBMP analog 12; M) AMBMP analog 13; N) AMBMP analog 14; O) AMBMP analog 15; P) AMBMP analog 16; Q) AMBMP analog 17; R) AMBMP analog 18; S) AMBMP analog 19; T) AMBMP analog 20; U) AMBMP analog 21; V) AMBMP analog 39; W) AMBMP analog 40; X) AMBMP analog 41; Y) AMBMP analog 42; Z) AMBMP analog 43; AA) AMBMP analog 44; BB) AMBMP analog 45.
Figure 1:
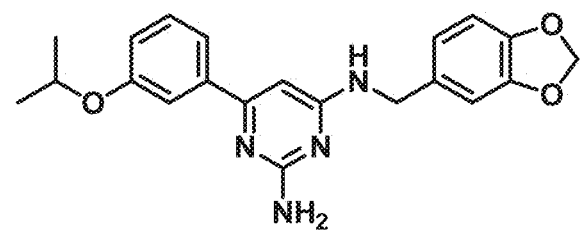
Figure 1:
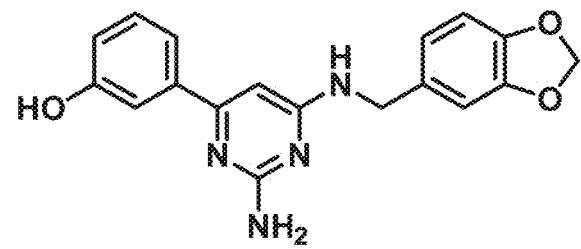
Figure 1:
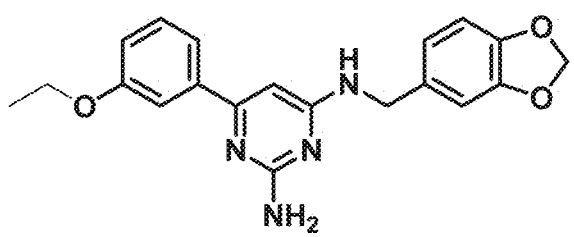
Figure 1:
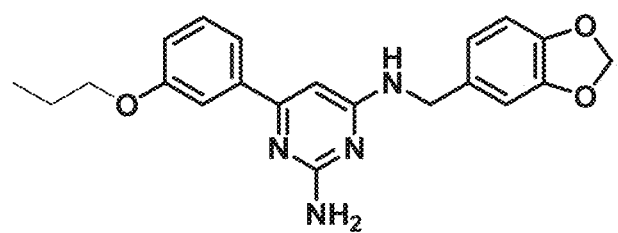
Figure 1:
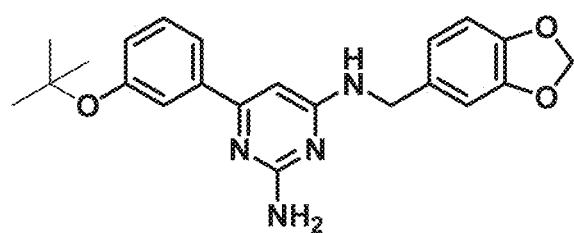
Figure 1:
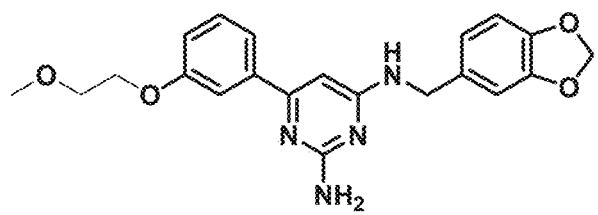
Figure 1:
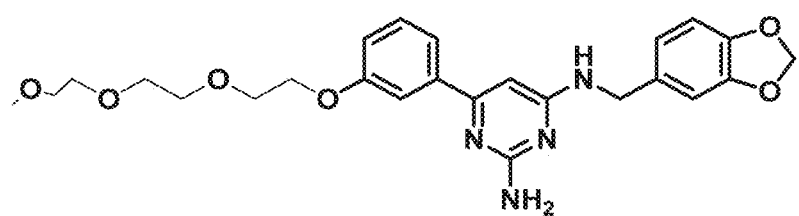
Figure 1:
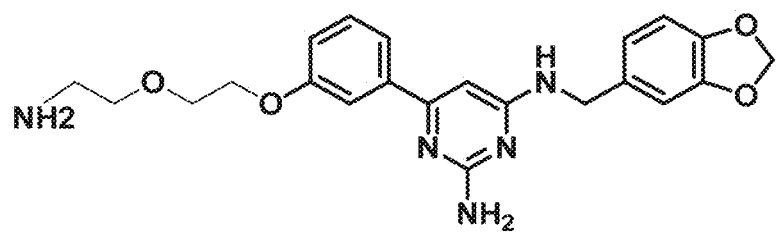
Figure 1:
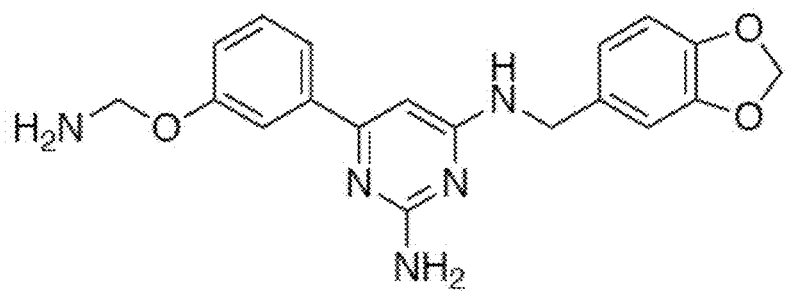
Figure 1:
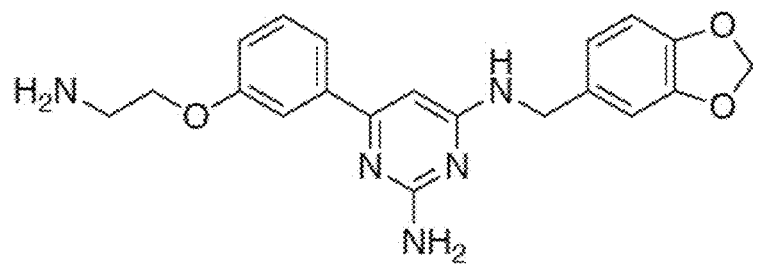
Figure 1:
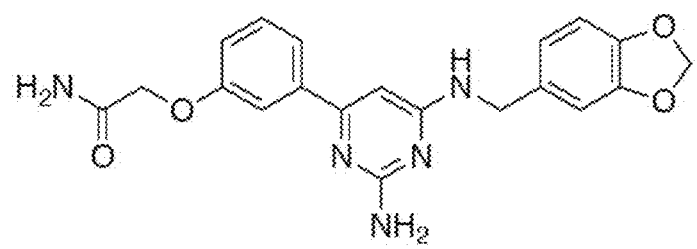
Figure 1:
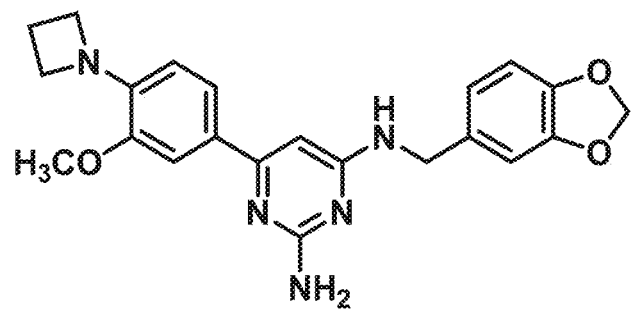
Figure 1:
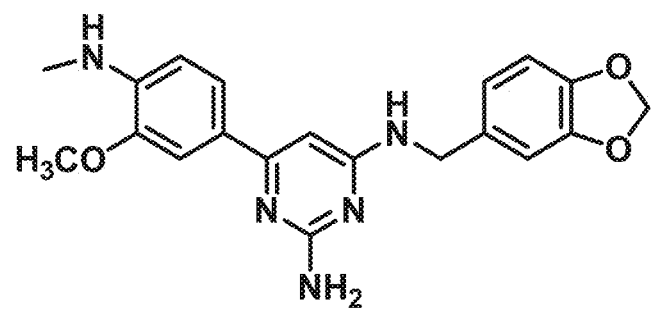
Figure 1:
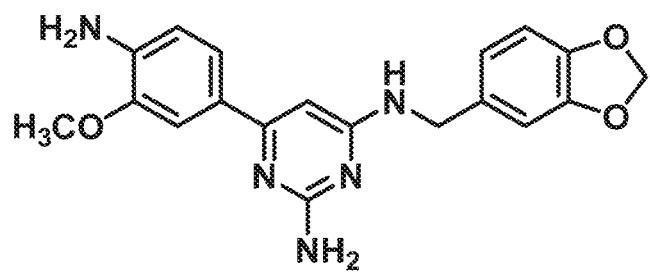
Figure 1:
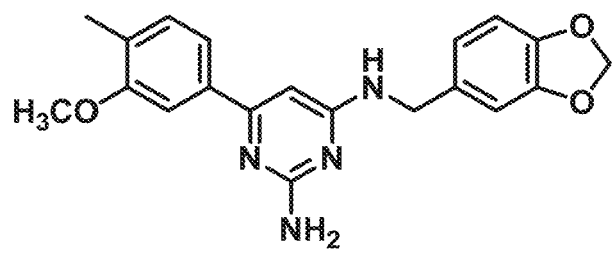
Figure 1:
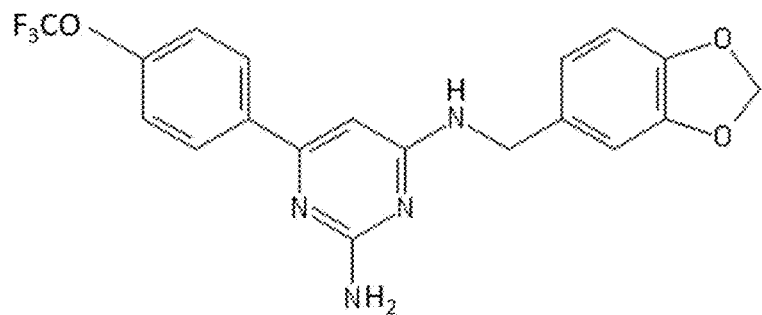
Figure 1:
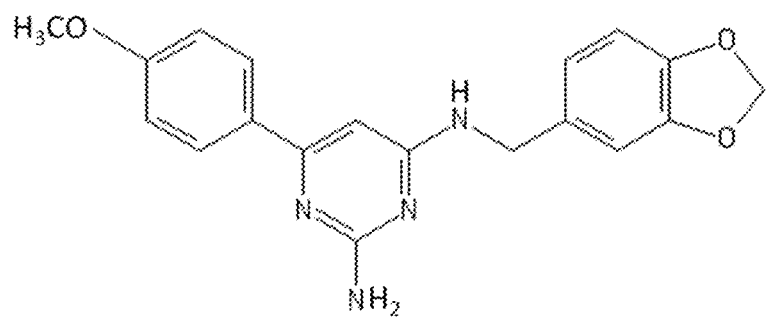
Figure 1:
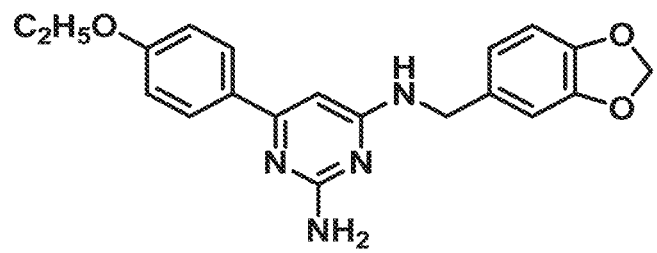
Figure 1:
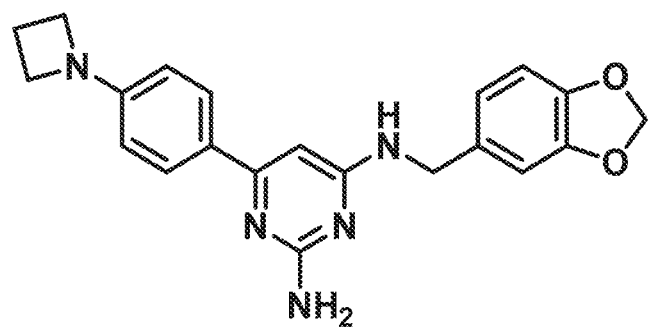
Figure 1:
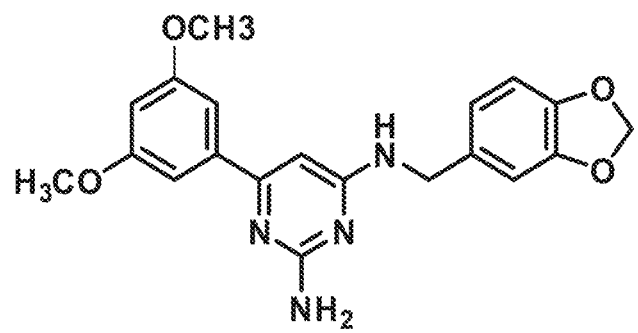
Figure 1:
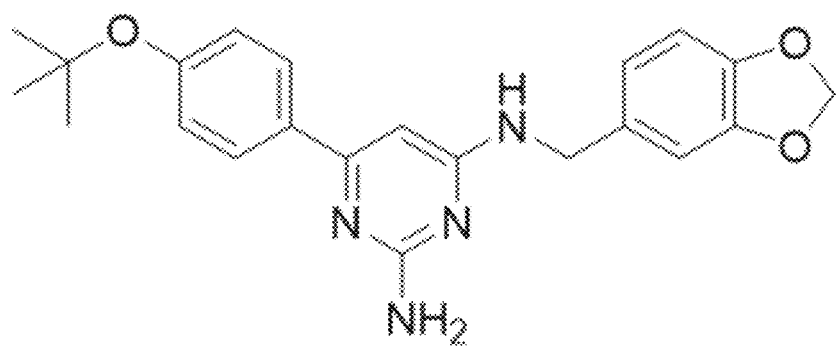
Figure 1:
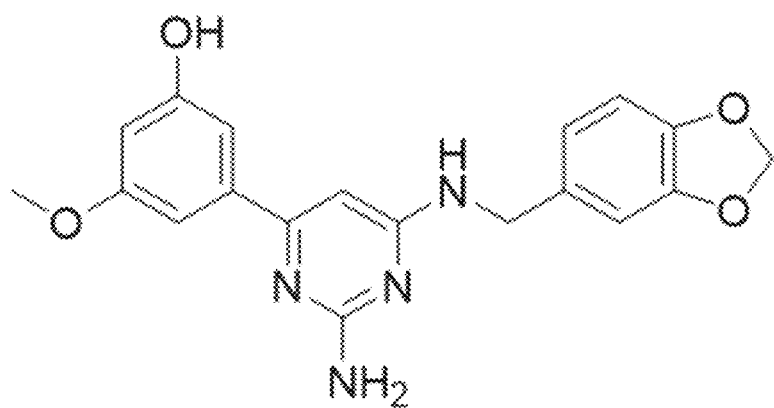
Figure 1:
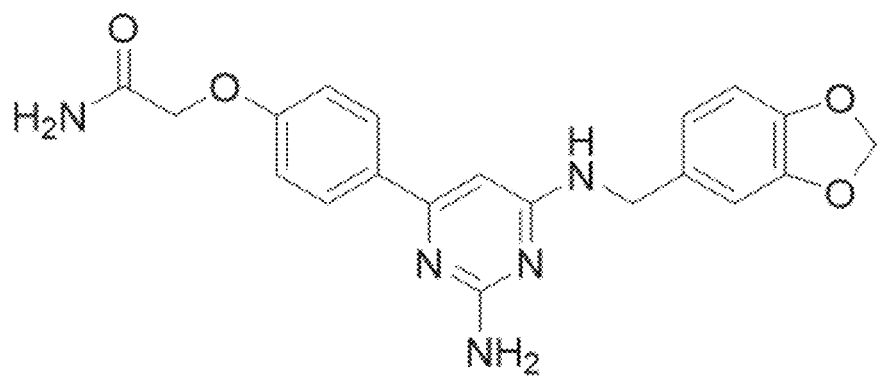
Figure 1:
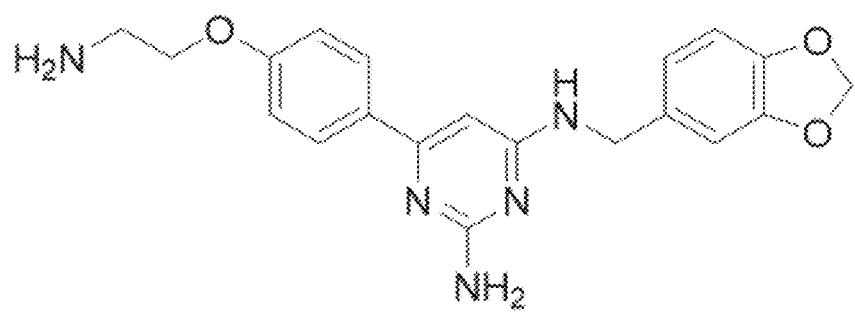
Figure 1:
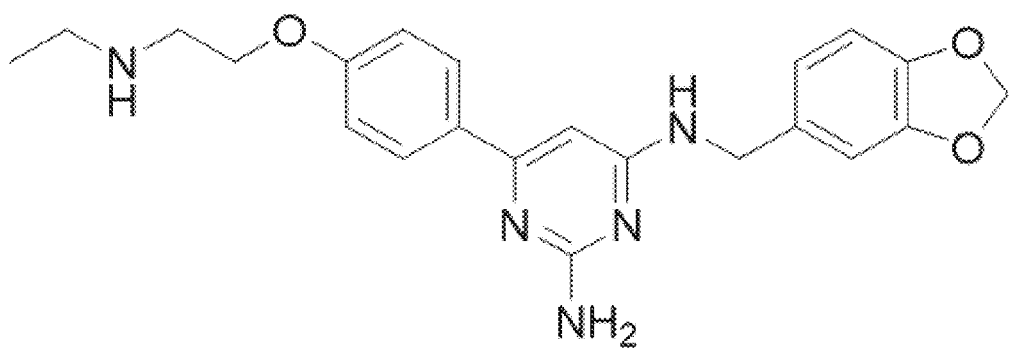
Figure 1:
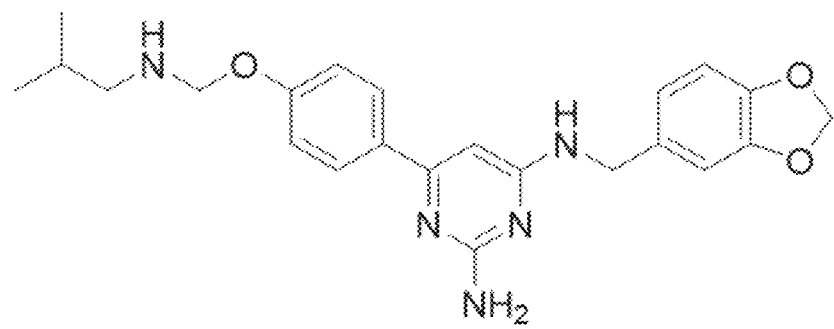
Figure 1:
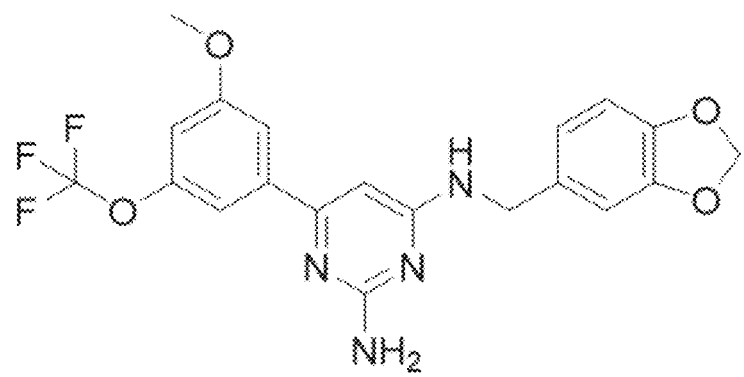
Figure 2:
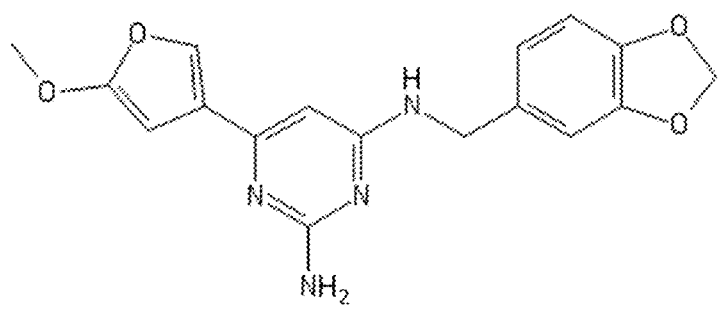
FIG. 2: A) AMBMP analog 22 where M=O; B) AMBMP analog 23 where M=NH; C) AMBMP analog 24 where M=CH$_2$.
Figure 2:
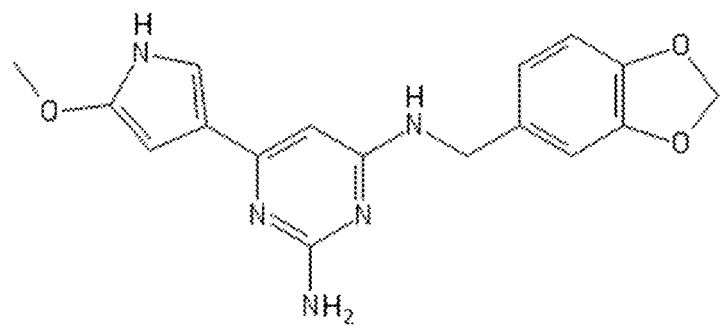
Figure 2:
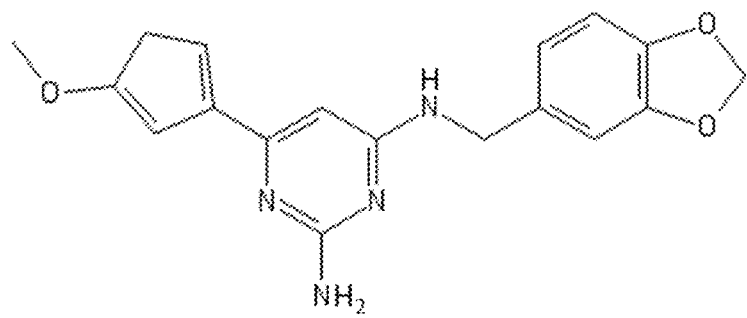
Figure 3:
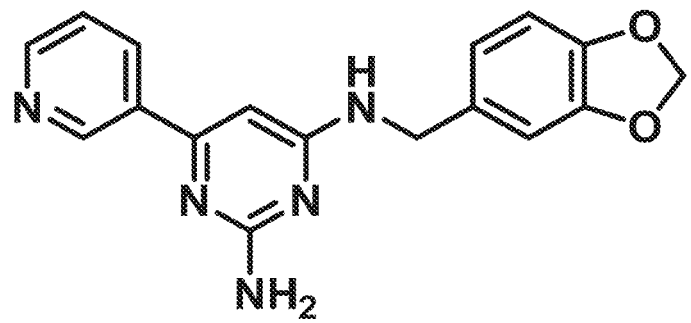
FIG. 3: AMBMP analog 25.
Figure 4:
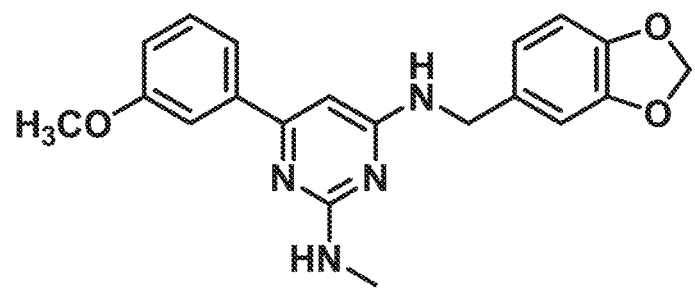
FIG. 4: A) AMBMP analog 26; B) AMBMP analog 27; C) AMBMP analog 28; D) AMBMP analog 29; E) AMBMP analog 30; F) AMBMP analog 31; G) AMBMP analog 32.
Figure 4:
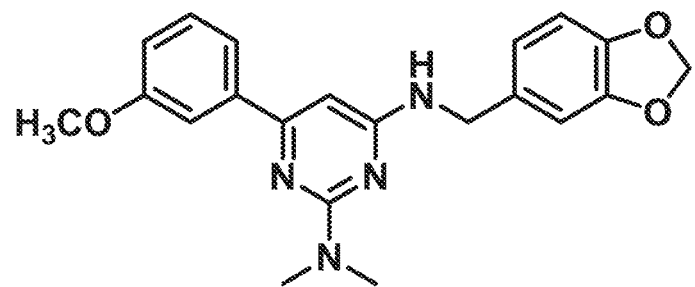
Figure 4:
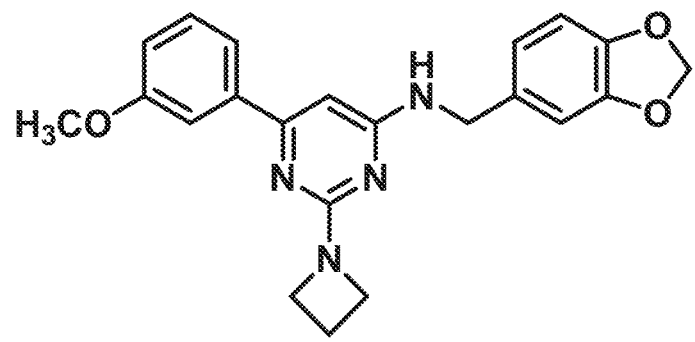
Figure 4:
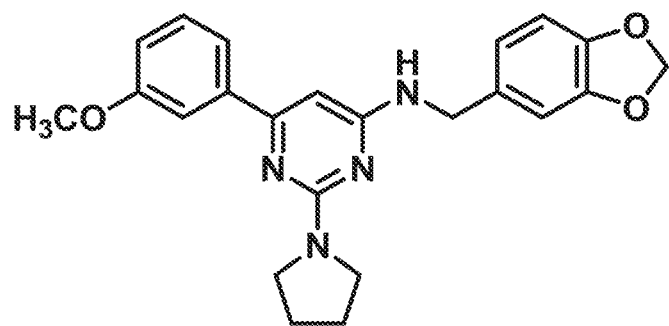
Figure 4:
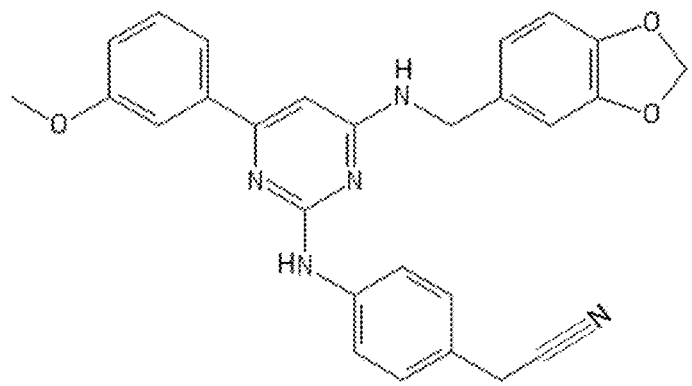
Figure 4:
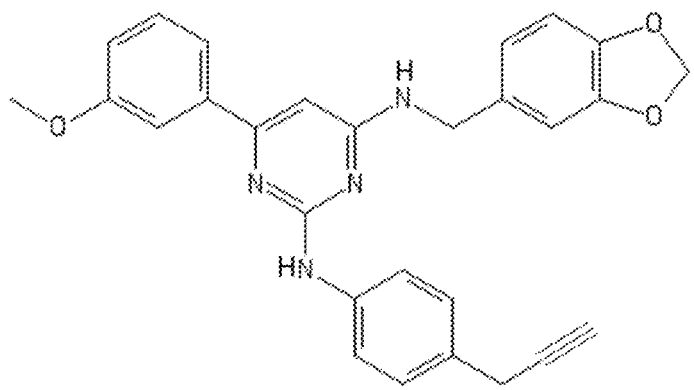
Figure 4:
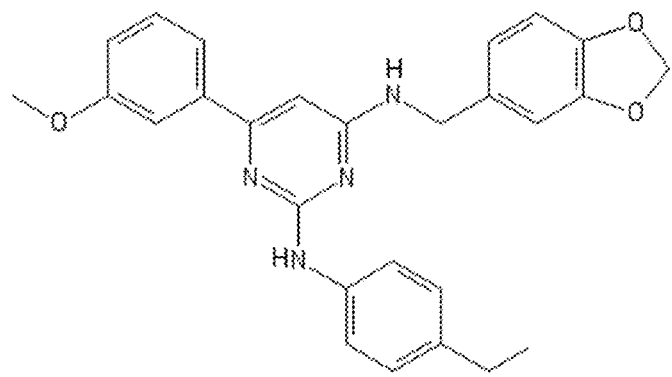
Figure 5:
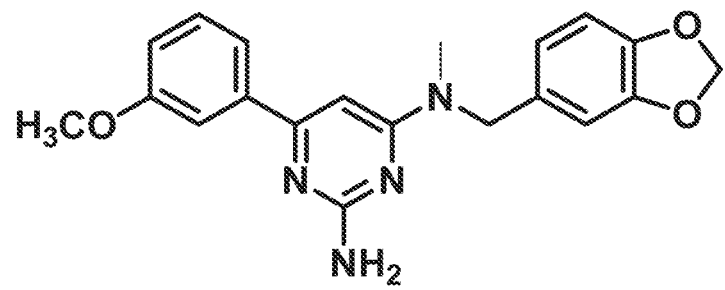
FIG. 5: A) AMBMP analog 33; B) AMBMP analog 34.
Figure 5:
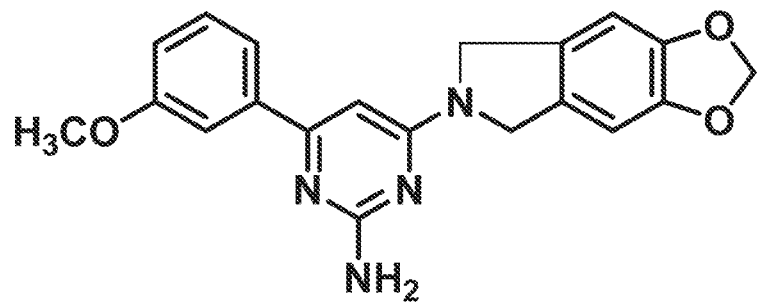
Figure 6:
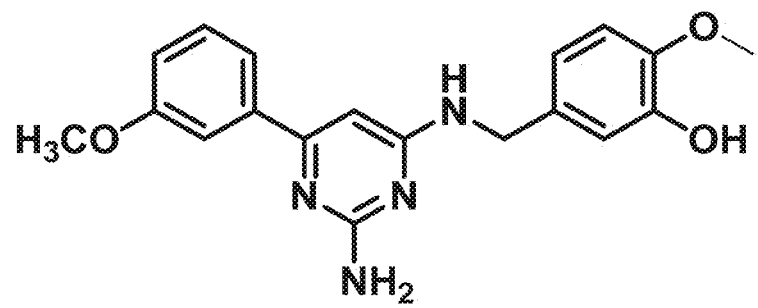
FIG. 6: A) AMBMP analog 35; B) AMBMP analog 36.
Figure 6:
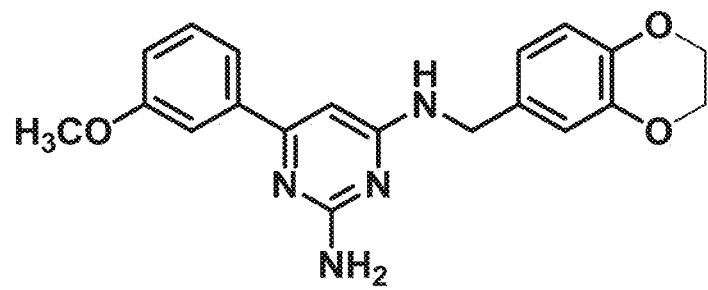
Figure 7:
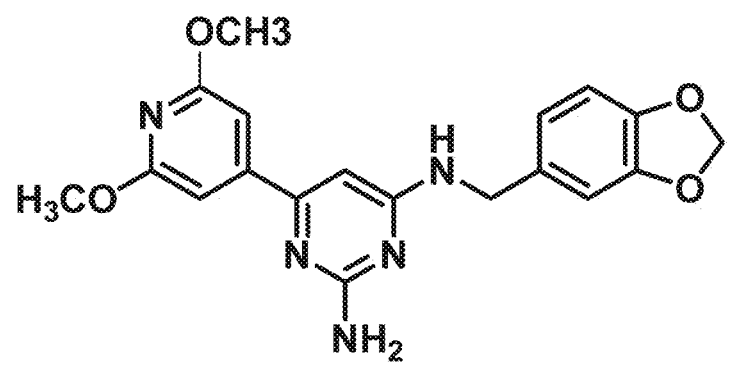
FIG. 7: A) AMBMP analog 37; B) AMBMP analog 38.
Figure 7:
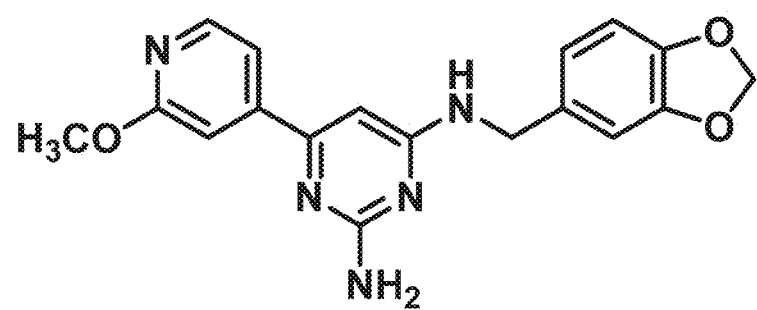

It has been determined that compounds having a chemical structure of Formula I and/or Formula VII, or a pharmaceutically acceptable salt or solvate thereof, can increase muscle mass and muscle function. These chemicals can be effective in treating muscular dystrophy, such as limb girdle muscular dystrophy type 2A/R1/D1. Not to be bound by theory, it is believed that these compounds may provide their biological effect by over-riding the CAMKII signaling block by activating CaMKII. Accordingly, these can increase muscle size, mitochondrial complex I and II activity, expression of genes that comprise the slow fiber phenotype and running performance. Embodiments of the current disclosure is directed to compositions and methods of use for compounds having a chemical structure of Formula I and/or Formula VII, or a pharmaceutically acceptable salt or solvate thereof, that show similar or higher activity on CAMKII signaling as of AMBMP, but are less toxic and/or more soluble than AMBMP (Formula VI). One or more compounds having a chemical structure of Formula I can have a log P value at least any one of, equal to any one of, or between any two of 0.1, 0.2, 0.3, 0.4, 0.5, 0.6, 0.7, 0.8, 0.9, 1.0, 0.1, 0.2, 0.3, 0.4, 0.5, 0.6, 0.7, 0.8, 0.9, 1.0, 1.1, 1.2, 1.3, 1.4, 1.5, 1.6, 1.7, and 1.8 lower than the log P value of AMBMP, wherein P is partition coefficient of a compound between organic and aqueous phase, i.e. P=[organic]/[aqueous]. One or more compounds having a chemical structure of Formula I and/or Formula VII, can have a EC50 potency of <1 uM on endogenous myosin light chain 2 (Myl2) promoter in C2C12 cells. The compounds can have a solubility >10 uM in water at standard temperature and pressure. The compounds can bind human albumin at less than 98.5%. The compounds can have a stability of $t_{1/2}$>0.5 hr in human blood serum at 37° C. and standard pressure. The stability can include stability from degradation and/or from being metabolized. The compounds can be orally bioavailable. Orally bioavailable can include that 50% by moles of the compound enters the blood stream of a human after the compound is administered orally. The compounds can have a cell toxicity of >50 μM for 50% cell death. Toxicity can be measured as a dose dependent effect of the compounds on cell death of C2C12 cells.

Certain embodiments are set forth in the claims. In some embodiments, there are methods of treating muscular dystrophy in a subject comprising administering to the subject an effective amount of a compound having a chemical structure of Formula I and/or Formula VII, or a pharmaceutically acceptable salt or solvate thereof.

Other methods include increasing muscle mass in a subject, increasing muscle force in a subject, improving muscle function in a subject, decreasing the number of degenerating muscle fibers in a subject, increasing the number of regenerating muscle fibers in a subject, and increasing expression of at least one gene selected from the group consisting of myosin light chain-2, Myosin-XVIIIb, Myomesin 3, Lipoprotein lipase, Patatin-Like Phospholipase Domain Containing 2, and Sarcomeric Mitochondrial Creatine Kinase in a subject. Such methods may involve administering to the subject an effective amount of a compound having a chemical structure of Formula I and/or Formula VII, or a pharmaceutically acceptable salt or solvate thereof.

In some embodiments, the subject is administered a composition in which a compound described herein is the active ingredient in the composition.

In some embodiments, the type of muscular dystrophy that the subject is being treated for is limb girdle muscular dystrophy. In particular embodiments, the type of muscular dystrophy is limb girdle muscular dystrophy type 2A/R1/D1. The route of administration to the subject in some embodiments is oral, parenteral, subcutaneous, intraperiotoneal, or intramuscular. In additional embodiments, the compound is administered locally. In further embodiments, the compound is administered directly to muscle tissue. In additional embodiments, the compound is provided to the subject in multiple administrations. In some cases, the compound is formulated in a composition comprising a pharmaceutically acceptable excipient.

In some embodiments, the muscle mass of the subject is increased relative to the muscle mass prior to administration of a compound having a chemical structure of Formula I and/or Formula VII, or a pharmaceutically acceptable salt or solvate thereof. In certain embodiments, the muscle force of the subject is increased relative to the muscle force prior to administration of a compound having a chemical structure of Formula I and/or Formula VII, or a pharmaceutically acceptable salt or solvate thereof. Also, methods may involve muscle function of the subject that is improved relative to the muscle function prior to treatment. Other cases, involve having the number of degenerating muscle fibers in a subject decreased relative to the number of degenerating muscle fibers in a subject prior to treatment or the number of regenerating muscle fibers in a subject increased relative to the number of regenerating muscle fibers in a subject prior to treatment. In certain embodiments, the expression of at least one gene selected from the group consisting of myosin light chain-2, Myosin-XVIIIb, Myomesin 3, Lipoprotein lipase, Patatin-Like Phospholipase Domain Containing 2, and Sarcomeric Mitochondrial Creatine Kinase is increased relative to the expression of the gene prior to treatment. In some cases, the subject has a mutation in the calpain 3 gene. In further cases, the mutation is detected prior to treatment. It is contemplated that a subject may be a mammal in some embodiments, and in further embodiments, the subject is human.

In some incidents, the subject has been determined to have muscle atrophy or be at risk for muscle atrophy. In other embodiments of the method, the subject has been tested for muscle atrophy or a disease that causes or is associated with muscle atrophy. In certain embodiments, the subject has previously been treated with one or more therapies for muscle atrophy, such as a prescribed chemical treatment, e.g., a prescribed drug. In some embodiments, the subject is not treating a gastrointestinal disease or condition with lansoprazole or rabeprazole. In certain methods, the subject is not experiencing any symptoms of a gastrointestinal disease or condition at the time the lansoprazole or rabeprazole is administered.

Methods and compositions are provided concerning the treatment of muscle atrophy, myopathies, or muscular dystrophy, which is a category of diseases and conditions involving the progressive weakness and degeneration of the skeletal muscles that control movement. Embodiments may apply to muscular dystrophy that are of the following types: myotonic, facioscapulohumeral (FSHD), congenital or limb-girdle. In some embodiments, the disease or condition that can be treated is one that is caused or related to a reduction in activity and/or expression of either or both of calpain 3 or Ca-calmodulin protein kinase II (CaMKII). In specific embodiments, the disease is limb girdle muscular dystrophy type 2A/R1/D1 (LGMD2A/R1/D1). In additional embodiments, the disease or condition may be one of the following: Disuse atrophy, Acid Maltase Deficiency (AMD), Amyotrophic Lateral Sclerosis (ALS), Andersen-Tawil Syndrome, Becker Muscular Dystrophy (BMD), Becker Myotonia Congenita. Bethlem Myopathy, Bulbospinal Muscular Atrophy (Spinal-Bulbar Muscular Atrophy), Carnitine Deficiency, Carnitine Palmityl Transferase Deficiency (CPT Deficiency), Central Core Disease (CCD), Centronuclear Myopathy, Charcot-Marie-Tooth Disease (CMT), Congenital Muscular Dystrophy (CMD), Congenital Myasthenic Syndromes (CMS), Congenital Myotonic Dystrophy, Cori Disease (Debrancher Enzyme Deficiency), Debrancher Enzyme Deficiency, Dejerine-Sottas Disease (DSD), Dermatomyositis (DM), Distal Muscular Dystrophy (DD), Duchenne Muscular Dystrophy (DMD), Dystrophia Myotonica (Myotonic Muscular Dystrophy), Emery-Dreifuss Muscular Dystrophy (EDMD), Endocrine Myopathies, Eulenberg Disease (Paramyotonia Congenita), Facioscapulohumeral Muscular Dystrophy (FSH or FSHD), Finnish (Tibial) Distal Myopathy, Forbes Disease (Debrancher Enzyme Deficiency), Friedreich's Ataxia (FA), Fukuyama Congenital Muscular Dystrophy, Glycogenosis Type 10, Glycogenosis Type 11, Glycogenosis Type 2, Glycogenosis Type 3, Glycogenosis Type 5, Glycogenosis Type 7, Glycogenosis Type 9, Gowers-Laing Distal Myopathy, Hauptmann-Thanheuser MD (Emery-Dreifuss Muscular Dystrophy), Hereditary Inclusion-Body Myositis, Hereditary Motor and Sensory Neuropathy (Charcot-Marie-Tooth Disease), Hyperthyroid Myopathy, Hypothyroid Myopathy, Inclusion-Body Myositis (IBM), Inherited Myopathies, Integrin-Deficient Congenital Muscular Dystrophy, Kennedy Disease (Spinal-Bulbar Muscular Atrophy), Kugelberg-Welander Disease (Spinal Muscular Atrophy), Lactate Dehydrogenase Deficiency, Lambert-Eaton Myasthenic Syndrome (LEMS), Limb-Girdle Muscular Dystrophy (LGMD), Lou Gehrig's Disease (Amyotrophic Lateral Sclerosis), McArdle Disease (Phosphorylase Deficiency), Merosin-Deficient Congenital Muscular Dystrophy, Metabolic Diseases of Muscle, Mitochondrial Myopathy, Miyoshi Distal Myopathy, Motor Neurone Disease, Muscle-Eye-Brain Disease, Myasthenia Gravis (MG), Myoadenylate Deaminase Deficiency, Myofibrillar Myopathy, Myophosphorylase Deficiency, Myotonia Congenita (MC), Myotonic Muscular Dystrophy (MMD), Myotubular Myopathy (MTM or MM), Nemaline Myopathy, Nonaka Distal Myopathy. Oculopharyngeal Muscular Dystrophy (OPMD), Paramyotonia Congenita, Pearson Syndrome, Periodic Paralysis, Peroneal Muscular Atrophy (Charcot-Marie-Tooth Disease), Phosphofructokinase Deficiency, Phosphoglycerate Kinase Deficiency, Phosphoglycerate Mutase Deficiency, Phosphorylase Deficiency, Phosphorylase Deficiency, Polymyositis (PM), Pompe Disease (Acid Maltase Deficiency), Progressive External Ophthalmoplegia (PEO), Rod Body Disease (Nemaline Myopathy), Spinal Muscular Atrophy (SMA), Spinal-Bulbar Muscular Atrophy (SBMA), Steinert Disease (Myotonic Muscular Dystrophy), Tarui Disease (Phosphofructokinase Deficiency), Thomsen Disease (Myotonia Congenita), Ullrich Congenital Muscular Dystrophy, Walker-Warburg Syndrome (Congenital Muscular Dystrophy), Welander Distal Myopathy, Werdnig-Hoffmann Disease (Spinal Muscular Atrophy), or ZASP-Related Myopathy. These diseases or conditions can be related to one or more of decreased muscle mass, decreased muscle force, declined muscle function, increased degenerating muscle fiber, decreased regenerating muscle fiber and decreased expression of one or more gene selected from the group consisting of myosin light chain-2, Myosin-XVIIIb, Myomesin 3, Lipoprotein lipase, Patatin-Like Phospholipase Domain Containing 2, and Sarcomeric Mitochondrial Creatine Kinase, in a subject.

Limb girdle muscular dystrophy type 2A/R1/D1 (LGMD2A/R1/D1) is caused by mutations in the non-lysosomal, cysteine protease calpain 3 (CAPN3). Muscles from patients and mice lacking CAPN3 or patients with CAPN3 mutations, have greatly reduced muscle bulk; however, unlike the dystrophinopathies, their sarcolemmal membrane is stable, suggesting that pathogenic mechanisms of LGMD2A/R1/D1 differ from the dystrophinopathies. CAPN3 localizes to several subcellular compartments, including triads, where it is activated by calmodulin and plays a yet undefined role in calcium release. Previous studies in our lab have shown that muscles from Capn3 knockout (C3KO) mice do not grow following a bout of atrophy. Concomitantly, Ca-calmodulin protein kinase II (CaMKII) signaling is compromised. While muscles of WT mice subjected to exercise training increase expression of several slow genes such as Myl2, Mybph, and Ckmt2, muscles of C3KO mice do not exhibit these adaptive changes to exercise. Similarly, myofibrillar, cytoskeletal, mitochondrial, and lipid metabolism genes are also blunted in C3KO mice. Consistent with our mouse studies, a preferential pathological involvement of slow fibers in LGMD2A biopsies was observed. Thus, enhancing the expression of CaMKII induced genes represents a novel target for LGMD2A/R1/D1. The chemical compounds that activate these slow genes may be of therapeutic potential for LGMD2A/R1/D1. To identify such compounds, a high throughput screen was designed using C2C12 cells with a stable Myl2 promoter reporter. Reporter expression reflects the endogenous Myl2 expression pattern during C2C12 differentiation. Using these cells high throughput screens were performed to identify drugs to over-ride the CAMKII signaling block and treat LGMD2A/R1/D1. Positive hits were validated in secondary screens and will be tested in mouse models. These studies represent the first high throughput screening approach to identify drugs for LGMD2A/R1/D1.

In certain embodiments, a method involves administering an effective amount of at least one first compound and an effective amount of at least one second compound, where the first compound is a compound having a chemical structure of Formula I and/or Formula VII, or a pharmaceutically acceptable salt or solvate thereof, and the second compound is selected from the group consisting of 6-Methyl-2-(phenylethynyl)pyridine hydrochloride, (2'Z,3'E)-6-Bromoindirubin-3'-oxime, Daidzein, Lansoprazole, Nabumetone, Parbendazole, PD-98059, Phenamil methanesulfonate, Phenazopyridine, Rabeprazole, Rutaecarpine, SB-204741, SB-206553 hydrochloride hydrate, SB-366791, and SIB 1893. In some aspects, the first compound is a compound illustrated in FIG. 1-7, 18, or 19, or a pharmaceutically acceptable salt or solvate thereof. In some embodiments, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, or more of the compounds (or any range derivable therein) illustrated in FIGS. 1-7, 18, and 19 may be excluded. In some aspect one or more of the second compound may be excluded. The first compound and the second compound can be administered concurrently or separately. Compositions and methods of use for the second compounds are discussed in PCT application WO2017/208211 by Spencer et. al., the disclosure of which is herein incorporated by reference.

Certain embodiments are directed to a pharmaceutical composition containing an effective amount of at least one first compound and an effective amount of at least one second compound, where the first compound is a compound having a chemical structure of Formula I and/or Formula VII, or a pharmaceutically acceptable salt or solvate thereof, and the second compound is selected from the group consisting of 6-Methyl-2-(phenylethynyl)pyridine hydrochloride, (2'Z,3'E)-6-Bromoindirubin-3'-oxime, Daidzein, Lansoprazole, Nabumetone, Parbendazole, PD-98059, Phenamil methanesulfonate, Phenazopyridine, Rabeprazole, Rutaecarpine, SB-204741, SB-206553 hydrochloride hydrate, SB-366791, and SIB 1893. In some aspects, the first compound is a compound illustrated in FIG. 1-7, 18, or 19, or a pharmaceutically acceptable salt or solvate thereof. In some embodiments, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, or more of the compounds (or any range derivable therein) illustrated in FIGS. 1-7, 18, and 19 may be excluded. In some aspect one or more of the second compound may be excluded. In some aspects, the pharmaceutical composition can contain a pharmaceutically acceptable carrier. In some aspect, the pharmaceutical composition can contain a pharmaceutically acceptable excipient.

Analysis of Gene Expression

A gene shall be understood to be specifically expressed in a certain cell type if the expression level of said gene in said cell type is at least 2-fold, 5-fold, 10-fold, 100-fold, 1000-fold, or 10000-fold higher than in a reference cell type, or in a mixture of reference cell types. Reference cell types include non-diseased tissue cells or a heterogeneous population of diseased tissue cells.

In certain aspects, the determination of expression levels is on a gene chip, such as an Affymetrix™ gene chip. In some aspects, the determination of expression levels is by RNA sequencing. In another aspect, the determination of expression levels is done by kinetic real time PCR.

The expression patterns can also be compared by using one or more ratios between the expression levels of different biomarkers. Other suitable measures or indicators can also be employed for assessing the relationship or difference between different expression patterns.

The expression levels of biomarkers can be compared to reference expression levels using various methods. These reference levels can be determined using expression levels of a reference based on all patients. Alternatively, it can be based on an internal reference such as a gene that is expressed in all cells. In some embodiments, the reference is a gene expressed in disease cells at a higher level than any biomarker. Any comparison can be performed using the fold change or the absolute difference between the expression levels to be compared. One or more biomarkers can be used in the comparison. It is contemplated that 1, 2, 3, 4, 5, 6, 7, 8, 9, 10, and/or 11 biomarkers (or any range derivable therein) may be compared to each other and/or to a reference that is internal or external. A person of ordinary skill in the art would know how to do such comparisons.

Fold increases or decreases may be, be at least, or be at most 1-, 2-, 3-, 4-, 5-, 6-, 7-, 8-, 9-, 10-, 11-, 12-, 13-, 14-, 15-, 16-, 17-, 18-, 19-, 20-, 25-, 30-, 35-, 40-, 45-, 50-, 55-, 60-, 65-, 70-, 75-, 80-, 85-, 90-, 95-, 100- or more, or any range derivable therein. Alternatively, differences in expression may be expressed as a percent decrease or increase, such as at least or at most 20, 25, 30, 35, 40, 45, 50, 55, 60, 65, 70, 75, 80, 85, 90, 95, 100, 110, 120, 130, 140, 150, 160, 170, 180, 190, 200, 300, 400, 500, 600, 700, 800, 900, 1000% difference, or any range derivable therein.

Other ways to express relative expression levels are with normalized or relative numbers such as 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10.0, or any range derivable therein. In some embodiments, the levels can be relative to a non-metastatic control or relative to a metastatic control.

Algorithms, such as the weighted voting programs, can be used to facilitate the evaluation of biomarker levels. In addition, other clinical evidence can be combined with the biomarker-based test to reduce the risk of false evaluations. Other cytogenetic evaluations may be considered in some embodiments.

Any biological sample from the patient that contains diseased cells may be used to evaluate the expression pattern of any biomarker discussed herein. In some embodiments, a biological sample from a muscle is used. Evaluation of the sample may involve, though it need not involve, panning (enriching) for muscle cells or isolating the muscle cells.

Measurement of Gene Expression Using Nucleic Acids

Testing methods based on differentially expressed gene products are well known in the art. In accordance with one aspect, the differential expression patterns of biomarkers can be determined by measuring the levels of RNA transcripts of these genes, or genes whose expression is modulated by these genes, in the patient's cells. Suitable methods for this purpose include, but are not limited to, RT-PCR, Northern Blot, in situ hybridization, Southern Blot, slot-blotting, nuclease protection assay, and oligonucleotide arrays.

In certain aspects, RNA isolated from cells can be amplified to cDNA or cRNA before detection and/or quantitation. The isolated RNA can be either total RNA or mRNA. The RNA amplification can be specific or non-specific. Suitable amplification methods include, but are not limited to, reverse transcriptase PCR, isothermal amplification, ligase chain reaction, and Qbeta replicase. The amplified nucleic acid products can be detected and/or quantitated through hybridization to labeled probes. In some embodiments, detection may involve fluorescence resonance energy transfer (FRET) or some other kind of quantum dots.

Amplification primers or hybridization probes for a biomarker can be prepared from the gene sequence or obtained through commercial sources, such as Affymatrix. In certain embodiments the gene sequence is identical or complementary to at least 8 contiguous nucleotides of the coding sequence.

Sequences suitable for making probes/primers for the detection of their corresponding biomarkers include those that are identical or complementary to all or part of the biomarker genes described herein, such as CaMKII, myosin light chain-2, Myosin-XVIIIb, Myomesin 3, Lipoprotein lipase, Patatin-Like Phospholipase Domain Containing 2, and Sarcomeric Mitochondrial Creatine Kinase.

The use of a probe or primer of between 13 and 100 nucleotides, particularly between 17 and 100 nucleotides in length, or in some aspects up to 1-2 kilobases or more in length, allows the formation of a duplex molecule that is both stable and selective. Molecules having complementary sequences over contiguous stretches greater than 20 bases in length may be used to increase stability and/or selectivity of the hybrid molecules obtained. One may design nucleic acid molecules for hybridization having one or more complementary sequences of 20 to 30 nucleotides, or even longer where desired. Such fragments may be readily prepared, for example, by directly synthesizing the fragment by chemical means or by introducing selected sequences into recombinant vectors for recombinant production.

In one embodiment, each probe/primer comprises at least 15 nucleotides. For instance, each probe can comprise at least or at most 20, 25, 50, 75, 100, 125, 150, 175, 200, 225, 250, 275, 300, 325, 350, 400, or more nucleotides (or any range derivable therein). They may have these lengths and have a sequence that is identical or complementary to a gene described herein. Particularly, each probe/primer has relatively high sequence complexity and does not have any ambiguous residue (undetermined "n" residues). The probes/primers can hybridize to the target gene, including its RNA transcripts, under stringent or highly stringent conditions. In some embodiments, because each of the biomarkers has more than one human sequence, it is contemplated that probes and primers may be designed for use with each of these sequences. For example, inosine is a nucleotide frequently used in probes or primers to hybridize to more than one sequence. It is contemplated that probes or primers may have inosine or other design implementations that accommodate recognition of more than one human sequence for a particular biomarker.

For applications requiring high selectivity, one will typically desire to employ relatively high stringency conditions to form the hybrids. For example, relatively low salt and/or high temperature conditions, such as provided by about 0.02 M to about 0.10 M NaCl at temperatures of about 50° C. to about 70° C. Such high stringency conditions tolerate little, if any, mismatch between the probe or primers and the template or target strand and would be particularly suitable for isolating specific genes or for detecting specific mRNA transcripts. It is generally appreciated that conditions can be rendered more stringent by the addition of increasing amounts of formamide.

In another embodiment, the probes/primers for a gene are selected from regions which significantly diverge from the sequences of other genes. Such regions can be determined by checking the probe/primer sequences against a human genome sequence database, such as the Entrez database at the NCBI. One algorithm suitable for this purpose is the BLAST algorithm. This algorithm involves first identifying high scoring sequence pairs (HSPs) by identifying short words of length W in the query sequence, which either match or satisfy some positive-valued threshold score T when aligned with a word of the same length in a database sequence. T is referred to as the neighborhood word score threshold. These initial neighborhood word hits act as seeds for initiating searches to find longer HSPs containing them. The word hits are then extended in both directions along each sequence to increase the cumulative alignment score. Cumulative scores are calculated using, for nucleotide sequences, the parameters M (reward score for a pair of matching residues; always >0) and N (penalty score for mismatching residues; always <0). The BLAST algorithm parameters W, T, and X determine the sensitivity and speed of the alignment. These parameters can be adjusted for different purposes, as appreciated by one of ordinary skill in the art.

In one embodiment, quantitative RT-PCR (such as TaqMan, ABI) is used for detecting and comparing the levels of RNA transcripts in samples. Quantitative RT-PCR involves reverse transcription (RT) of RNA to cDNA followed by relative quantitative PCR (RT-PCR). The concentration of the target DNA in the linear portion of the PCR process is proportional to the starting concentration of the target before the PCR was begun. By determining the concentration of the PCR products of the target DNA in PCR reactions that have completed the same number of cycles and are in their linear ranges, it is possible to determine the relative concentrations of the specific target sequence in the original DNA mixture. If the DNA mixtures are cDNAs synthesized from RNAs isolated from different tissues or cells, the relative abundances of the specific mRNA from which the target sequence was derived may be determined for the respective tissues or cells. This direct proportionality between the concentration of the PCR products and the relative mRNA abundances is true in the linear range portion of the PCR reaction. The final concentration of the target DNA in the plateau portion of the curve is determined by the availability of reagents in the reaction mix and is independent of the original concentration of target DNA. Therefore, the sampling and quantifying of the amplified PCR products may be carried out when the PCR reactions are in the linear portion of their curves. In addition, relative concentrations of the amplifiable cDNAs may be normalized to some independent standard, which may be based on either internally existing RNA species or externally introduced RNA species. The abundance of a particular mRNA species may also be determined relative to the average abundance of all mRNA species in the sample.

In one embodiment, the PCR amplification utilizes one or more internal PCR standards. The internal standard may be an abundant housekeeping gene in the cell or it can specifically be GAPDH, GUSB, and β-2 microglobulin. These standards may be used to normalize expression levels so that the expression levels of different gene products can be compared directly. A person of ordinary skill in the art would know how to use an internal standard to normalize expression levels.

A problem inherent in clinical samples is that they are of variable quantity and/or quality. This problem can be overcome if the RT-PCR is performed as a relative quantitative RT-PCR with an internal standard in which the internal standard is an amplifiable cDNA fragment that is similar or larger than the target cDNA fragment and in which the abundance of the mRNA encoding the internal standard is roughly 5-100 fold higher than the mRNA encoding the target. This assay measures relative abundance, not absolute abundance of the respective mRNA species.

In another embodiment, the relative quantitative RT-PCR uses an external standard protocol. Under this protocol, the PCR products are sampled in the linear portion of their amplification curves. The number of PCR cycles that are optimal for sampling can be empirically determined for each target cDNA fragment. In addition, the reverse transcriptase products of each RNA population isolated from the various samples can be normalized for equal concentrations of amplifiable cDNAs.

Nucleic acid arrays can also be used to detect and compare the differential expression patterns of biomarkers in cells. The probes suitable for detecting the corresponding biomarkers can be stably attached to known discrete regions on a solid substrate. As used herein, a probe is "stably attached" to a discrete region if the probe maintains its position relative to the discrete region during the hybridization and the subsequent washes. Construction of nucleic acid arrays is well known in the art. Suitable substrates for making polynucleotide arrays include, but are not limited to, membranes, films, plastics, and quartz wafers.

A nucleic acid array can comprise at least 1, 2, 3, 4, 5, 6, 7, 8, 9, 10, 15, 20, 25, 30, 35, 40, 45, 50, 60, 70, 80, 90, 100, 150, 200, 250, or more different polynucleotide probes, which may hybridize to different and/or the same biomarkers. Multiple probes for the same gene can be used on a single nucleic acid array. Probes for other disease genes can also be included in the nucleic acid array. The probe density on the array can be in any range. In some embodiments, the density may be 50, 100, 200, 300, 400, 500, or more probes/cm$^2$.

Specifically contemplated are chip-based nucleic acid technologies such as those described by Hacia et al. (1996) and Shoemaker et al. (1996). Briefly, these techniques involve quantitative methods for analyzing large numbers of genes rapidly and accurately. By tagging genes with oligonucleotides or using fixed probe arrays, one can employ chip technology to segregate target molecules as high density arrays and screen these molecules on the basis of hybridization (see also, Pease et al., 1994; and Fodor et al, 1991). It is contemplated that this technology may be used in conjunction with evaluating the expression level of one or more biomarkers with respect to diagnostic, prognostic, and treatment methods.

Certain embodiments may involve the use of arrays or data generated from an array. Data may be readily available. Moreover, an array may be prepared in order to generate data that may then be used in correlation studies.

An array generally refers to ordered macroarrays or microarrays of nucleic acid molecules (probes) that are fully or nearly complementary or identical to a plurality of mRNA molecules or cDNA molecules and that are positioned on a support material in a spatially separated organization. Macroarrays are typically sheets of nitrocellulose or nylon upon which probes have been spotted. Microarrays position the nucleic acid probes more densely such that up to 10,000 nucleic acid molecules can be fit into a region typically 1 to 4 square centimeters. Microarrays can be fabricated by spotting nucleic acid molecules, e.g., genes, oligonucleotides, etc., onto substrates or fabricating oligonucleotide sequences in situ on a substrate. Spotted or fabricated nucleic acid molecules can be applied in a high density matrix pattern of up to about 30 non-identical nucleic acid molecules per square centimeter or higher, e.g. up to about 100 or even 1000 per square centimeter. Microarrays typically use coated glass as the solid support, in contrast to the nitrocellulose-based material of filter arrays. By having an ordered array of complementing nucleic acid samples, the position of each sample can be tracked and linked to the original sample. A variety of different array devices in which a plurality of distinct nucleic acid probes are stably associated with the surface of a solid support are known to those of skill in the art. Useful substrates for arrays include nylon, glass, and silicon. Such arrays may vary in a number of different ways, including average probe length, sequence or types of probes, nature of bond between the probe and the array surface, e.g. covalent or non-covalent, and the like. The labeling and screening methods and the arrays are not limited in its utility with respect to any parameter except that the probes detect expression levels; consequently, methods and compositions may be used with a variety of different types of genes.

Representative methods and apparatus for preparing a microarray have been described, for example, in U.S. Pat. Nos. 5,143,854; 5,202,231; 5,242,974; 5,288,644; 5,324, 633; 5,384,261; 5,405,783; 5,412,087; 5,424,186; 5,429, 807; 5,432,049; 5,436,327; 5,445,934; 5,468,613; 5,470, 710; 5,472,672; 5,492,806; 5,525,464; 5,503,980; 5,510, 270; 5,525,464; 5,527,681; 5,529,756; 5,532,128; 5,545, 531; 5,547,839; 5,554,501; 5,556,752; 5,561,071; 5,571, 639; 5,580,726; 5,580,732; 5,593,839; 5,599,695; 5,599, 672; 5,610,287; 5,624,711; 5,631,134; 5,639,603; 5,654, 413; 5,658,734; 5,661,028; 5,665,547; 5,667,972; 5,695, 940; 5,700,637; 5,744,305; 5,800,992; 5,807,522; 5,830, 645; 5,837,196; 5,871,928; 5,847,219; 5,876,932; 5,919, 626; 6,004,755; 6,087,102; 6,368,799; 6,383,749; 6,617, 112; 6,638,717; 6,720,138, as well as WO 93/17126; WO 95/11995; WO 95/21265; WO 95/21944; WO 95/35505; WO 96/31622; WO 97/10365; WO 97/27317; WO 99/35505; WO 09923256; WO 09936760; WO 0138580; WO 0168255; WO 03020898; WO 03040410; WO 03053586; WO 03087297; WO 03091426; WO 03100012; WO 04020085; WO 04027093; EP 373 203; EP 785 280; EP 799 897, and UK 8 803 000; the disclosures of which are all herein incorporated by reference.

It is contemplated that the arrays can be high density arrays, such that they contain 100 or more different probes. It is contemplated that they may contain 1000, 16,000, 65,000, 250,000, or 1,000,000, or more different probes. The probes can be directed to targets in one or more different organisms. The oligonucleotide probes range from 5 to 50, 5 to 45, 10 to 40, or 15 to 40 nucleotides in length in some embodiments. In certain embodiments, the oligonucleotide probes are 20 to 25 nucleotides in length.

The location and sequence of each different probe sequence in the array are generally known. Moreover, the large number of different probes can occupy a relatively small area providing a high density array having a probe density of generally greater than about 60, 100, 600, 1000, 5,000, 10,000, 40,000, 100,000, or 400,000 different oligonucleotide probes per $cm^2$. The surface area of the array can be about or less than about 1, 1.6, 2, 3, 4, 5, 6, 7, 8, 9, or 10 $cm^2$.

Moreover, a person of ordinary skill in the art could readily analyze data generated using an array. Such protocols include information found in WO 9743450; WO 03023058; WO 03022421; WO 03029485; WO 03067217; WO 03066906; WO 03076928; WO 03093810; WO 03100448 A1, all of which are specifically incorporated by reference.

In one embodiment, nuclease protection assays are used to quantify RNAs derived from the tissue samples. There are many different versions of nuclease protection assays known to those practiced in the art. The common characteristic that these nuclease protection assays have is that they involve hybridization of an antisense nucleic acid with the RNA to be quantified. The resulting hybrid double-stranded molecule is then digested with a nuclease that digests single-stranded nucleic acids more efficiently than double-stranded molecules. The amount of antisense nucleic acid that survives digestion is a measure of the amount of the target RNA species to be quantified. An example of a nuclease protection assay that is commercially available is the RNase protection assay manufactured by Ambion, Inc. (Austin, Tex.).

Measurement of Gene Expression Using Proteins and Polypeptides

In other embodiments, the differential expression patterns of biomarkers can be determined by measuring the levels of polypeptides encoded by these genes in cells. Methods suitable for this purpose include, but are not limited to, immunoassays such as ELISA, RIA, FACS, dot blot, Western Blot, immunohistochemistry, and antibody-based radio-imaging. Protocols for carrying out these immunoassays are well known in the art. Other methods such as 2-dimensional SDS-polyacrylamide gel electrophoresis can also be used. These procedures may be used to recognize any of the polypeptides encoded by the biomarker genes described herein.

One example of a method suitable for detecting the levels of target proteins in peripheral blood samples is ELISA. In an exemplifying ELISA, antibodies capable of binding to the target proteins encoded by one or more biomarker genes are immobilized onto a selected surface exhibiting protein affinity, such as wells in a polystyrene or polyvinylchloride microtiter plate. Then, cell samples to be tested are added to the wells. After binding and washing to remove non-specifically bound immunocomplexes, the bound antigen(s) can be detected. Detection can be achieved by the addition of a second antibody which is specific for the target proteins and is linked to a detectable label. Detection may also be achieved by the addition of a second antibody, followed by the addition of a third antibody that has binding affinity for the second antibody, with the third antibody being linked to a detectable label. Before being added to the microtiter plate, cells in the peripheral blood samples can be lysed using various methods known in the art. Proper extraction procedures can be used to separate the target proteins from potentially interfering substances.

In another ELISA embodiment, the cell samples containing the target proteins are immobilized onto the well surface and then contacted with the antibodies. After binding and washing to remove non-specifically bound immunocomplexes, the bound antigen is detected. Where the initial antibodies are linked to a detectable label, the immunocomplexes can be detected directly. The immunocomplexes can also be detected using a second antibody that has binding affinity for the first antibody, with the second antibody being linked to a detectable label.

Another typical ELISA involves the use of antibody competition in the detection. In this ELISA, the target proteins are immobilized on the well surface. The labeled antibodies are added to the well, allowed to bind to the target proteins, and detected by means of their labels. The amount of the target proteins in an unknown sample is then determined by mixing the sample with the labeled antibodies before or during incubation with coated wells. The presence of the target proteins in the unknown sample acts to reduce the amount of antibody available for binding to the well and thus reduces the ultimate signal.

Different ELISA formats can have certain features in common, such as coating, incubating or binding, washing to remove non-specifically bound species, and detecting the bound immunocomplexes. For instance, in coating a plate with either antigen or antibody, the wells of the plate can be incubated with a solution of the antigen or antibody, either overnight or for a specified period of hours. The wells of the plate are then washed to remove incompletely adsorbed material. Any remaining available surfaces of the wells are then "coated" with a nonspecific protein that is antigenically neutral with regard to the test samples. Examples of these nonspecific proteins include bovine serum albumin (BSA), casein, and solutions of milk powder. The coating allows for blocking of nonspecific adsorption sites on the immobilizing surface and thus reduces the background caused by nonspecific binding of antisera onto the surface.

In ELISAs, a secondary or tertiary detection means can also be used. After binding of a protein or antibody to the well, coating with a non-reactive material to reduce background, and washing to remove unbound material, the immobilizing surface is contacted with the control and/or clinical or biological sample to be tested under conditions effective to allow immunocomplex (antigen/antibody) formation. These conditions may include, for example, diluting the antigens and antibodies with solutions such as BSA, bovine gamma globulin (BGG) and phosphate buffered saline (PBS)/Tween and incubating the antibodies and antigens at room temperature for about 1 to 4 hours or at 49° C. overnight. Detection of the immunocomplex then requires a labeled secondary binding ligand or antibody, or a secondary binding ligand or antibody in conjunction with a labeled tertiary antibody or third binding ligand.

After all of the incubation steps in an ELISA, the contacted surface can be washed so as to remove non-complexed material. For instance, the surface may be washed with a solution such as PBS/Tween, or borate buffer. Following the formation of specific immunocomplexes between the test sample and the originally bound material, and subsequent washing, the occurrence of the amount of immunocomplexes can be determined.

To provide a detecting means, the second or third antibody can have an associated label to allow detection. In one embodiment, the label is an enzyme that generates color development upon incubating with an appropriate chromogenic substrate. Thus, for example, one may contact and incubate the first or second immunocomplex with a urease, glucose oxidase, alkaline phosphatase or hydrogen peroxidase-conjugated antibody for a period of time and under conditions that favor the development of further immunocomplex formation (e.g., incubation for 2 hours at room temperature in a PBS-containing solution such as PBS-Tween).

After incubation with the labeled antibody, and subsequent to washing to remove unbound material, the amount of label is quantified, e.g., by incubation with a chromogenic substrate such as urea and bromocresol purple or 2,2'-azido-di-(3-ethyl)-benzhiazoline-6-sulfonic acid (ABTS) and hydrogen peroxide, in the case of peroxidase as the enzyme label. Quantitation can be achieved by measuring the degree of color generation, e.g., using a spectrophotometer.

Another suitable method is RIA (radioimmunoassay). An example of RIA is based on the competition between radiolabeled-polypeptides and unlabeled polypeptides for binding to a limited quantity of antibodies. Suitable radiolabels include, but are not limited to, $I^{125}$. In one embodiment, a fixed concentration of $I^{125}$-labeled polypeptide is incubated with a series of dilution of an antibody specific to the polypeptide. When the unlabeled polypeptide is added to the system, the amount of the $I^{125}$-polypeptide that binds to the antibody is decreased. A standard curve can therefore be constructed to represent the amount of antibody-bound $I^{125}$-polypeptide as a function of the concentration of the unlabeled polypeptide. From this standard curve, the concentration of the polypeptide in unknown samples can be determined. Various protocols for conducting RIA to measure the levels of polypeptides in cell samples are well known in the art.

Suitable antibodies include, but are not limited to, polyclonal antibodies, monoclonal antibodies, chimeric antibodies, humanized antibodies, single chain antibodies, Fab fragments, and fragments produced by a Fab expression library.

Antibodies can be labeled with one or more detectable moieties to allow for detection of antibody-antigen complexes. The detectable moieties can include compositions detectable by spectroscopic, enzymatic, photochemical, biochemical, bioelectronic, immunochemical, electrical, optical or chemical means. The detectable moieties include, but are not limited to, radioisotopes, chemiluminescent compounds, labeled binding proteins, heavy metal atoms, spectroscopic markers such as fluorescent markers and dyes, magnetic labels, linked enzymes, mass spectrometry tags, spin labels, electron transfer donors and acceptors, and the like.

Protein array technology is discussed in detail in Pandey and Mann (2000) and MacBeath and Schreiber (2000), each of which is herein specifically incorporated by reference. These arrays typically contain thousands of different proteins or antibodies spotted onto glass slides or immobilized in tiny wells and allow one to examine the biochemical activities and binding profiles of a large number of proteins at once. To examine protein interactions with such an array, a labeled protein is incubated with each of the target proteins immobilized on the slide, and then one determines which of the many proteins the labeled molecule binds. In certain embodiments such technology can be used to quantitate a number of proteins in a sample, such as a biomarker proteins.

The basic construction of protein chips has some similarities to DNA chips, such as the use of a glass or plastic surface dotted with an array of molecules. These molecules can be DNA or antibodies that are designed to capture proteins. Defined quantities of proteins are immobilized on each spot, while retaining some activity of the protein. With fluorescent markers or other methods of detection revealing the spots that have captured these proteins, protein microarrays are being used as powerful tools in high-throughput proteomics and drug discovery.

The earliest and best-known protein chip is the ProteinChip by Ciphergen Biosystems Inc. (Fremont, Calif.). The ProteinChip is based on the surface-enhanced laser desorption and ionization (SELDI) process. Known proteins are analyzed using functional assays that are on the chip. For example, chip surfaces can contain enzymes, receptor proteins, or antibodies that enable researchers to conduct protein-protein interaction studies, ligand binding studies, or immunoassays. With state-of-the-art ion optic and laser optic technologies, the ProteinChip system detects proteins ranging from small peptides of less than 1000 Da up to proteins of 300 kDa and calculates the mass based on time-of-flight (TOF).

The ProteinChip biomarker system is the first protein biochip-based system that enables biomarker pattern recognition analysis to be done. This system allows researchers to address important clinical questions by investigating the proteome from a range of crude clinical samples (i.e., laser capture microdissected cells, biopsies, tissue, urine, and serum). The system also utilizes biomarker pattern software that automates pattern recognition-based statistical analysis methods to correlate protein expression patterns from clinical samples with disease phenotypes.

In other aspects, the levels of polypeptides in samples can be determined by detecting the biological activities associated with the polypeptides. If a biological function/activity of a polypeptide is known, suitable in vitro bioassays can be designed to evaluate the biological function/activity, thereby determining the amount of the polypeptide in the sample.

II. Pharmaceutical Compositions and Methods of Administration

Compositions and methods described herein may involve administering to patients via any route used to introduce therapy to patients. Such routes include, but are not limited to, administration intravenously, intradermally, intraarterially, intraperitoneally, intralesionally, intracranially, intraarticularly, intraprostaticaly, intrapleurally, intratracheally, intranasally, intrathecally, intravitreally, intravaginally, intrarectally, topically, intratumorally, intramuscularly, intraperitoneally, intraocularly, subcutaneously, subconjunctival, intravesicularlly, mucosally, intrapericardially, intraumbilically, intraocularally, orally, topically, locally, by inhalation, by injection, by infusion, by continuous infusion, by localized perfusion, via a catheter, via nebulizer, or via a lavage, or various combinations thereof. In specific embodiments, the composition is administered to the subject by inhalation. In particular embodiments, the composition is administered to the subject as an aerosol. Other examples of routes of administration involve a nebulizer. Additionally, the composition may be administered directly to the area affected by muscular atrophy, such as locally to the muscle (or to the skin or tissue on top of a muscle).

The compositions may be formulated in a pharmaceutically acceptable composition. In certain embodiments, a preservative and/or stabilizer is included in the composition.

Furthermore, in some embodiments, compositions may contain about, at least about, or at most about 0.1, 0.2, 0.3, 0.4, 0.5, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10.0, 10.5, 11.0, 11.5, 12.0, 12.5, 13.0, 13.5, 14.0, 14.5, 15.0, 15.5, 16.0, 16.5, 17.0, 17.5, 18.0, 18.5, 19.0, 19.5, 20.0, 21, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 441, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, or 1000 ng, μg or mg of a compound of the disclosure (or any range derivable therein), which may be in about, at least about, or at most about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 10, 11, 12, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 441, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, or 1000 μl or ml (or any range derivable therein). Alternatively, a composition may have a concentration of a compound of at least about, at most about, or about 0.1, 0.2, 0.3, 0.4, 0.5, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10.0, 10.5, 11.0, 11.5, 12.0, 12.5, 13.0, 13.5, 14.0, 14.5, 15.0, 15.5, 16.0, 16.5, 17.0, 17.5, 18.0, 18.5, 19.0, 19.5, 20.0, 21, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 441, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, or 1000 μM or mM (or any range derivable therein).

Moreover, such amounts may be administered to a subject in one or more doses as that much compound of the disclosure/kg body weight of the subject. For example, a subject may be administered an amount in the range of about 1 μg/kg and about 1 mg/kg. In certain embodiments, the amount given to a subject is about, at least about, or at most about 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10.0, 10.5, 11.0, 11.5, 12.0, 12.5, 13.0, 13.5, 14.0, 14.5, 15.0, 15.5, 16.0, 16.5, 17.0, 17.5, 18.0, 18.5, 19.0, 19.5, 20.0, 21, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 441, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, or 1000 μg/kg or mg/kg, or any range derivable therein. These amounts may be prescribed on a per administration basis or on a daily basis (for example on a μg/kg body weight/day basis).

Such amounts can be administered daily, though other dosing regimens are contemplated. It is contemplated that compositions may be administered just a single time or multiple times. In certain embodiments, a composition is administered 1, 2, 3, 4, 5, 6, or more times, or any range derivable therein. It is contemplated that a preventative or treatment regimen may involve multiple administrations over 1, 2, 3, 4, 5, 6, and/or 7 days or 1, 2, 3, 4, or 5 weeks, and/or 1, 2, 3, 4, 5, 6, 7, 8, 9, 10, 11, and/or 12 months, or any range derivable therein. Moreover, any such regimen may be repeated after a certain amount of time has passed or when symptoms of the disease or condition become noticeable or more severe.

In certain aspects, the compositions or agents for use in the methods, such as therapeutic compounds, are suitably contained in a pharmaceutically acceptable carrier. The carrier is non-toxic, biocompatible and is selected so as not to detrimentally affect the biological activity of the agent. The agents in some aspects of the disclosure may be formulated into preparations for local delivery (i.e. to a specific location of the body, such as skeletal muscle or other tissue) or systemic delivery, in solid, semi-solid, gel, liquid, or gaseous forms such as tablets, capsules, powders, granules, ointments, solutions, depositories, inhalants, and injections allowing for oral, parenteral, or surgical administration. Certain aspects of the disclosure also contemplate local administration of the compositions by coating medical devices, local administration, and the like.

Suitable carriers for parenteral delivery via injectable, infusion, or irrigation, and topical delivery include distilled water, physiological phosphate-buffered saline, normal or lactated Ringer's solutions, dextrose solution, Hank's solution, or propanediol. In addition, sterile, fixed oils may be employed as a solvent or suspending medium. For this purpose any biocompatible oil may be employed including synthetic mono- or diglycerides. In addition, fatty acids such as oleic acid find use in the preparation of injectables. The carrier and agent may be compounded as a liquid, suspension, polymerizable or non-polymerizable gel, paste, or salve.

The carrier may also comprise a delivery vehicle to sustain (i.e., extend, delay or regulate) the delivery of the agent(s) or to enhance the delivery, uptake, stability, or pharmacokinetics of the therapeutic agent(s). Such a delivery vehicle may include, by way of non-limiting examples, microparticles, microspheres, nanospheres, or nanoparticles composed of proteins, liposomes, carbohydrates, synthetic organic compounds, inorganic compounds, polymeric or copolymeric hydrogels, and polymeric micelles.

In certain aspects, the actual dosage amount of a composition administered to a patient or subject can be determined by physical and physiological factors such as body weight, severity of condition, the type of disease being treated, previous or concurrent therapeutic interventions, idiopathy of the patient and on the route of administration. The practitioner responsible for administration will, in any event, determine the concentration of active ingredient(s) in a composition and appropriate dose(s) for the individual subject.

In certain embodiments, pharmaceutical compositions may comprise, for example, at least about 0.1% of an active agent, such as an isolated exosome, a related lipid nanovesicle, or an exosome or nanovesicle loaded with therapeutic agents or diagnostic agents. In other embodiments, the active agent may comprise between about 2% to about 75% of the weight of the unit, or between about 25% to about 60%, for example, and any range derivable therein. In other non-limiting examples, a dose may also comprise from about 1 microgram/kg/body weight, about 5 microgram/kg/body weight, about 10 microgram/kg/body weight, about 50 microgram/kg/body weight, about 100 microgram/kg/body weight, about 200 microgram/kg/body weight, about 350 microgram/kg/body weight, about 500 microgram/kg/body weight, about 1 milligram/kg/body weight, about 5 milligram/kg/body weight, about 10 milligram/kg/body weight, about 50 milligram/kg/body weight, about 100 milligram/kg/body weight, about 200 milligram/kg/body weight, about 350 milligram/kg/body weight, about 500 milligram/kg/body weight, to about 1000 mg/kg/body weight or more per administration, and any range derivable therein. In non-limiting examples of a derivable range from the numbers listed herein, a range of about 5 microgram/kg/body weight to about 100 mg/kg/body weight, about 5 microgram/kg/body weight to about 500 milligram/kg/body weight, etc., can be administered.

Solutions of pharmaceutical compositions can be prepared in water suitably mixed with a surfactant, such as hydroxypropylcellulose. Dispersions also can be prepared in glycerol, liquid polyethylene glycols, mixtures thereof, and in oils. Under ordinary conditions of storage and use, these preparations contain a preservative to prevent the growth of microorganisms.

In certain aspects, the pharmaceutical compositions are advantageously administered in the form of injectable compositions either as liquid solutions or suspensions; solid forms suitable for solution in, or suspension in, liquid prior to injection may also be prepared. These preparations also may be emulsified. A typical composition for such purpose comprises a pharmaceutically acceptable carrier. For instance, the composition may contain 10 mg or less, 25 mg, 50 mg, or up to about 100 mg of human serum albumin per milliliter of phosphate buffered saline. Other pharmaceutically acceptable carriers include aqueous solutions, non-toxic excipients, including salts, preservatives, buffers, and the like.

Examples of non-aqueous solvents are propylene glycol, polyethylene glycol, vegetable oil, and injectable organic esters such as ethyloleate. Aqueous carriers include water, alcoholic/aqueous solutions, saline solutions, parenteral vehicles such as sodium chloride, Ringer's dextrose, etc. Intravenous vehicles include fluid and nutrient replenishers. Preservatives include antimicrobial agents, antgifungal agents, anti-oxidants, chelating agents and inert gases. The pH and exact concentration of the various components the pharmaceutical composition are adjusted according to well-known parameters.

Additional formulations are suitable for oral administration. Oral formulations include such typical excipients as, for example, pharmaceutical grades of mannitol, lactose, starch, magnesium stearate, sodium saccharine, cellulose, magnesium carbonate, and the like. The compositions take the form of solutions, suspensions, tablets, pills, capsules, sustained release formulations, or powders.

In further aspects, the pharmaceutical compositions may include classic pharmaceutical preparations. Administration of pharmaceutical compositions according to certain aspects may be via any common route so long as the target tissue is available via that route. This may include oral, nasal, buccal, rectal, vaginal, or topical. Alternatively, administration may be by orthotopic, intradermal, subcutaneous, intramuscular, intraperitoneal, or intravenous injection. Such compositions would normally be administered as pharmaceutically acceptable compositions that include physiologically acceptable carriers, buffers, or other excipients. For treatment of conditions of the lungs, aerosol delivery can be used. Volume of the aerosol is between about 0.01 ml and 0.5 ml.

An effective amount of the pharmaceutical composition is determined based on the intended goal. The term "unit dose" or "dosage" refers to physically discrete units suitable for use in a subject, each unit containing a predetermined-quantity of the pharmaceutical composition calculated to produce the desired responses discussed above in association with its administration, i.e., the appropriate route and treatment regimen. The quantity to be administered, both according to number of treatments and unit dose, depends on the protection or effect desired.

Precise amounts of the pharmaceutical composition also depend on the judgment of the practitioner and are particular to each individual. Factors affecting the dose include the physical and clinical state of the patient, the route of administration, the intended goal of treatment (e.g., alleviation of symptoms versus cure) and the potency, stability, and toxicity of the particular therapeutic substance.

Various combinations of the compounds of the disclosure and/or other traditional therapeutics for muscular dystrophy or muscular atrophy or cachexia or sarcophenia or myopathy may be used. For example, a first therapeutic compound or agent is "A" and a second therapeutic compound or agent is "B" can be combined and/or excluded, in a non-limiting manner as follows:

| | | | | | | | |
|---|---|---|---|---|---|---|---|
| A/B/A | B/A/B | B/B/A | A/A/B | A/B/B | B/A/A | A/B/B/B | B/A/B/B |
| B/B/B/A | B/B/A/B | A/A/B/B | A/B/A/B | A/B/B/A | B/B/A/A | | |
| B/A/B/A | B/A/A/B | A/A/A/B | B/A/A/A | A/B/A/A | A/A/B/A. | | |

Administration of the therapeutic compounds or agents to a patient will follow general protocols for the administration of such compounds, taking into account the toxicity, if any, of the therapy. It is expected that the treatment cycles would be repeated as necessary. It also is contemplated that various standard therapies, as well as surgical intervention, may be applied in combination with the described therapy.

In some embodiments, the methods of the disclosure include an additional treatment. In some embodiments, the additional treatment comprises a corticosteroid. Exemplary corticosteroids include prednisone, prednisolone, beclomethasone, fluticasone, methylprednisolone, cortisone, hydrocortisone, triamcinolone, methylprednisolone, and dexamethasone. In some embodiments, the additional treatment comprises a heart medication, such as an angiotensin-converting enzyme (ACE) inhibitors or beta blockers Exemplary ACE inhibitors include benazepril, captopril, enalapril, fosinopril, Lisinopril, moexipril, perindopril, quinapril, ramipril, and trandolapril. Exemplary beta blockers include acebutolol hydrochloride, atenolol, betaxolol hydrochloride, bisoprolol fumarate, carteolol hydrochloride, esmolol hydrochloride, metoprolol, penbutolol sulfate, nadolol, nebivolol, pindolol, propranolol, timolol maleate, sotalol hydrochloride, carvedilol, and labetalol hydrochloride.

In some embodiments, the additional therapeutic treatment comprises exercise, low-impact exercise, physiotherapy, physical aids, such as a wheelchair, leg braces, or crutches, and/or occupational therapy. In some embodiments, the additional therapeutic treatment comprises creatine supplements.

III. Chemical Definitions

Various chemical definitions related to such compounds are provided as follows.

As used herein, the term "water soluble" means that the compound dissolves in water at least to the extent of 0.010 mole/liter or is classified as soluble according to literature precedence.

As used herein, the term "nitro" means —$NO_2$; the term "halo" designates —F, —Cl, —Br, or —I; the term "mercapto" means —SH; the term "cyano" means —CN; the term "azido" means —$N_3$; the term "silyl" means —$SiH_3$, and the term "hydroxyl" means —OH.

The term "alkyl," by itself or as part of another substituent, means, unless otherwise stated, a linear (i.e. unbranched) or branched carbon chain, which may be fully saturated, mono- or polyunsaturated. An unsaturated alkyl group is one having one or more double bonds or triple bonds. Saturated alkyl groups include those having one or more carbon-carbon double bonds (alkenyl) and those having one or more carbon-carbon triple bonds (alkynyl). The groups, —$CH_3$ (Me), —$CH_2CH_3$ (Et), —$CH_2CH_2CH_3$ (n-Pr), —$CH(CH_3)_2$ (iso-Pr), —$CH_2CH_2CH_2CH_3$ (n-Bu), —$CH(CH_3)CH_2CH_3$ (sec-butyl), —$CH_2CH(CH_3)_2$ (iso-butyl), —$C(CH_3)_3$ (tert-butyl), —$CH_2C(CH_3)_3$ (neo-pentyl), are all non-limiting examples of alkyl groups.

The term "heteroalkyl," by itself or in combination with another term, means, unless otherwise stated, a linear or branched chain having at least one carbon atom and at least one heteroatom selected from the group consisting of O, N, S, P, and Si. In certain embodiments, the heteroatoms are selected from the group consisting of O and N. The heteroatom(s) may be placed at any interior position of the heteroalkyl group or at the position at which the alkyl group is attached to the remainder of the molecule. Up to two heteroatoms may be consecutive. The following groups are all non-limiting examples of heteroalkyl groups: trifluoromethyl, —$CH_2F$, —$CH_2Cl$, —$CH_2Br$, —$CH_2OH$, —$CH_2OCH_3$, —$CH_2OCH_2CF_3$, —$CH_2OC(O)CH_3$, —$CH_2NH_2$, —$CH_2NHCH_3$, —$CH_2N(CH_3)_2$, —$CH_2CH_2C1$, —$CH_2CH_2OH$, $CH_2CH_2OC(O)CH_3$, —$CH_2CH_2NHCO_2C(CH_3)_3$, and —$CH_2Si(CH_3)_3$.

The terms "cycloalkyl" and "heterocyclyl," by themselves or in combination with other terms, means cyclic versions of "alkyl" and "heteroalkyl", respectively. Additionally, for heterocyclyl, a heteroatom can occupy the position at which the heterocycle is attached to the remainder of the molecule.

The term "aryl" means a polyunsaturated, aromatic, hydrocarbon substituent. Aryl groups can be monocyclic or polycyclic (e.g., 2 to 3 rings that are fused together or linked covalently). The term "heteroaryl" refers to an aryl group that contains one to four heteroatoms selected from N, O, and S. A heteroaryl group can be attached to the remainder of the molecule through a carbon or heteroatom. Non-limiting examples of aryl and heteroaryl groups include phenyl, 1-naphthyl, 2-naphthyl, 4-biphenyl, 1-pyrrolyl, 2-pyrrolyl, 3-pyrrolyl, 3-pyrazolyl, 2-imidazolyl, 4-imidazolyl, pyrazinyl, 2-oxazolyl, 4-oxazolyl, 2-phenyl-4-oxazolyl, 5-oxazolyl, 3-isoxazolyl, 4-isoxazolyl, 5-isoxazolyl, 2-thiazolyl, 4-thiazolyl, 5-thiazolyl, 2-furyl, 3-furyl, 2-thienyl, 3-thienyl, 2-pyridyl, 3-pyridyl, 4-pyridyl, 2-pyrimidyl, 4-pyrimidyl, 5-benzothiazolyl, purinyl, 2-benzimidazolyl, 5-indolyl, 1-isoquinolyl, 5-isoquinolyl, 2-quinoxalinyl, 5-quinoxalinyl, 3-quinolyl, and 6-quinolyl. Substituents for each of the above noted aryl and heteroaryl ring systems are selected from the group of acceptable substituents described below.

Various groups are described herein as substituted or unsubstituted (i.e., optionally substituted). Optionally substituted groups may include one or more substituents independently selected from: halogen, nitro, cyano, hydroxy, amino, mercapto, formyl, carboxy, oxo, carbamoyl, substituted or unsubstituted alkyl, substituted or unsubstituted heteroalkyl, alkoxy, alkylthio, alkylamino, (alkyl)$_2$amino, alkylsulfinyl, alkyl sulfonyl, aryl sulfonyl, substituted or unsubstituted cycloalkyl, substituted or unsubstituted heterocyclyl, substituted or unsubstituted aryl, and substituted or unsubstituted heteroaryl. In certain aspects the optional substituents may be further substituted with one or more substituents independently selected from: halogen, nitro, cyano, hydroxy, amino, mercapto, formyl, carboxy, carbamoyl, unsubstituted alkyl, unsubstituted heteroalkyl, alkoxy, alkylthio, alkylamino, (alkyl)$_2$amino, alkylsulfinyl, alkyl sulfonyl, aryl sulfonyl, unsubstituted cycloalkyl, unsubstituted heterocyclyl, unsubstituted aryl, or unsubstituted heteroaryl. Exemplary optional substituents include, but are not limited to: —OH, oxo (=O), —Cl, —F, Br, $C_{1-4}$alkyl, phenyl, benzyl, —NH$_2$, —NH($C_{1-4}$alkyl), —N($C_{1-4}$alkyl)$_2$, —NO$_2$, —S($C_{1-4}$alkyl), —SO$_2$($C_{1-4}$alkyl), —CO$_2$($C_{1-4}$alkyl), and —O($C_{1-4}$alkyl).

The term "alkoxy" means a group having the structure —OR', where R' is an optionally substituted alkyl or cycloalkyl group. The term "heteroalkoxy" similarly means a group having the structure —OR, where R is a heteroalkyl or heterocyclyl.

The term "amino" means a group having the structure —NR'R", where R' and R" are independently hydrogen or an optionally substituted alkyl, heteroalkyl, cycloalkyl, or heterocyclyl group. The term "amino" includes primary, secondary, and tertiary amines.

The term "oxo" as used herein means an oxygen that is double bonded to a carbon atom.

The term "alkylsulfonyl" as used herein means a moiety having the formula —S(O$_2$)—R', where R' is an alkyl group. R' may have a specified number of carbons (e.g. "$C_{1-4}$ alkylsulfonyl")

The term "pharmaceutically acceptable salts," as used herein, refers to salts of compounds of this invention that are substantially non-toxic to living organisms. Typical pharmaceutically acceptable salts include those salts prepared by reaction of a compound of this invention with an inorganic or organic acid, or an organic base, depending on the substituents present on the compounds of the invention.

Non-limiting examples of inorganic acids which may be used to prepare pharmaceutically acceptable salts include: hydrochloric acid, phosphoric acid, sulfuric acid, hydrobromic acid, hydroiodic acid, phosphorous acid, and the like. Examples of organic acids which may be used to prepare pharmaceutically acceptable salts include: aliphatic mono- and dicarboxylic acids, such as oxalic acid, carbonic acid, citric acid, succinic acid, phenyl-heteroatom-substituted alkanoic acids, aliphatic and aromatic sulfuric acids, and the like. Pharmaceutically acceptable salts prepared from inorganic or organic acids thus include hydrochloride, hydrobromide, nitrate, sulfate, pyrosulfate, bisulfate, sulfite, bisulfate, phosphate, monohydrogenphosphate, dihydrogenphosphate, metaphosphate, pyrophosphate, hydroiodide, hydro fluoride, acetate, propionate, formate, oxalate, citrate, lactate, p-toluenesulfonate, methanesulfonate, maleate, and the like.

Suitable pharmaceutically acceptable salts may also be formed by reacting the agents of the invention with an organic base such as methylamine, ethylamine, ethanolamine, lysine, ornithine, and the like. Pharmaceutically acceptable salts include the salts formed between carboxylate or sulfonate groups found on some of the compounds of this invention and inorganic cations, such as sodium, potassium, ammonium, or calcium, or such organic cations as isopropylammonium, trimethylammonium, tetramethylammonium, and imidazolium.

It should be recognized that the particular anion or cation forming a part of any salt of this invention is not critical, so long as the salt, as a whole, is pharmacologically acceptable.

Additional examples of pharmaceutically acceptable salts and their methods of preparation and use are presented in Handbook of Pharmaceutical Salts: Properties, Selection and Use (2002), which is incorporated herein by reference.

An "isomer" of a compound is a separate compound in which each molecule contains the same constituent atoms as the compound one, but where the configuration of those atoms in three dimensions differs. Unless otherwise specified, the compounds described herein are meant to encompass their isomers as well.

IV. Examples

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1

Figure 8:
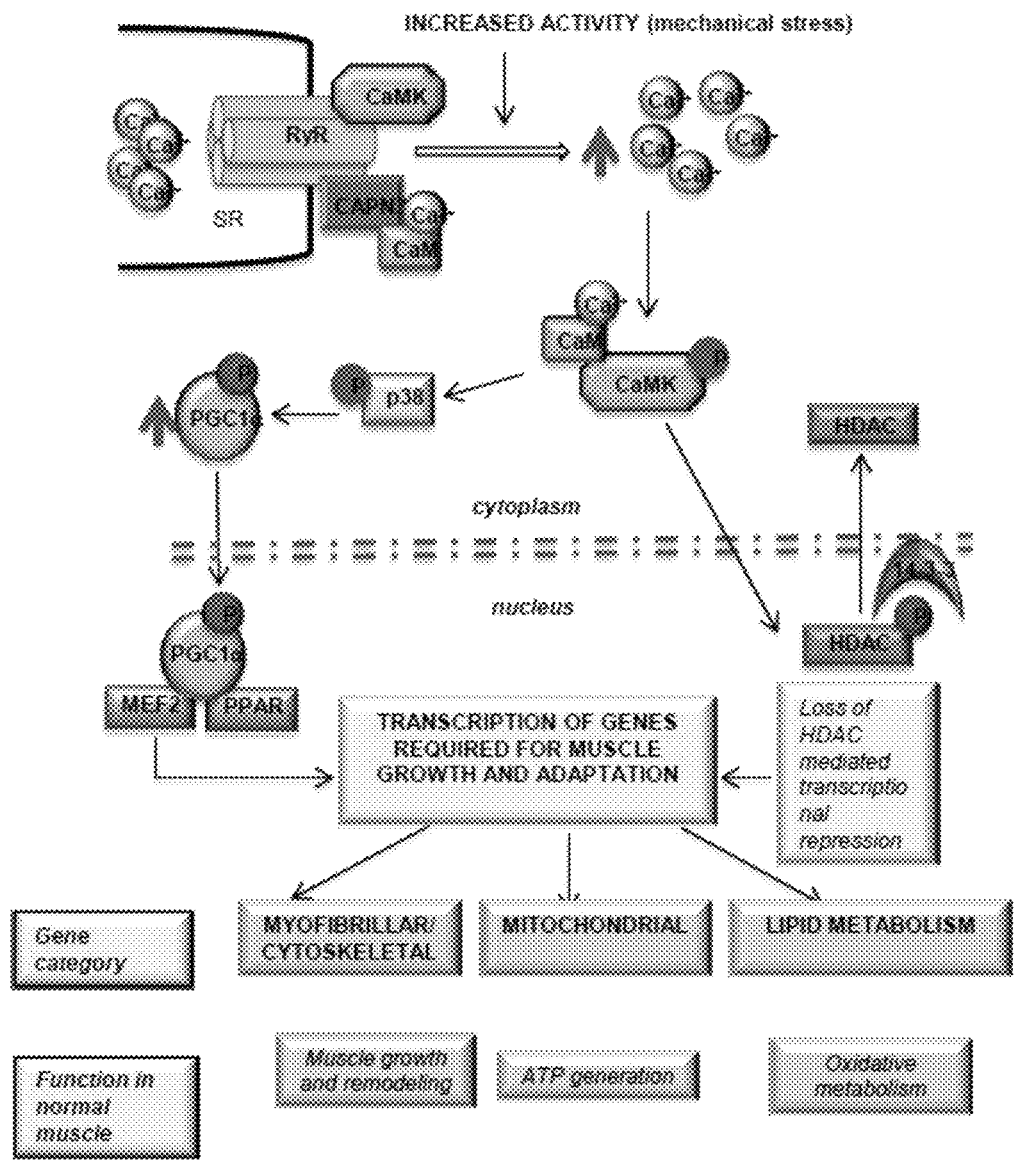
FIG. 8: Signaling pathways that are induced by exercise and activate gene transcription.
Figure 9:
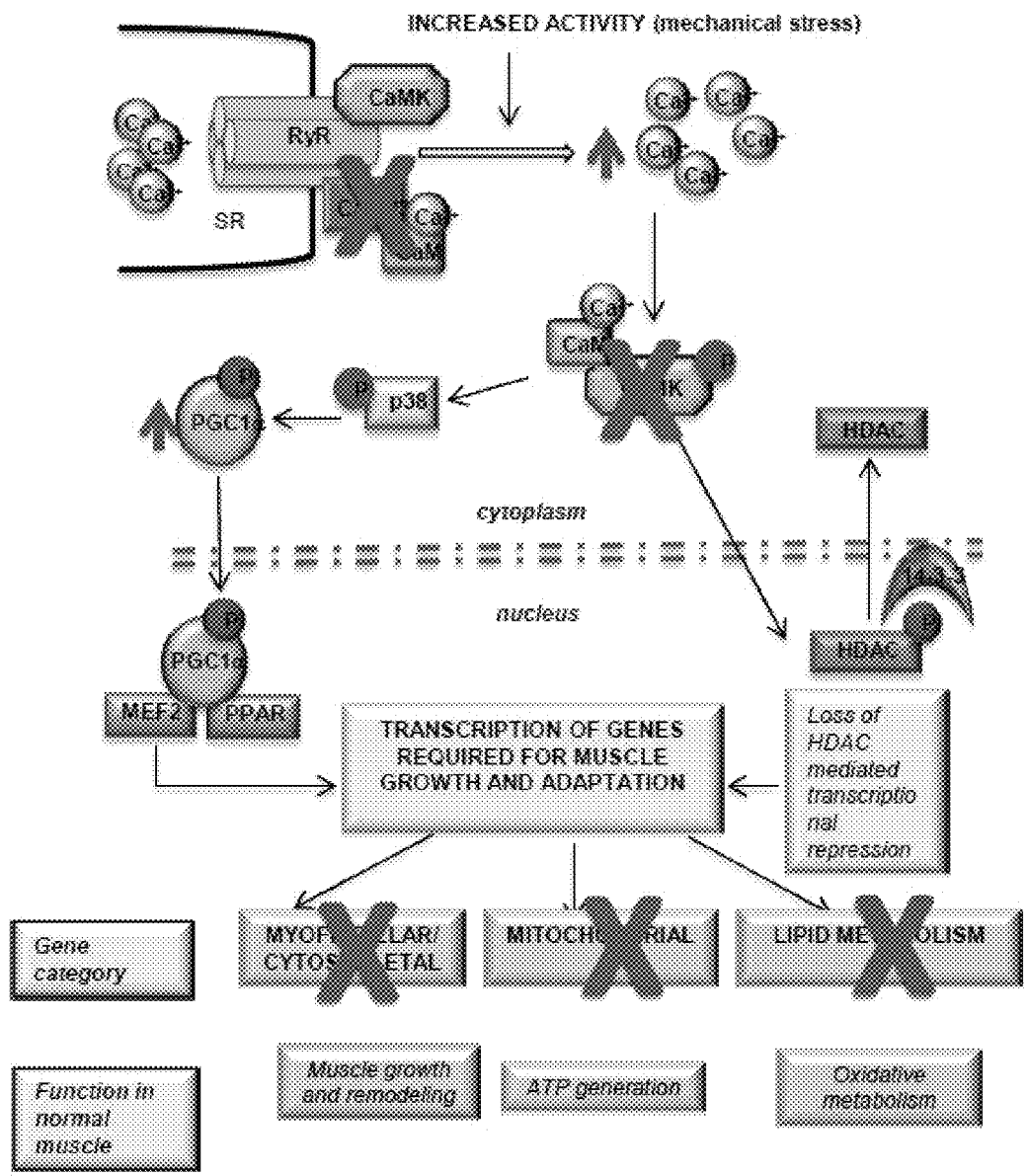
FIG. 9: In limb girdle muscular dystrophy type 2A, CAPN3 is mutated, leading to loss of CAMK signaling and blunted downstream gene transcription.
Figure 10:
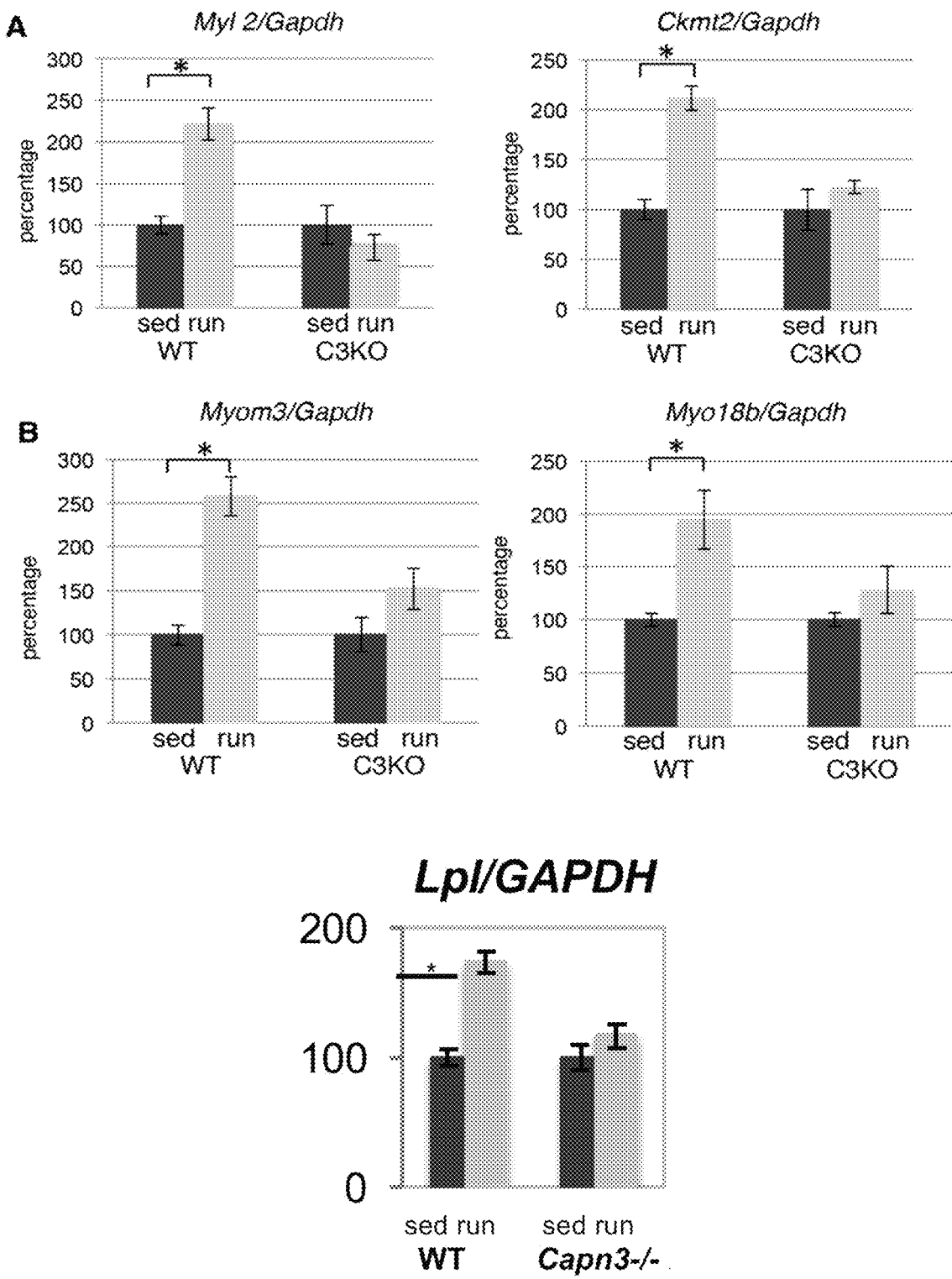
FIG. 10: Calpain 3-deficient muscles fail to properly induce myofibrillar genes after exercise or during muscle loading that follows a bout of atrophy.

Exercise does not induce proper myofibrillar gene expression in $C_3$KO muscles. Limb girdle muscular dystrophy type 2A/R1/D1 (LGMD2A/R1/D1) is caused by mutations in the gene encoding the non-lysosomal, cysteine protease calpain 3 (CAPN3). Muscles from patients and mice lacking CAPN3 have greatly reduced muscle bulk; however, unlike the dystrophinopathies, their sarcolemmal membrane is stable, suggesting that pathogenic mechanisms of LGMD2A differ from the dystrophinopathies. CAPN3 localizes to several subcellular compartments, including triads, where it is activated by calmodulin and plays a yet undefined role in calcium release. Previous studies from the inventors have shown that muscles from CAPN3 knockout (C3KO) mice do not grow following a bout of atrophy. Concomitantly, Ca-calmodulin protein kinase II (CaMKII) signaling is compromised. While muscles of WT mice subjected to exercise training increase expression of several slow genes such as Myl2, Mybph, and Ckmt2, muscles of C3KO mice do not exhibit these adaptive changes to exercise. Similarly, myofibrillar, cytoskeletal, mitochondrial, and lipid metabolism genes are also blunted in C3KO mice. Consistent with the mouse studies, a preferential pathological involvement of slow fibers in LGMD2A biopsies was observed. FIG. 8 shows signaling pathways that are induced by exercise and activate gene transcription. FIG. 9 shows in limb girdle muscular dystrophy type 2A, CAPN3 is absent, leading to reduced CAMK signaling and blunted downstream gene transcription. RT-PCR validation of gene expression levels for sarcomere-associated proteins (Myl2—regulatory myosin light chain 2, cardiac, slow; Ckmt2—mitochondrial creatine kinase; Myom3—myomesin 3; Myo18b—myosin 18b) in plantaris muscles. The expression level of the exercised (run) group is graphed relative to the sedentary (sed) controls (FIG. 10). qPCR validation of the genes in the RNAseq data set. Myl2, Ckmt2 and Lpl are all downstream targets of CAMKIIβ

Example 2

AMBMP over-rides the CAMKII signaling block and treats LGMD2A. Enhancing the expression of CaMKII induced genes represents a novel target for LGMD2A. The chemical compounds that activate these slow genes may be of therapeutic potential for LGMD2A/R1/D1. Furthermore, these studies identified a pathway that is involved in normal muscle remodeling, e.g. promotion of growth after atrophy and promotion of oxidative metabolism. Drugs that act on this pathway may be beneficial for many types of muscle conditions such as cancer cachexia, sarcopenia due to aging and extended bed rest. Previous studies, as discussed in WO2017/208211 have identified AMBMP (Formula VI) as a drug to over-ride the CAMKII signaling block and treat LGMD2A.

Figure 11:
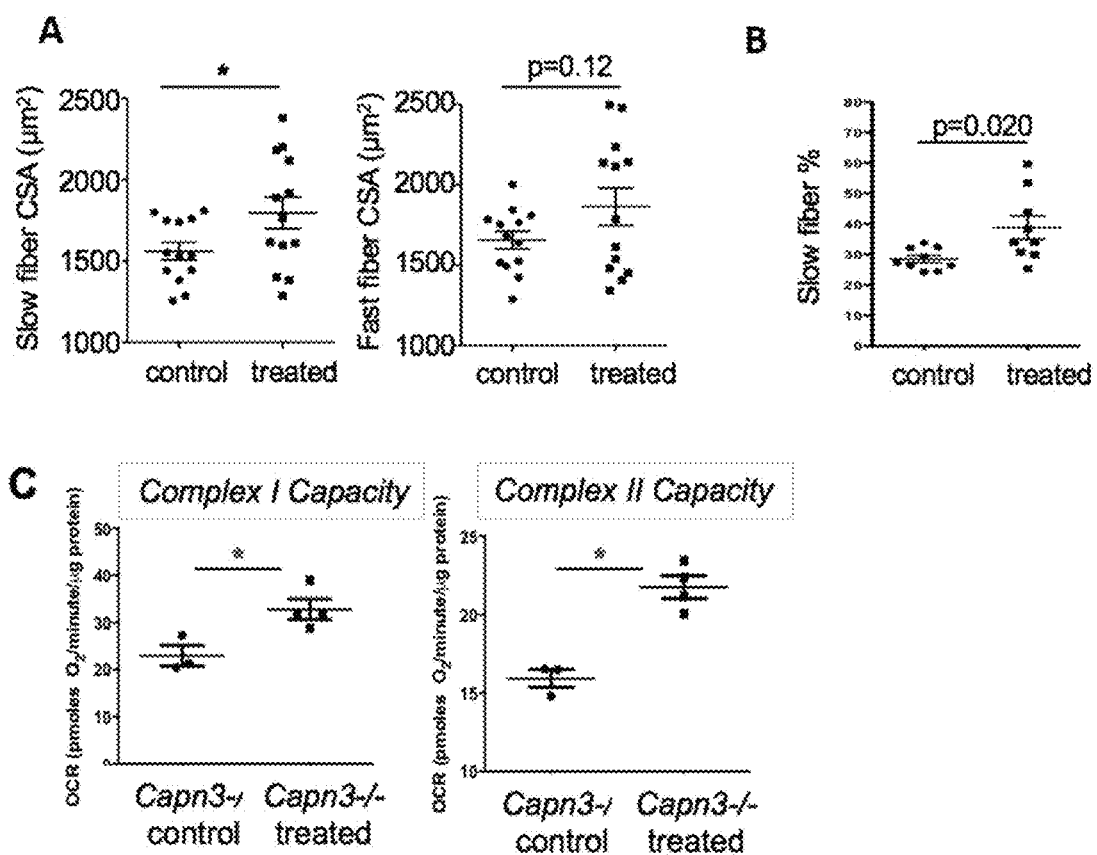
FIG. 11: C3KO mice treated with AMBMP show increased slow muscle fiber diameter.

FIG. 11 shows AMBMP leads to increased slow muscle fiber diameter. Average cross-sectional area (CSA) measured in muscle cross sections after staining for fiber type. Both fiber types show an increase but only cross-sectional area of slow fibers is significantly increased. A) C3KO mice i.p. injected with AMBMP hydrochloride (7.5 mg/kg/day) for 14 days. B) C3KO mice treated AMBMP hydrochloride (7.5 mg/kg/day) for 14 days by subcutaneous (subQ) injection. C3KO mice i.p. injected with AMBMP hydrochloride (7.5 mg/kg/day) for 14 days show (C) improved mitochondrial function, compared to control (mice not treated with AMBMP. *p<0.05, bars=SD.

Figure 12:
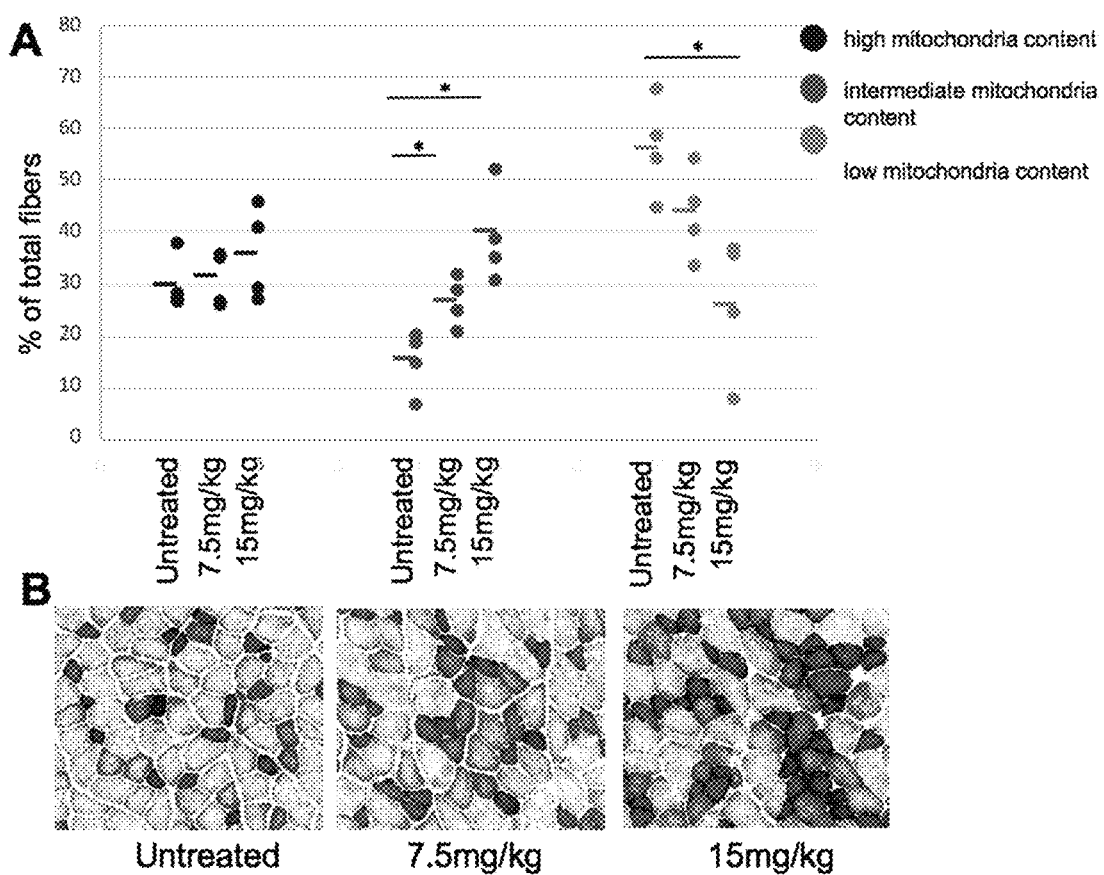
FIG. 12: C3KO mice treated with AMBMP show increased mitochondrial oxidative function in a dose dependent manner.
Figure 12:
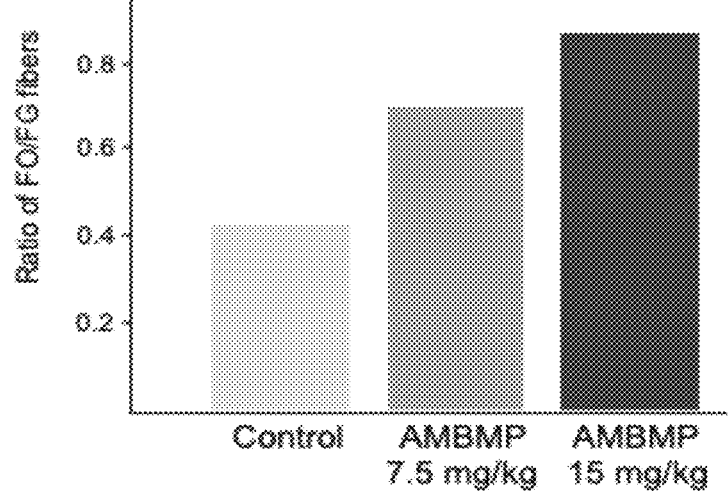

Shown in FIG. 12, C3KO mice treated (i.p. injected) with AMBMP hydrochloride for 2 weeks show increased mitochondrial content in a dose dependent manner. One set of C3KO mice were i.p. injected with AMBMP hydrochloride (7.5 mg/kg/day) for 14 days, another set of C3KO mice were i.p. injected with AMBMP hydrochloride (15 mg/kg/day) for 14 days and a control set of C3KO mice were not treated with AMBMP. Percent of total fibers with high mitochondrial content and intermediate mitochondrial content increased with AMBMP treatment in a dose dependent manner, and percent of total fibers with low mitochondrial content decreased with AMBMP treatment in a dose dependent manner (FIG. 12A). FIG. 12 B shows sections of muscles stained for NADH (darker stain equals higher oxidative capacity). Quantification of NADH staining on plantaris muscles from AMBMP-treated mice (either 7.5 or 15 mg/kg, for 2 weeks (wks)) shown as a ratio of FOG:FG fibers. *p<0.05. AMBMP treatment increased mitochondrial content in a dose dependent manner.

Figure 13:
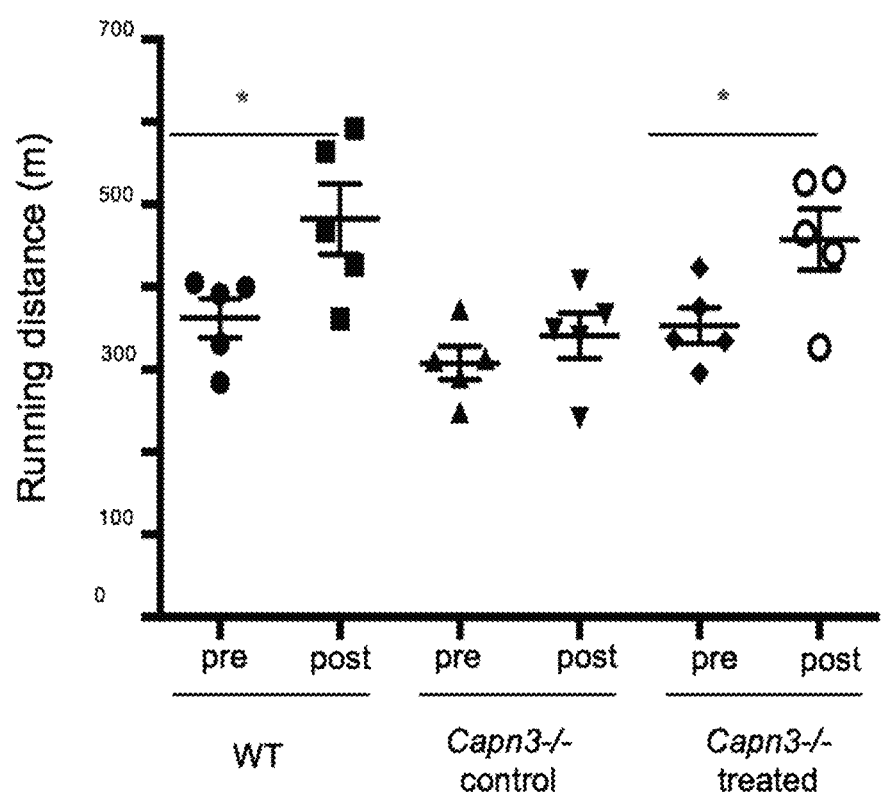
FIG. 13: AMBMP treatment leads to improved exercise performance.

Shown in FIG. 13, AMBMP treatment leads to improved exercise performance. Mice were subjected to endurance training over a 3-week period while being treated. Exercise performance was compared between pre and post exercise condition. Wild type (WT) mice were not treated with AMBMP. WT type mice show a training effect. A set of C3KO mice were not treated with AMBMP and do not show a training effect. Another set of C3KO mice were i.p. injected with AMBMP hydrochloride (7.5 mg/kg/day) for 14 days and show a training effect.

Figure 14:
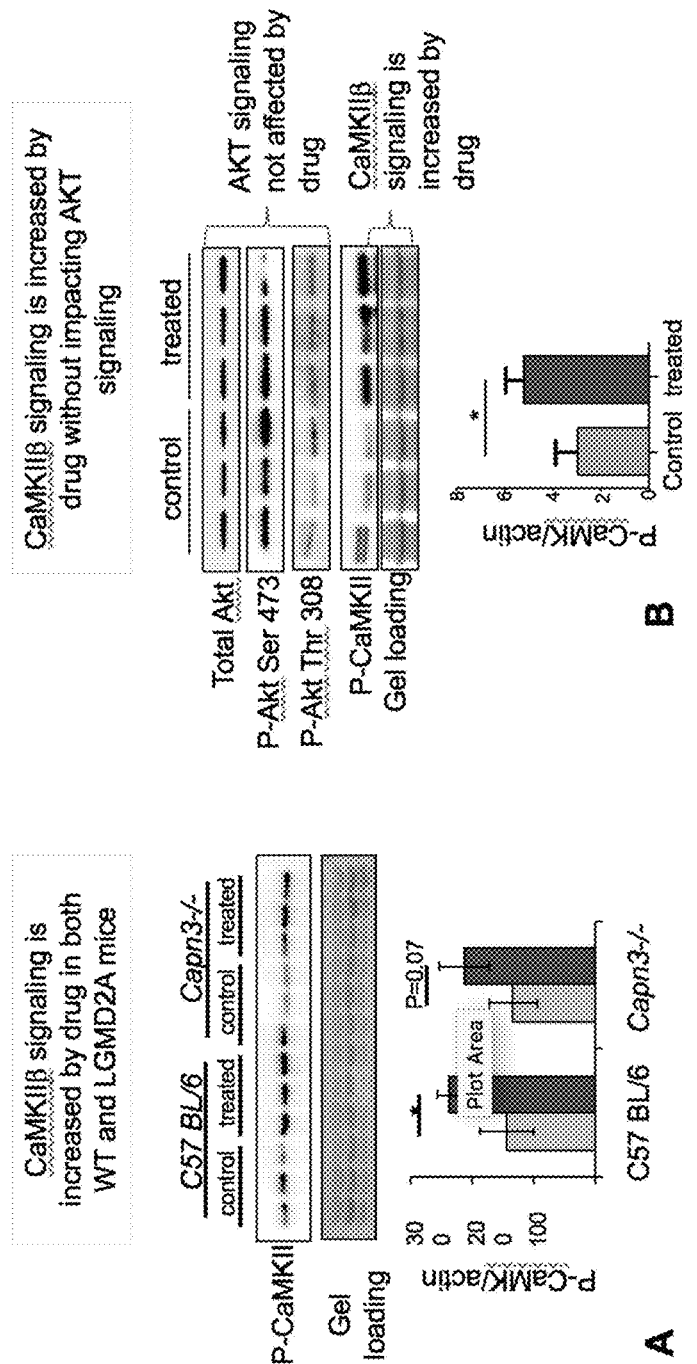
FIG. 14: AMBMP treatment increases CaMKIIβ activity, but neither AMPK nor AKT signaling are affected.

Shown in FIG. 14, C3KO mice treated with AMBMP have normalized CaMKIIβ activity, but AKT or AMPK signaling are not affected. C3KO mice and WT mice i.p. injected with 7.5 mg/kg/day of AMBMP hydrochloride for 2 weeks show increased CaMKIIβ activity over respective untreated control (FIG. 14 A). C3KO mice i.p. injected with 7.5 mg/kg/day of AMBMP hydrochloride for 2 weeks show increased CaMKIIβ activity over untreated control without impacting AKT or AMPK signaling (FIG. 14 B).

Figure 15:
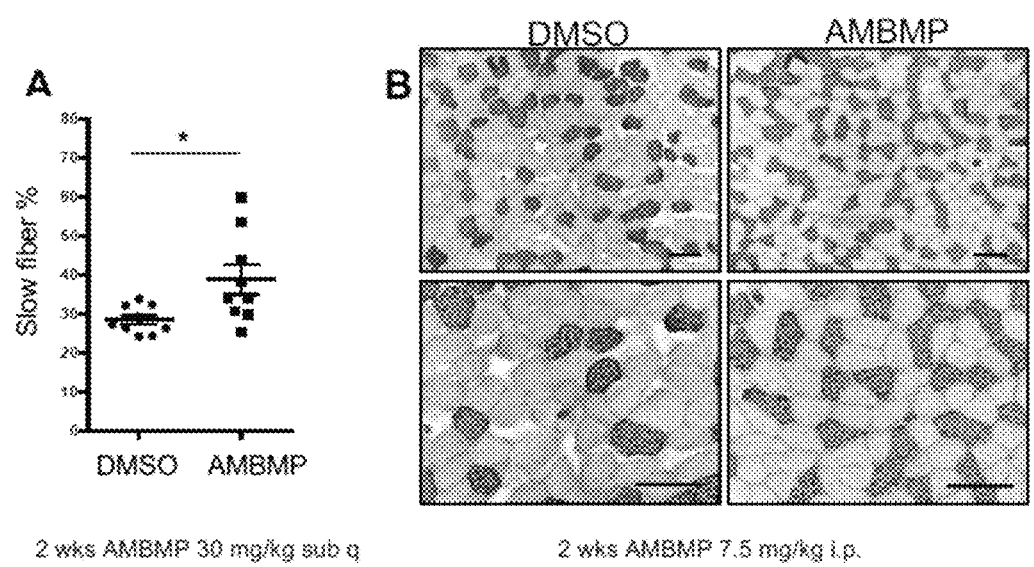
FIG. 15: AMBMP increases slow oxidative fibers in calpainopathy mice.

FIG. 15 shows AMBMP shifts the percent of slow fibers in Capn3−/− muscles. A) Statistically significant shift in % slow myosin heavy chain positive fibers in soleus from calpainopathy mice treated with daily AMBMP for 2 wks at 30 mg/kg subQ; B) cross sections of calpainopathy muscles stained for slow myosin, treated for 2 wks with daily AMBMP 7.5 mg/kg.

Example 3

Figure 16:
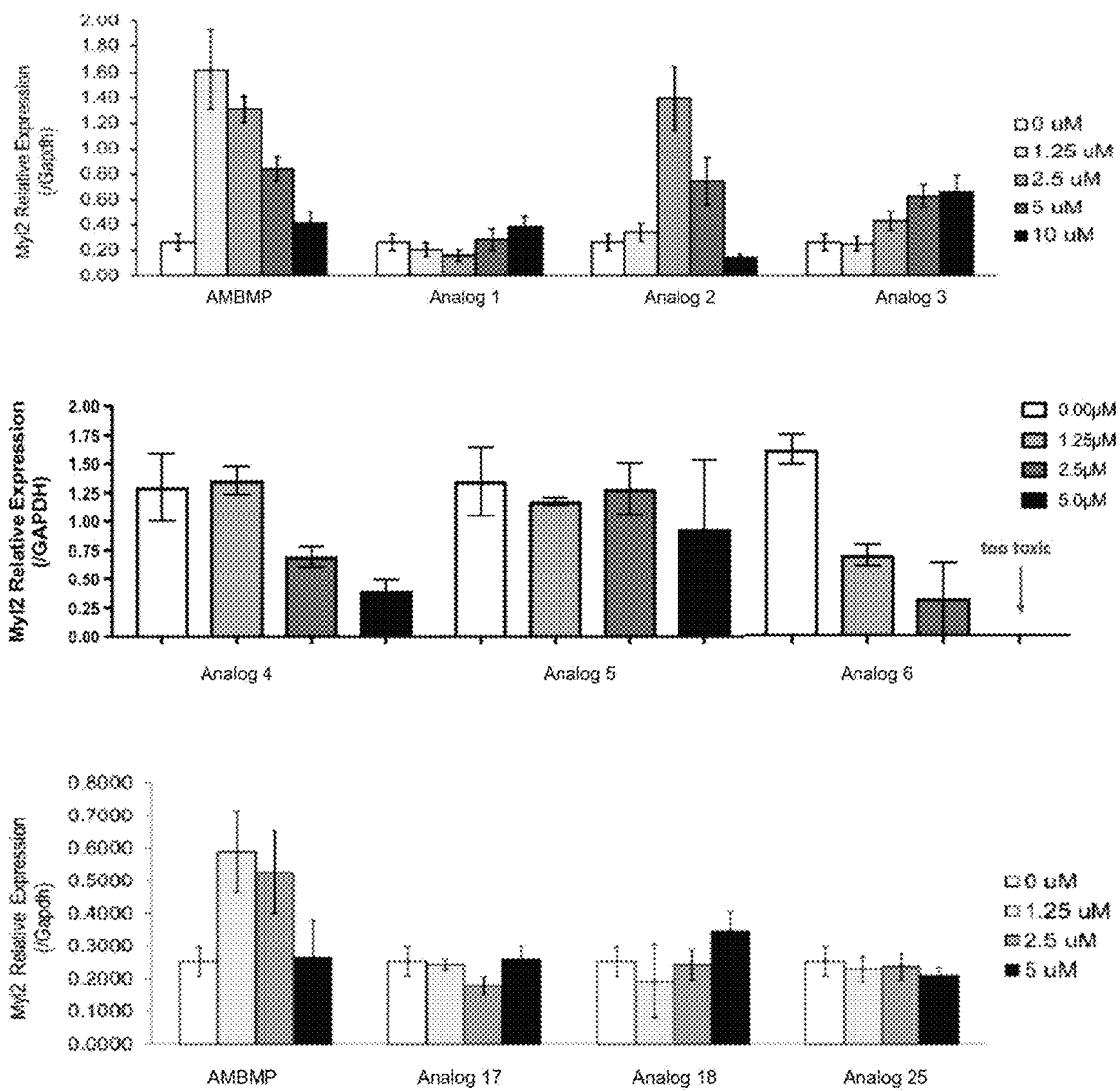
FIG. 16: A) Relative expression of myosin light chain-2 (Myl2) genes with 0.0 μM, 1.25 μM, 2.5 μM, 5 μM AMBMP analog 1-6, 17, 18, and 25 treatment. B) CaMKIIβ activation in mouse skeletal muscles collected after injection of 10 mg/kg of AMBMP analog 3, as shown by phospho-CaMKIIβ (P-CaMKII or P-CaMK) activity assessed by western blotting using anti-phospho CaMKIIβ antibody. C) assessment of P-CaMK for mice injected intraperitoneally with 10 mg/kg of AMBMP analog 3 normalized to gel load. D) Myl2 expression in plantaris muscles assessed by RT-PCR for mice injected intraperitoneally with 10 mg/kg of AMBMP analog 3, expression of Myl2 was normalized to GAPDH as a house-keeping control gene. E) expression of Myl2 was normalized to GAPDH for C2C12 myogenic cells treated with AMBMP (concentrations 1.25 μM, 2.5 μM) and AMBMP analog 40 (1.25 μM, 5 μM) for 48 hrs.
Figure 16:
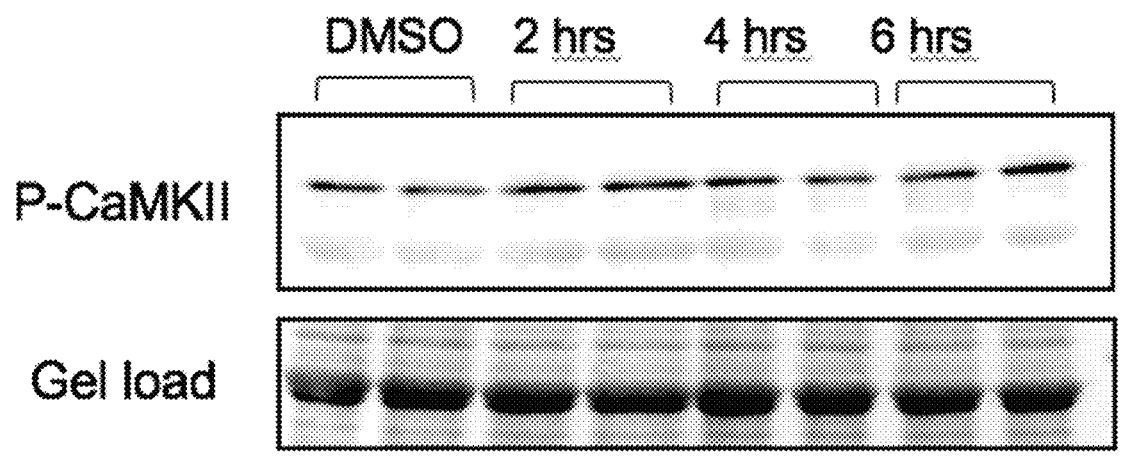
Figure 16:
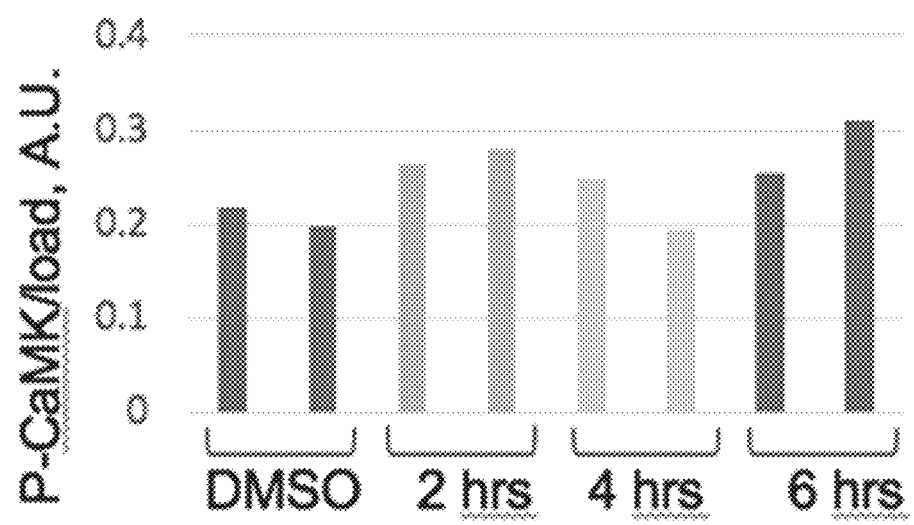
Figure 16:
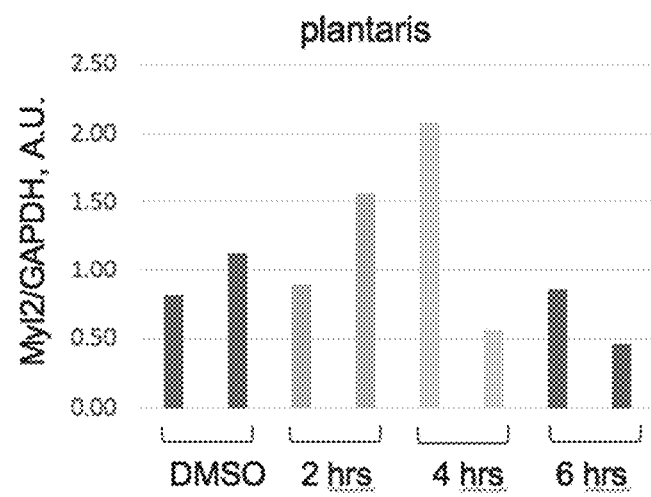
Figure 16:
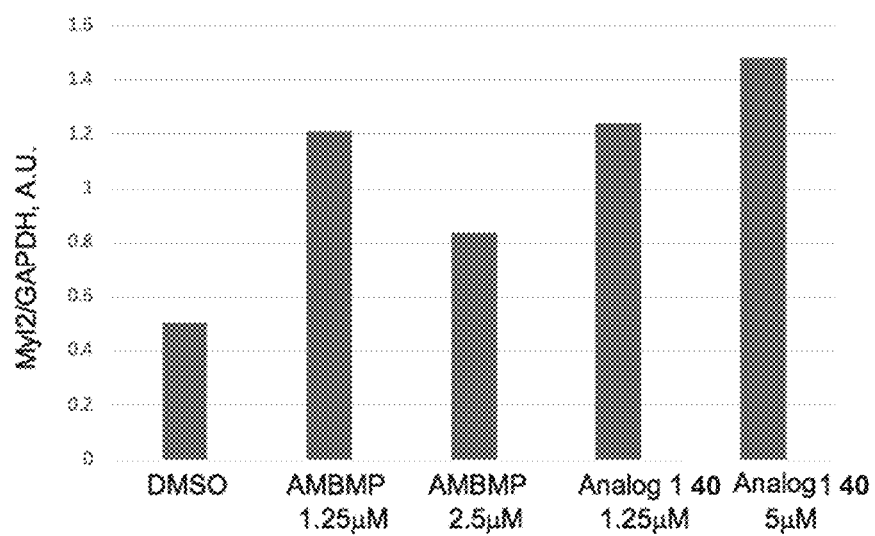

Bioactivity data of AMBMP analogs 1-6, 17, 18, and 25. Dose dependent effect of AMBMP analogs 1-6, 17, 18, and 25 on endogenous Myosin light chain-2 (Myl2) expression in C2C12 cells is shown in FIG. 16 A.

Effect of 2.5 μM AMBMP analog 1-6, 8, 17, 21, 25, 38, 39, and 40 on Myl2 expression relative to GAPDH (housekeeping control gene) in C2C12 cells is shown in Table 1. Myl2 is a marker of CaMKIIβ activity.

TABLE 1

Myl2 expression in C2C12 cells

| Compound injected | Myl2 Relative expression/ Gapdh at 2.5 μM |
|---|---|
| AMBMP | 1.4 |
| AMBMP Analog 17 | 0.2 |
| AMBMP Analog 39 | 0.2 |
| AMBMP Analog 25 | 0.2 |
| AMBMP Analog 1 | 0.2 |
| AMBMP Analog 2 | 1.4 |
| AMBMP Analog 3 | 0.4 |
| AMBMP Analog 4 | 2 |
| AMBMP Analog 5 | 0.6 |
| AMBMP Analog 6 | 1.2 |
| AMBMP Analog 8 | 0.6 |
| AMBMP Analog 21 | 0.6 |
| AMBMP Analog 38 | 1 |
| AMBMP Analog 40 | 1.2 |

AMBMP analog 3 was tested in vivo for its ability to induce CaMKIIβ activation and Myl2 gene expression. Mice were injected intraperitoneally with 10 mg/kg of AMBMP analog 3. Skeletal muscles were collected at 2, 4 and 6 hrs after injection. Mice injected with DMSO were used as a control group. FIG. 16 B shows CaMKIIβ activation in the mouse skeletal muscles, as shown by phospho-CaMKIIβ (P-CaMKII or P-CaMK) expression assessed by western blotting using anti-phospho CaMKIIβ antibody. FIG. 16 C shows levels of P-CaMK normalized for gel load. FIG. 16 D shows Myl2 expression in plantaris muscles assessed by RT-PCR and normalized to GAPDH as a housekeeping control gene (each bar is one mouse).

AMBMP analog 40 was tested in C2C12 myogenic cells for its ability to induce expression of Myl2. C2C12 cells were treated with AMBMP or AMBMP analog 40 for 48 hrs (concentrations are indicated on the graph); DMSO was used as a negative control. Expression of Myl2 was assessed by RT-PCR and normalized to GAPDH as a house-keeping control gene. As shown in FIG. 16 E, analog 40 induces a 2.5-2.9-fold increase of Myl2 expression. Analog 40 is also better tolerated by the cells compared to AMBMP (data not shown).

Example 4

Figure 17:
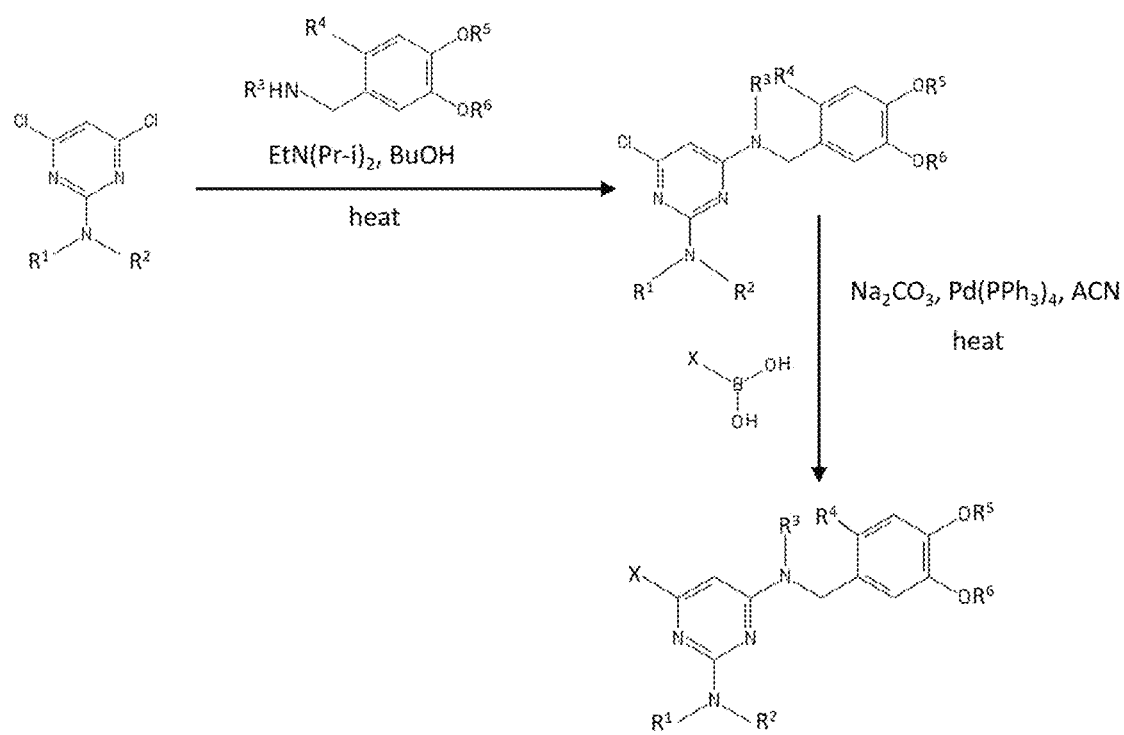
FIG. 17: AMBMP analog synthesis schemes: A) Scheme I; B) Scheme II; C) Scheme III; and D) Scheme IV.
Figure 17B:
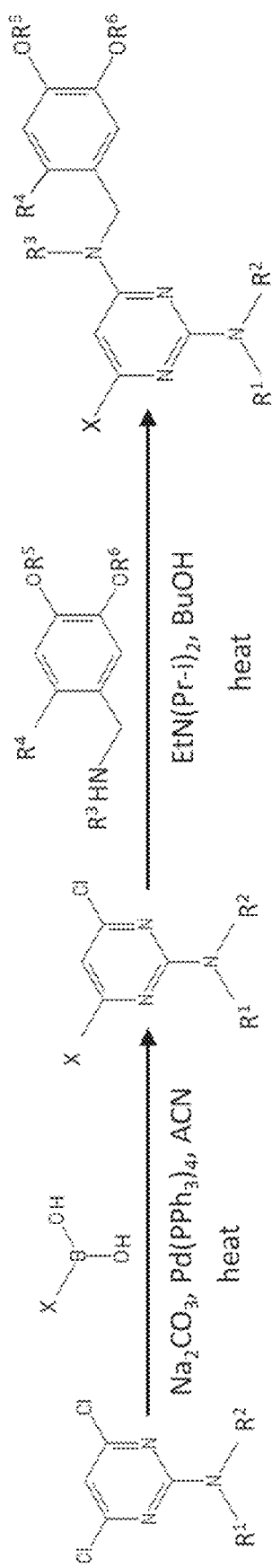
Figure 17C:
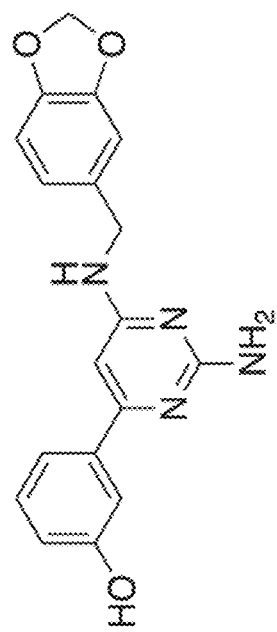
Figure 17C:
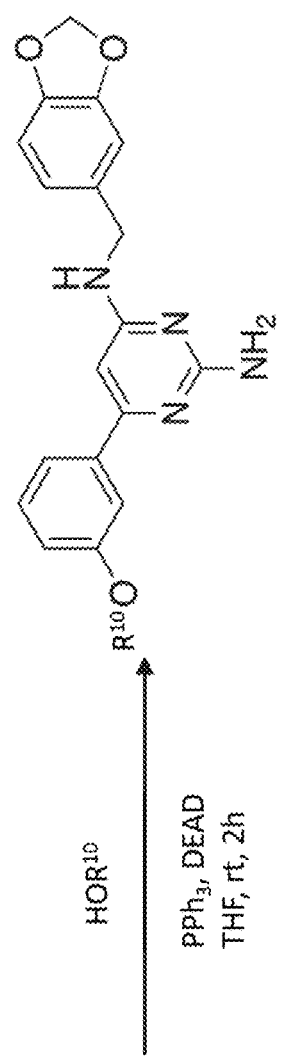
Figure 17D:
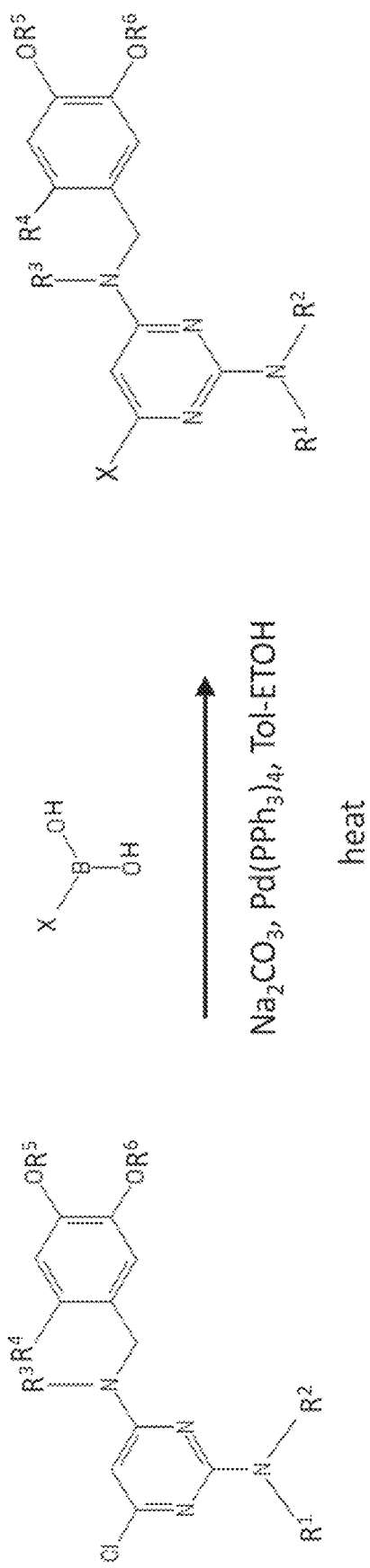
Figure 18:
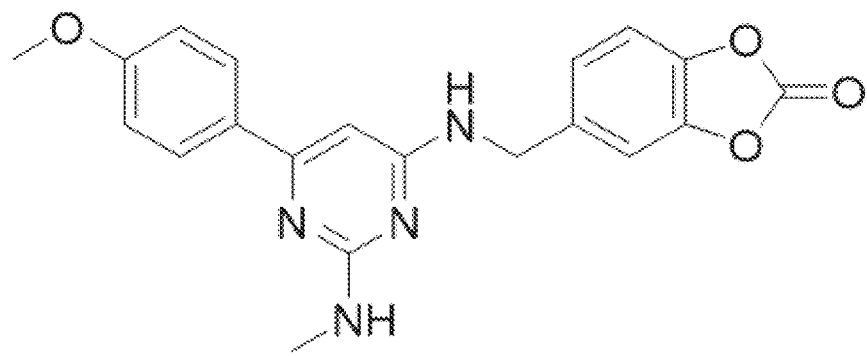
FIG. 18: A) AMBMP analog 46; B) AMBMP analog 47; C) AMBMP analog 48; D) AMBMP analog 49; E) AMBMP analog 50.
Figure 18:
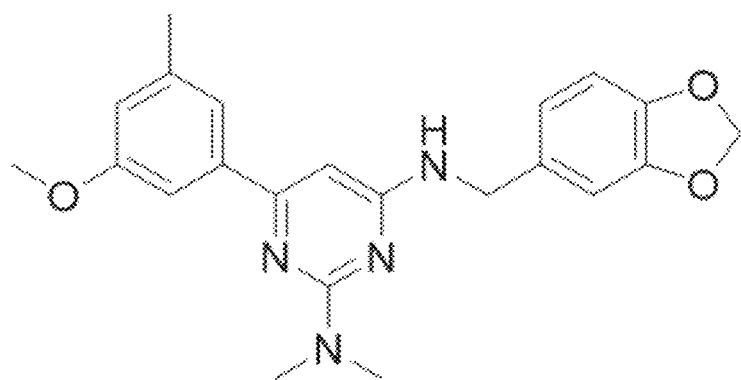
Figure 18:
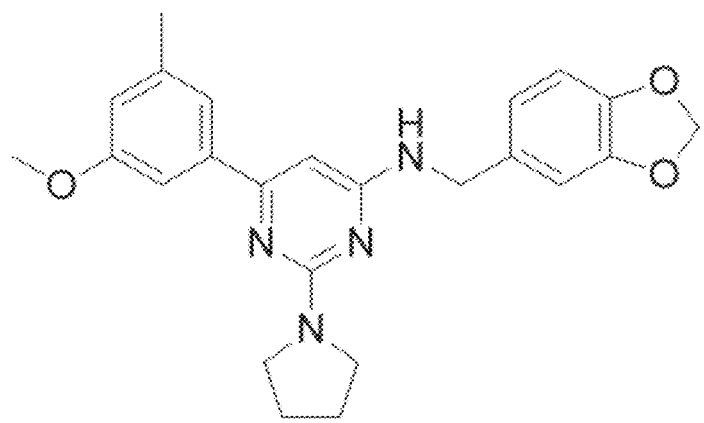
Figure 18:
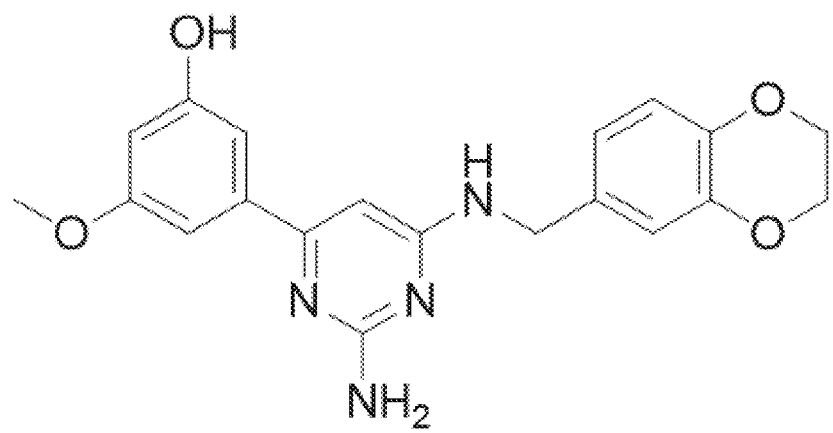
Figure 18:
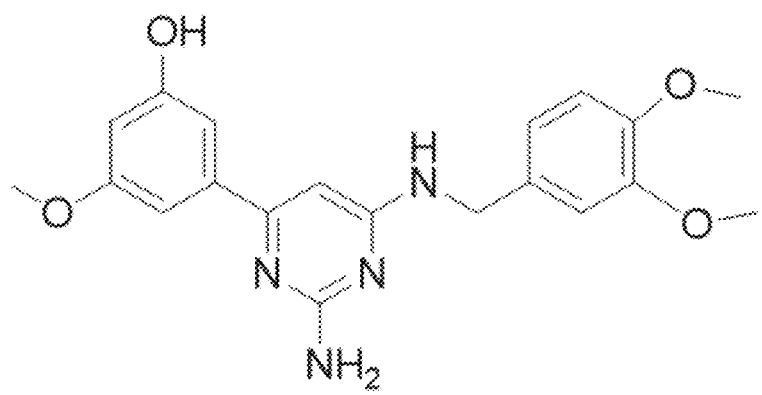
Figure 19:
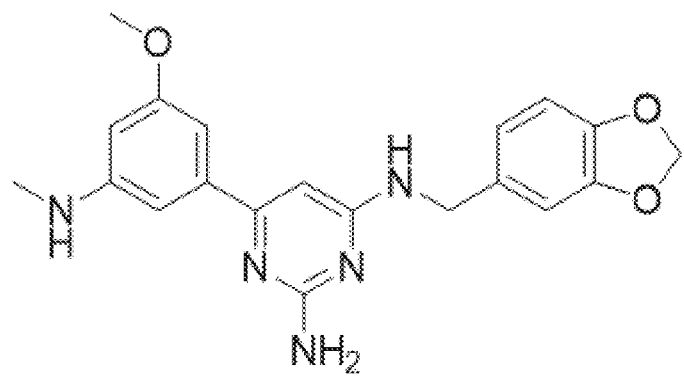
FIG. 19: A) AMBMP analog 51; B) AMBMP analog 52; C) AMBMP analog 53; D) AMBMP analog 54; E) AMBMP analog 55; F) AMBMP analog 56; G) AMBMP analog 57; H) AMBMP analog 58; I) AMBMP analog 59; J) AMBMP analog 60; K) AMBMP analog 61; L) AMBMP analog 62; M) AMBMP analog 63; N) AMBMP analog 64; O) AMBMP analog 65; P) AMBMP analog 66.
Figure 19:
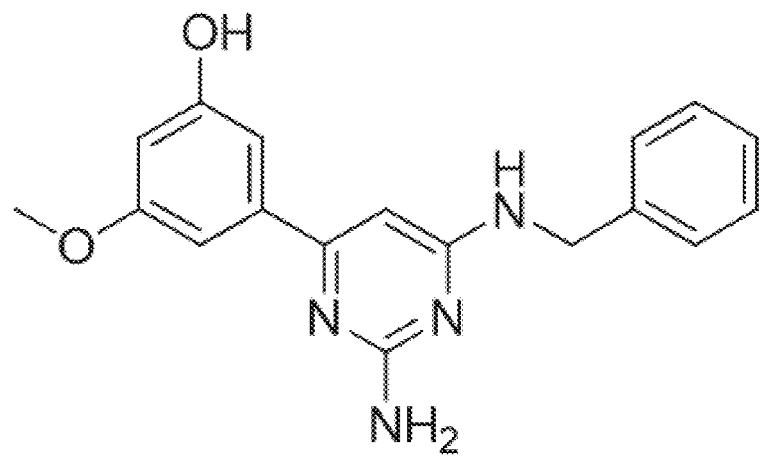
Figure 19:
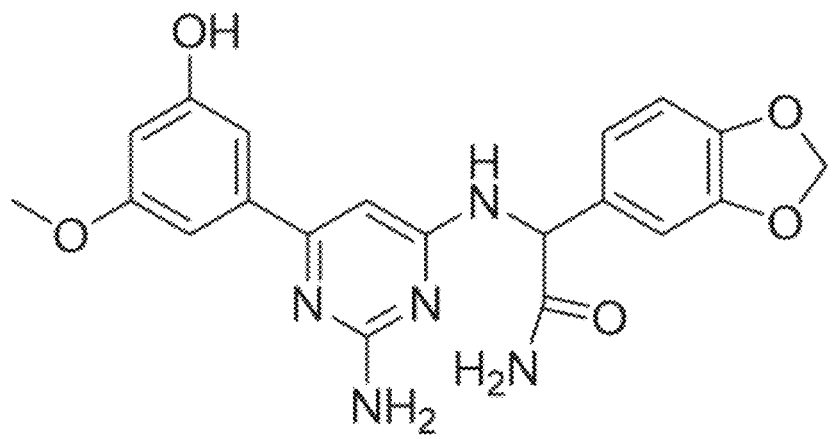
Figure 19:
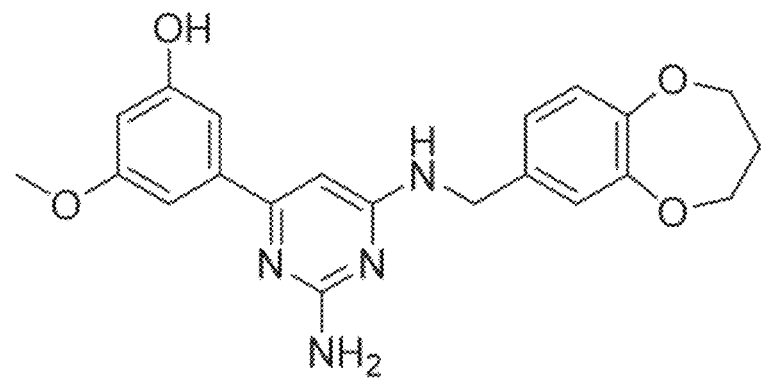
Figure 19:
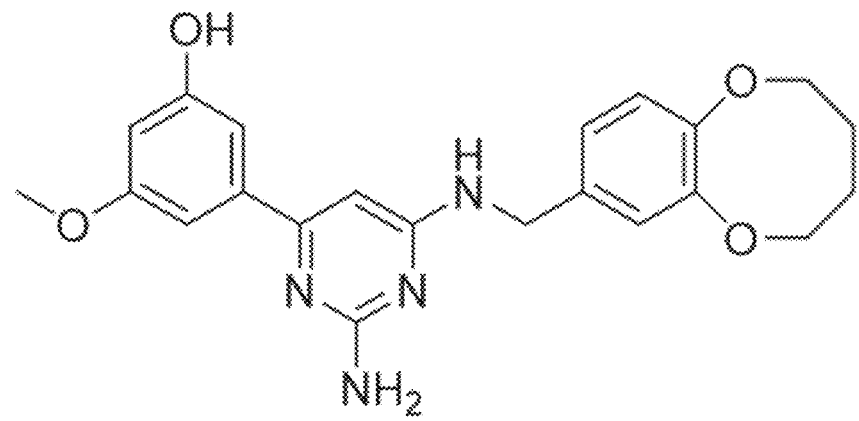
Figure 19:
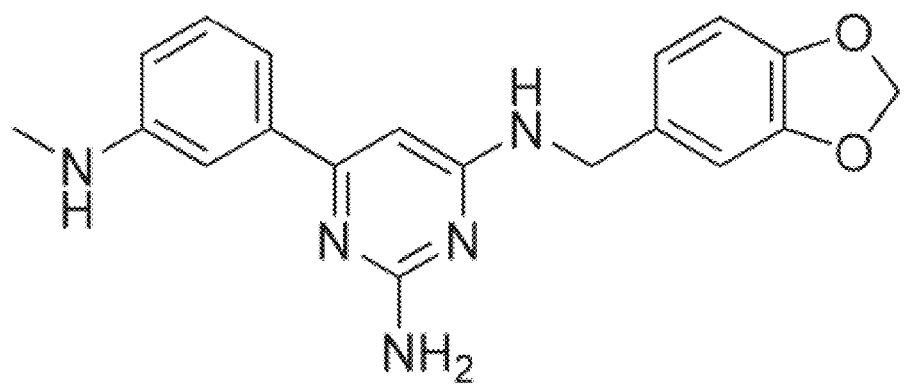
Figure 19:
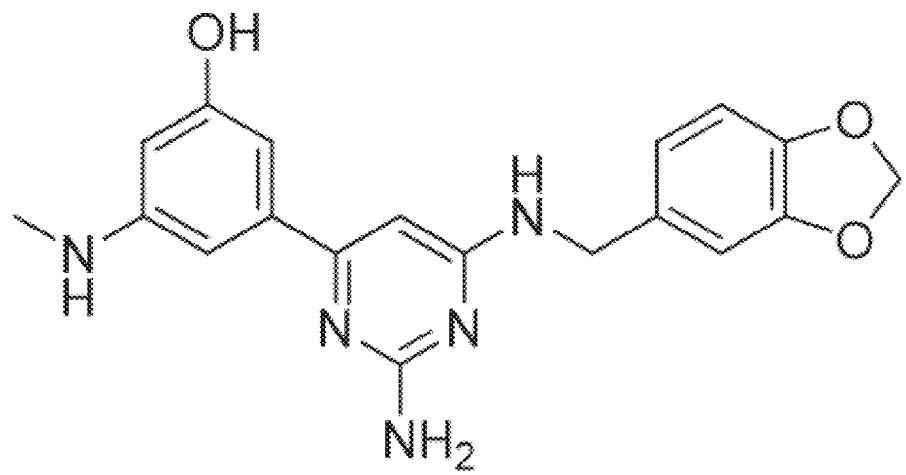
Figure 19:
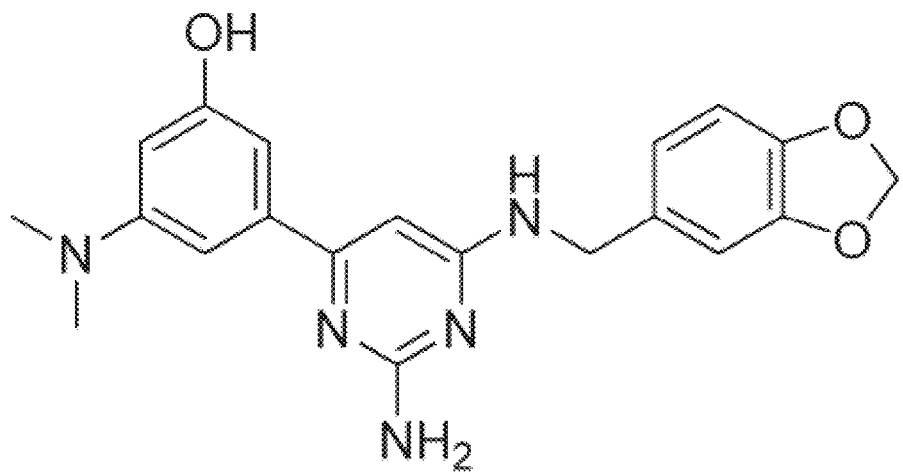
Figure 19:
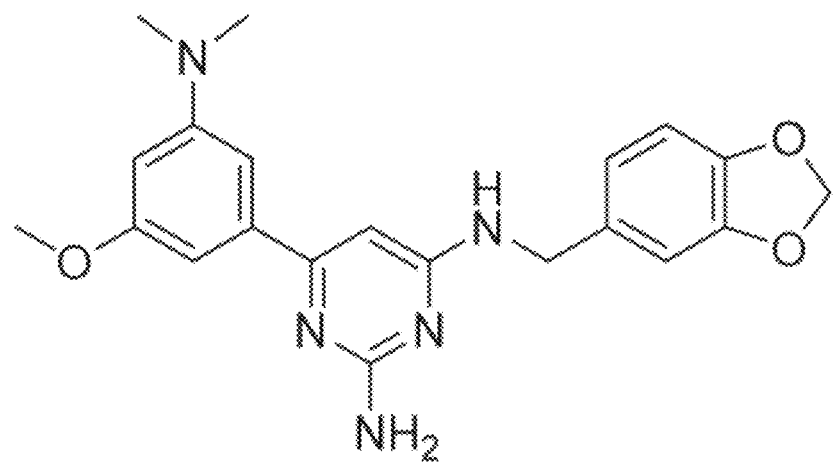
Figure 19:
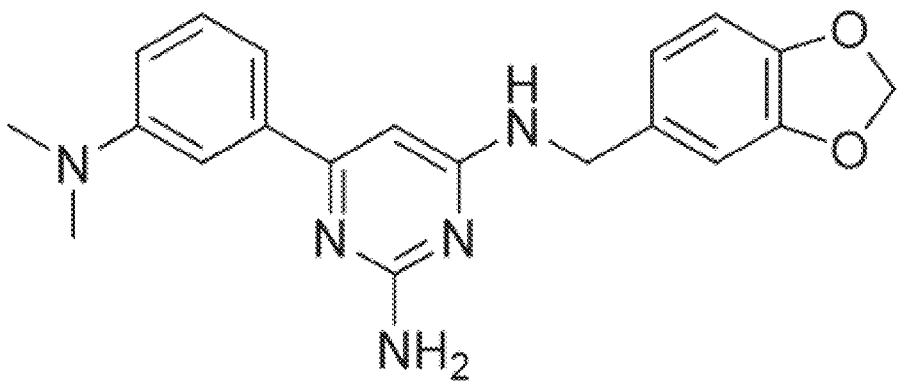
Figure 19:
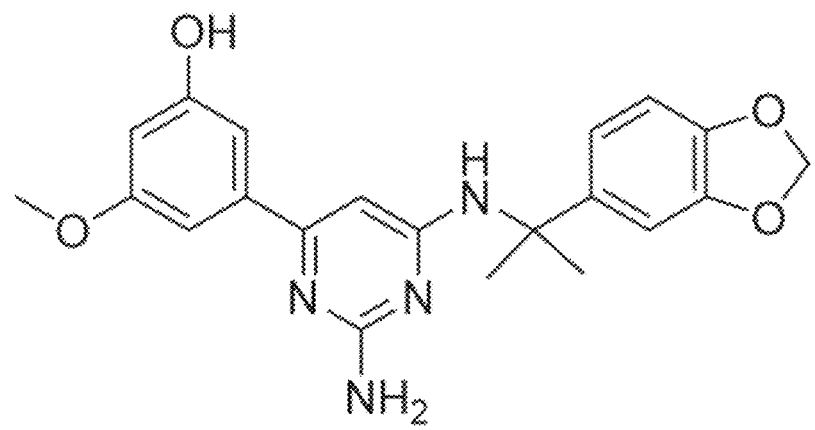
Figure 19:
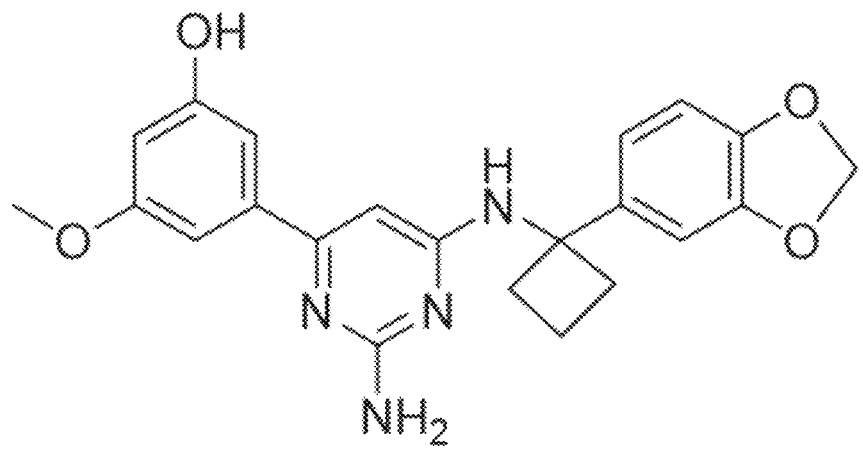
Figure 19:
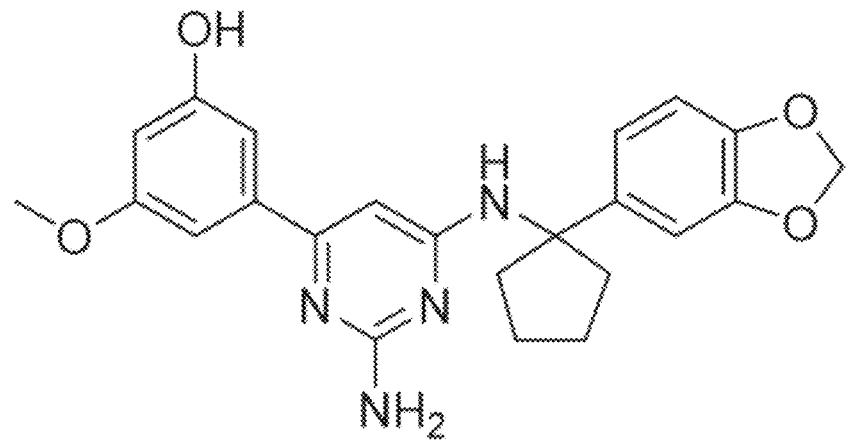
Figure 19:
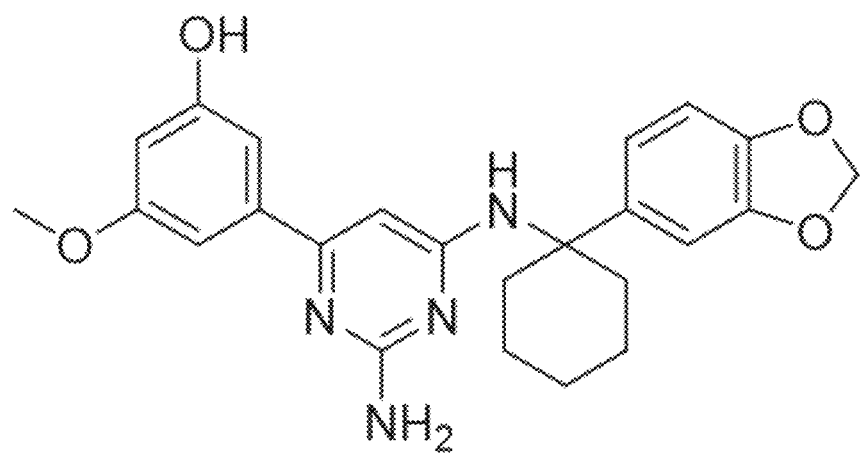
Figure 19:
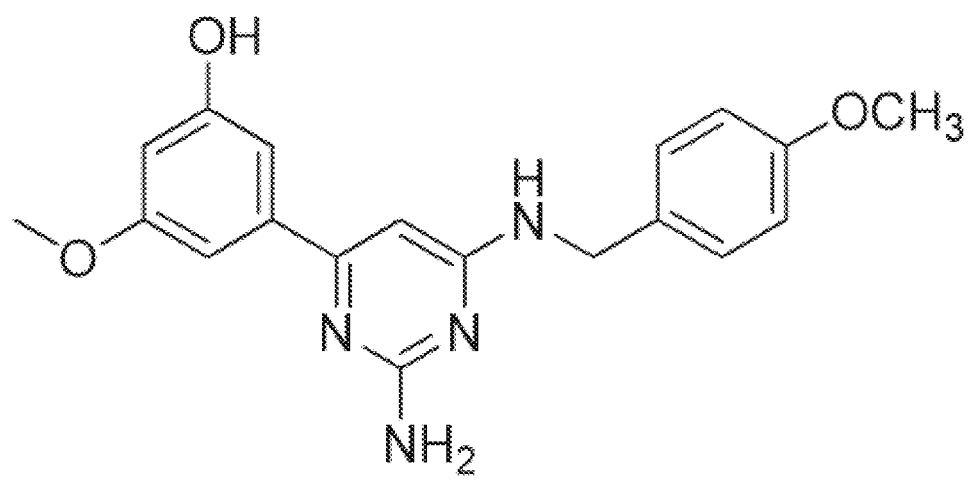
Figure 19:
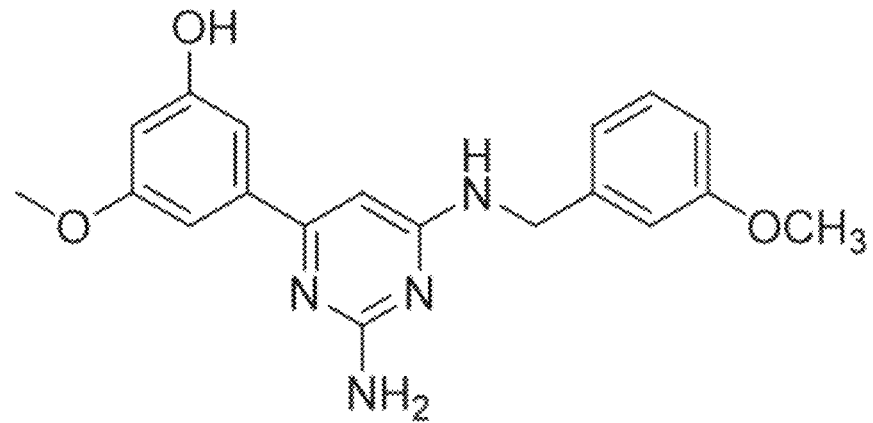

Synthesis of AMBMP analogs. AMBMP analogs were synthesized following one or more steps of the general scheme of I, II, III, and/or IV (FIG. 17).

AMBMP Analog 3 (FIG. 1C)

Method 1: AMBMP Analog 3 Was Synthesized According to Scheme I 4,6-dichloropyrimidine-2-amine was reacted with equivalent amount of benzo[d][1,3]dioxol-5-ylmethanamine in t-butanol. The reaction product was further reacted with equivalent amount of (3-hydroxyphenyl)boronic acid, in the presence of Pd(PPh$_3$)$_4$ in a column. The product obtained was subjected to purification using silica gel chromatography on Combiflash Rf 200 by employing hexane-EtOAc step gradient (95:5→80:20) over 30 min. Fractions corresponding to the product peak were combined and concentrated using rotavap to afford AMBMP analog 3. AMBMP analog 3 has log P of 2.47 The product was characterized by nuclear magnetic resonance spectroscopy (NMR).

Method 2: AMBMP Analog 3 Was Synthesized According to Scheme IV

N4-(benzo[d][1,3]dioxol-5-ylmethyl)-6-chloropyrimidine-2,4-diamine (500 mg, 1.79 mmol, 1.0 eq), ((3-hydroxyphenyl)boronic acid (493.80 mg, 3.58 mmol, 2.0 eq), sodium carbonate (758.89 mg, 7.16 mmol, 4.0 eq), and tetrakis(triphenylphosphine)-palladium(0) (1034.25 mg, 0.90 mmol, 0.5 eq) were added to a 125 mL glass pressure vessel and suspended in 25 mL of toluene-ethanol (2:1). The reaction mixture was stirred for 72 h at 110° C. under nitrogen. Upon cooling, the crude product was filtered through celite and the filtrate was collected and concentrated under reduced pressure. The concentrate was then washed with NaHCO$_3$ and extracted with ethyl acetate (4×30 mL). The organic layer was collected, dried with Na$_2$SO$_4$ and then purified by flash chromatography using a gradient method with DCM and methanol. Fractions containing the product were combined and concentrated under reduced pressure to yield the final product, 3-(2-amino-6-((benzo[d][1,3]dioxol-5-ylmethyl)amino)pyrimidin-4-yl)phenol (white powder, 50 mg, 8.3% yield).

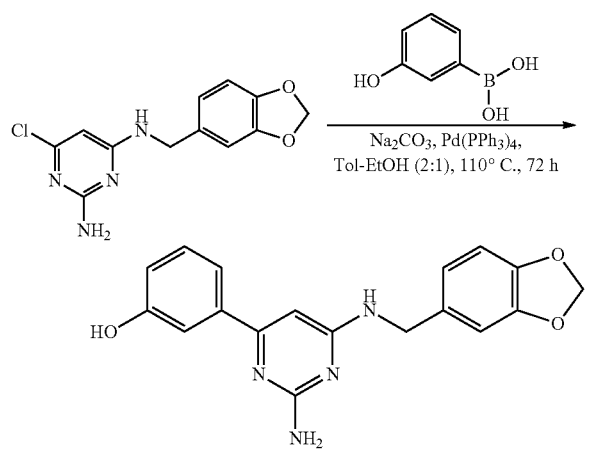

AMBMP Analog 4 (FIG. 1D)

AMBMP analog 4 was synthesized according to scheme I. 4,6-dichloropyrimidine-2-amine was reacted with equivalent amount of benzo[d][1,3]dioxol-5-ylmethanamine in t-butanol. The reaction product was further reacted with equivalent amount of (3-(ethoxy)phenyl)boronic acid, in the presence of Pd(PPh$_3$)$_4$ in a column. The product obtained was subjected to purification using silica gel chromatography on Combiflash Rf 200 by employing hexane-EtOAc step gradient (95:5→80:20) over 30 min. Fractions corresponding to the product peak were combined and concentrated using rotavap to afford AMBMP analog 4 in 60% yield. The product was characterized by NMR.

Alternatively AMBMP analog 4 was synthesized according to scheme IV.

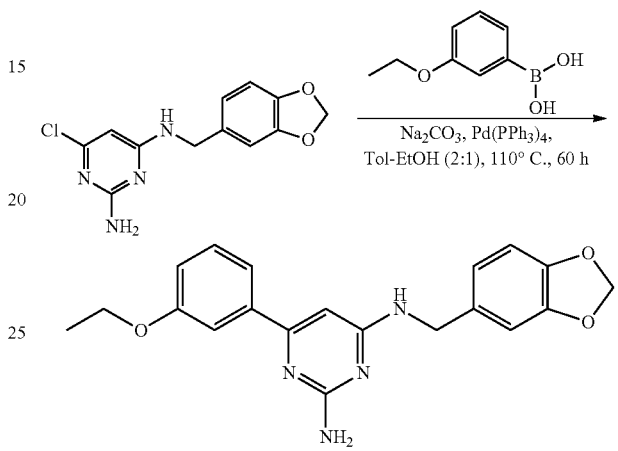

AMBMP Analog 5 (FIG. 1E)

AMBMP analog 5 was synthesized according to scheme I. 4,6-dichloropyrimidine-2-amine was reacted with equivalent amount of benzo[d][1,3]dioxol-5-ylmethanamine in t-butanol. The reaction product was further reacted with equivalent amount of (3-(propoxy)phenyl)boronic acid, in the presence of Pd(PPh$_3$)$_4$ in a column. The product obtained was subjected to purification using silica gel chromatography on Combiflash Rf 200 by employing hexane-EtOAc step gradient (95:5→80:20) over 30 min. Fractions corresponding to the product peak were combined and concentrated using rotavap to afford AMBMP analog 5 in 48% yield. The product was characterized by NMR.

Alternatively AMBMP analog 5 was synthesized according to scheme IV.

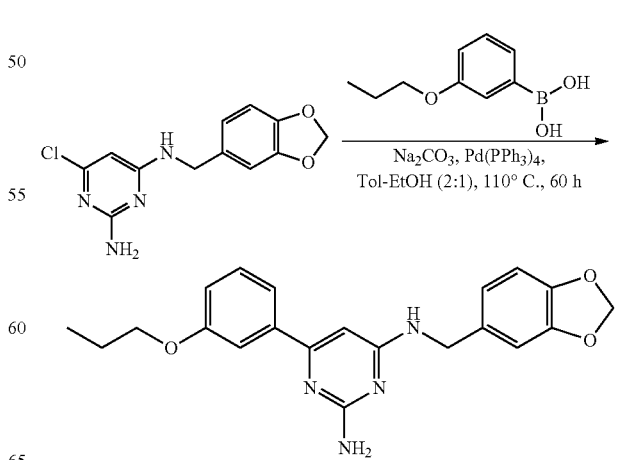

AMBMP Analog 6 (FIG. 1F)

AMBMP analog 6 was synthesized according to scheme I. 4,6-dichloropyrimidine-2-amine was reacted with equivalent amount of benzo[d][1,3]dioxol-5-ylmethanamine in t-butanol. The reaction product was further reacted with equivalent amount of (3-(tert-butoxy)phenyl)boronic acid, in the presence of Pd(PPh₃)₄ in a column. The product obtained was subjected to purification using silica gel chromatography on Combiflash Rf 200 by employing hexane-EtOAc step gradient (95:5→80:20) over 30 min. Fractions corresponding to the product peak were combined and concentrated using rotavap to afford AMBMP analog 6 in 15% yield. The product was characterized by NMR.

Alternatively AMBMP analog 6 was synthesized according to scheme IV.

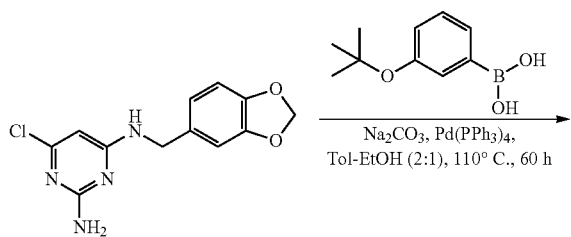

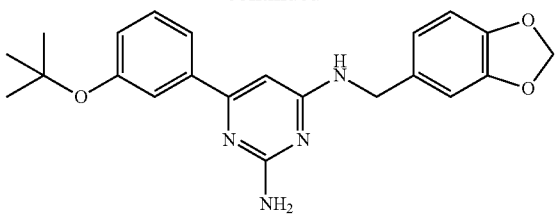

AMBMP Analog 7 (FIG. 1G)

AMBMP analog 7 was synthesized according to scheme III. AMBMP analog 3 was reacted with equivalent amount of 2-methoxyethan-1-ol using PPh₃ and diethyl azodicarboxylate (DEAD) to obtain AMBMP analog 7. AMBMP analog 7 has Log P of 2.90

AMBMP Analog 8 (FIG. 1H)

AMBMP analog 8 was synthesized according to scheme III. AMBMP analog 3 was reacted with equivalent amount of 3-[2-(2-methoxyethoxy)ethoxy]propan-1-ol using PPh₃ and diethyl azodicarboxylate (DEAD) to obtain AMBMP analog 8. AMBMP analog 8 has log P of 2.86

Alternatively AMBMP analog 8 was synthesized as

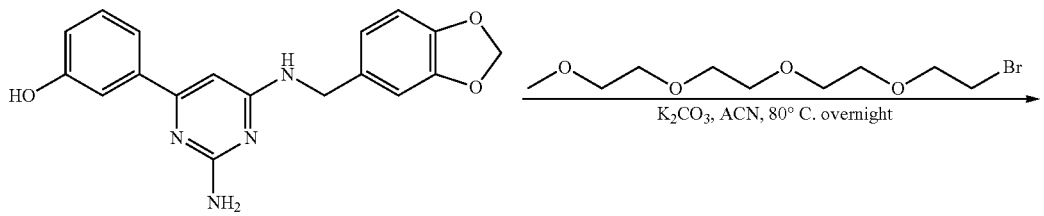

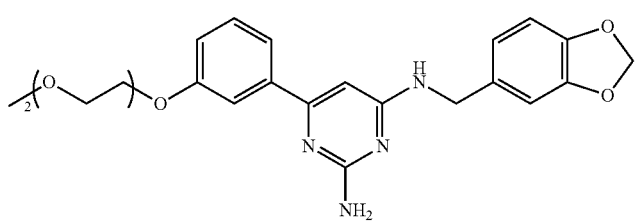

AMBMP Analog 9 (FIG. 1I)

AMBMP analog 9 was synthesized according to scheme III. AMBMP analog 3 was reacted with equivalent amount of 2-(2-aminoethoxy)ethan-1-ol using PPh$_3$ and diethyl azodicarboxylate (DEAD) to obtain AMBMP analog 9. AMBMP analog 9 has log P of 1.70

AMBMP Analog 17 (FIG. 1Q)

AMBMP analog 17 was synthesized according to scheme I. 4,6-dichloropyrimidine-2-amine was reacted with equivalent amount of benzo[d][1,3]dioxol-5-ylmethanamine in t-butanol. The reaction product was further reacted with equivalent amount of (4-(trifluoromethoxy)phenyl)boronic acid, in the presence of Pd(PPh$_3$)$_4$ in a column. The product obtained was subjected to purification using silica gel chromatography on Combiflash Rf 200 by employing hexane-EtOAc step gradient (95:5→80:20) over 30 min. Fractions corresponding to the product peak were combined and concentrated using rotavap to afford AMBMP analog 17 in 48% yield. The product was characterized by NMR and mass spectrometry (MS).

Alternatively AMBMP analog 6 was synthesized according to scheme IV.

5-methoxyphenyl)boronic acid (120.81 mg, 0.72 mmol, 2.0 eq), sodium carbonate (152.46 mg, 1.44 mmol, 4.0 eq) and tetrakis(triphenylphosphine)-palladium(0) (207.78 mg, 0.18 mmol, 0.5 eq) were added to a 15 mL glass pressure vessel and suspended in 5 mL of toluene-ethanol (2:1). The reaction mixture was stirred for 72 h at 110° C. under nitrogen. Upon cooling, the crude product was filtered through celite and the filtrate was collected and concentrated under reduced pressure. The concentrate was then washed with NaHCO$_3$ and extracted with ethyl acetate (4×30 mL). The organic layer was collected, dried with Na$_2$SO$_4$ and then purified by flash chromatography using a gradient method with hexane and ethyl acetate. Fractions containing the product were combined and concentrated under reduced pressure to yield the final product, 3-(2-amino-6-((benzo[d][1,3]dioxol-5-ylmethyl)amino)pyrimidin-4-yl)-5-methoxyphenol (yellowish powder, 38.21 mg, 28.8% yield).

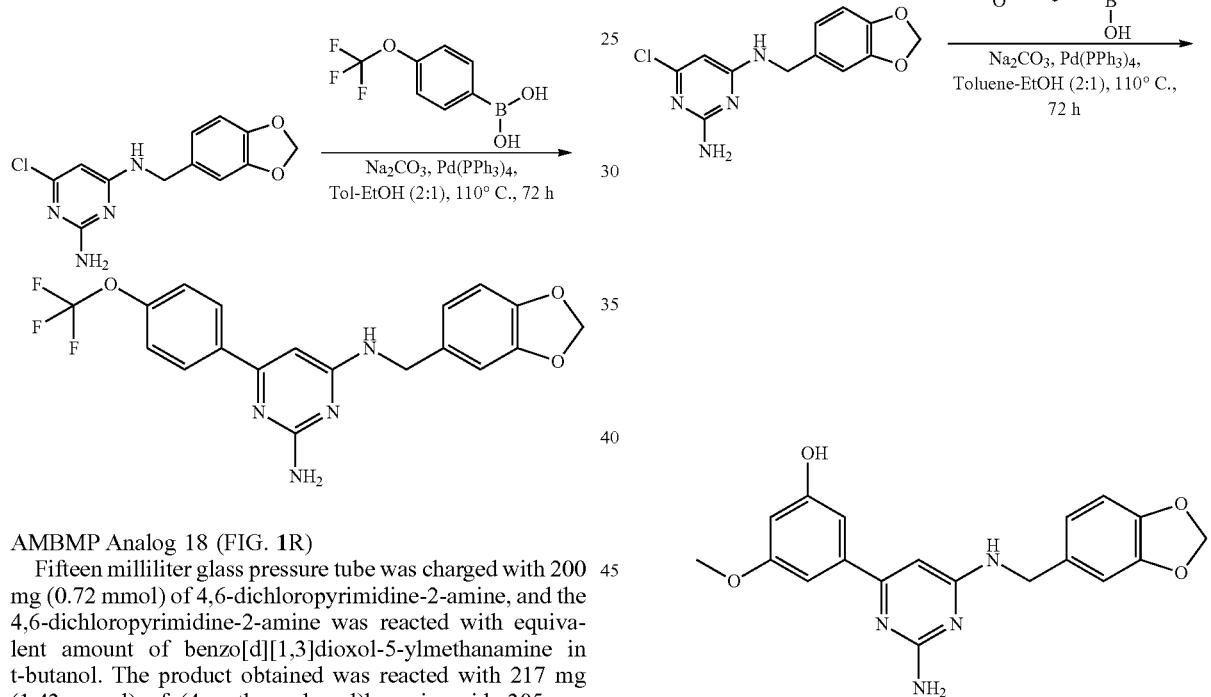

AMBMP Analog 18 (FIG. 1R)

Fifteen milliliter glass pressure tube was charged with 200 mg (0.72 mmol) of 4,6-dichloropyrimidine-2-amine, and the 4,6-dichloropyrimidine-2-amine was reacted with equivalent amount of benzo[d][1,3]dioxol-5-ylmethanamine in t-butanol. The product obtained was reacted with 217 mg (1.43 mmol) of (4-methoxyphenyl)boronic acid, 305 mg (2.88 mmol) of Na$_2$CO$_3$, 416 mg (0.36 mmol) of Pd(PPh$_3$)$_4$, and suspended in 10 mL of ACN-H$_2$O (1:1) under nitrogen. Reaction mixture was stirred for 48 h at 140° C. and then cooled to room temperature. Mixture was filtered through a short silica plug and washed with EtOAc. Crude obtained was washed with NaHCO$_3$ and extracted with EtOAc (2×10 mL). Combined organic phase was dried (MgSO$_4$), followed by purification using silica gel chromatography on Combiflash Rf 200 by employing hexane-EtOAc step gradient (95:5→80:20) over 30 min. Fractions corresponding to the product peak were combined and concentrated using rotavap to afford 151 mg of AMBMP analog 18 in 60% yield. The product was characterized by NMR and MS.

AMBMP Analog 40 (FIG. 1W)

AMBMP analog 40 was synthesized according to scheme IV. N4-(benzo[d][1,3]dioxol-5-ylmethyl)-6-chloropyrimidine-2,4-diamine (100 mg, 0.36 mmol, 1.0 eq), (3-hydroxy- All of the methods disclosed and claimed herein can be made and executed without undue experimentation in light of the present disclosure. While the compositions and methods of this invention have been described in terms of preferred embodiments, it will be apparent to those of skill in the art that variations may be applied to the methods and in the steps or in the sequence of steps of the method described herein without departing from the concept, spirit, and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope, and concept of the invention as defined by the appended claims.

The invention claimed is:

1. A method of treating muscular dystrophy in a subject, the method comprising administering to the subject an effective amount of a compound having a chemical structure of

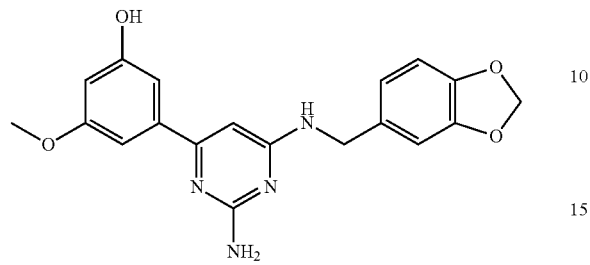

or a pharmaceutically acceptable salt or solvate thereof to treat the muscular dystrophy.

2. The method of claim 1, wherein the compound is administered with a pharmaceutically acceptable carrier.

3. The method of claim 1, wherein the type of muscular dystrophy is limb girdle muscular dystrophy.

4. The method of claim 1, wherein the type of muscular dystrophy is limb girdle muscular dystrophy type 2A.

5. The method of claim 1, wherein treating the muscular dystrophy increases expression of at least one gene selected from the group consisting of myosin light chain-2, Myosin-XVIIIb, Myomesin 3, Lipoprotein lipase, Patatin-Like Phospholipase Domain Containing 2, and Sarcomeric Mitochondrial Creatine Kinase in a subject.

* * * * *

UNITED STATES PATENT AND TRADEMARK OFFICE
CERTIFICATE OF CORRECTION

| | | |
|---|---|---|
| PATENT NO. | : 12,441,716 B2 | Page 1 of 1 |
| APPLICATION NO. | : 17/602989 | |
| DATED | : October 14, 2025 | |
| INVENTOR(S) | : Spencer et al. | |

It is certified that error appears in the above-identified patent and that said Letters Patent is hereby corrected as shown below:

On the Title Page

In Item (57), Line 3 of the Abstract, delete "y"

Signed and Sealed this
Eleventh Day of November, 2025

John A. Squires
*Director of the United States Patent and Trademark Office*